United States Patent [19]
Ichikawa et al.

[11] Patent Number: 6,158,415
[45] Date of Patent: Dec. 12, 2000

[54] IDLING SPEED CONTROL DEVICE OF INTERNAL COMBUSTION ENGINE AND VARIABLE VIBRATION ISOLATING SUPPORT DEVICE

[75] Inventors: Akinori Ichikawa, Toyota; Takanori Tsukamoto; Hiroshi Ozaki, both of Okazaki; Yuji Takeda; Katsuhiko Teraoka, both of Toyota; Masahiko Teraoka, Aichi-ken; Kuniaki Niimi, Toyota, all of Japan

[73] Assignee: Toyota Jidosha Kabushiki Kaisha, Toyota, Japan

[21] Appl. No.: 09/085,045

[22] Filed: May 27, 1998

[30] Foreign Application Priority Data

| Jun. 2, 1997 | [JP] | Japan | 9-144006 |
| Jul. 24, 1997 | [JP] | Japan | 9-198422 |
| Aug. 1, 1997 | [JP] | Japan | 9-207893 |
| Nov. 26, 1997 | [JP] | Japan | 9-324488 |
| Dec. 3, 1997 | [JP] | Japan | 9-333301 |

[51] Int. Cl.$^7$ ............ F02M 3/00; F02D 41/16; F02B 75/06
[52] U.S. Cl. ............ 123/339.23; 123/192.1
[58] Field of Search ............ 123/192.1, 192.2, 123/339.1, 339.23, 339.14, 339.19; 267/140.14, 140.13, 140.15; 180/312

[56] References Cited

U.S. PATENT DOCUMENTS

| 4,281,631 | 8/1981 | Yamaguchi | 123/339.28 |
| 4,300,516 | 11/1981 | Hayakawa | 123/571 |
| 4,671,227 | 6/1987 | Hollerweger et al. | 123/192.1 |
| 4,748,951 | 6/1988 | Manaka et al. | 123/339.16 |
| 4,750,466 | 6/1988 | Hibino et al. | 123/571 |
| 5,170,998 | 12/1992 | Muramatsu | 267/140.13 |
| 5,215,293 | 6/1993 | Muramatsu et al. | 267/140.14 |
| 5,215,294 | 6/1993 | Muramatsu et al. | 267/140.13 |
| 5,246,212 | 9/1993 | Funahashi et al. | 267/140.13 |
| 5,393,041 | 2/1995 | Takano et al. | 267/140.14 |
| 5,425,335 | 6/1995 | Miyamoto et al. | 123/198 F |
| 5,437,437 | 8/1995 | Takano et al. | 267/140.14 |
| 5,437,438 | 8/1995 | Takano et al. | 267/140.14 |
| 5,439,204 | 8/1995 | Yamazoe et al. | 267/140.14 |
| 5,507,262 | 4/1996 | Isobe et al. | 123/339.23 |
| 5,632,249 | 5/1997 | Sadakane et al. | 123/442 |
| 5,769,402 | 6/1998 | Ide et al. | 267/140.14 |
| 5,823,163 | 10/1998 | Hoshi | 123/336 |
| 5,905,317 | 5/1999 | Aoki | 310/51 |
| 5,918,462 | 7/1999 | Mitani | 60/397 |
| 5,939,625 | 8/1999 | Torii et al. | 73/118.1 |

FOREIGN PATENT DOCUMENTS

| 0 724 996 | 8/1996 | European Pat. Off. . |
| 39 14 364A | 10/1990 | Germany . |
| 58-023244 | 2/1983 | Japan . |
| 3-124967 | 5/1991 | Japan . |
| 4-77041 | 7/1992 | Japan . |
| 5319109 | 12/1993 | Japan . |
| 6-16050 | 1/1994 | Japan . |
| 8 164840 | 6/1996 | Japan . |

*Primary Examiner*—Andrew M. Dolinar
*Assistant Examiner*—Hai Huynh
*Attorney, Agent, or Firm*—Oliff & Berridge, PLC

[57] ABSTRACT

In an internal combustion engine to which an air pressure actuation mechanism such as a variable vibration isolating support device is installed side by side, the engine speed at the time of idling is made to suitably converge on the target idling speed. The idling speed control device includes: an idling speed control mechanism for controlling the intake air amount of the internal combustion engine to make the engine speed be the desired target idling speed at the time of idling of the internal combustion engine; an air pressure actuation mechanism operated by selectively introducing the atmospheric pressure and the intake tube negative pressure produced in the intake passage on the down stream side of the throttle valve; and an intake air amount compensating mechanism for compensating the adjusting position of the idling speed control mechanism in the direction of decreasing the intake air amount of the internal combustion engine when introducing the intake tube negative pressure after the introduction of the atmospheric pressure into the air pressure actuation mechanism.

17 Claims, 47 Drawing Sheets

FIG. 8
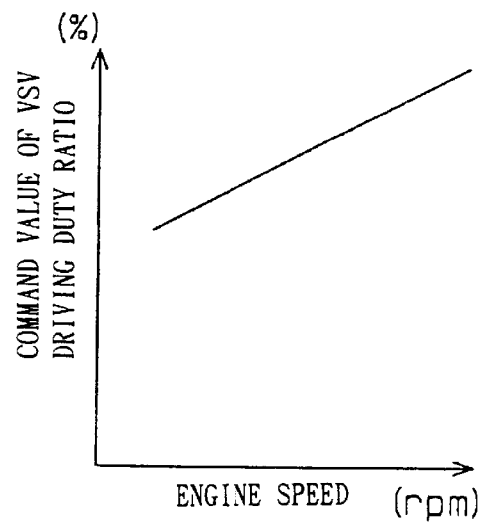
(a)
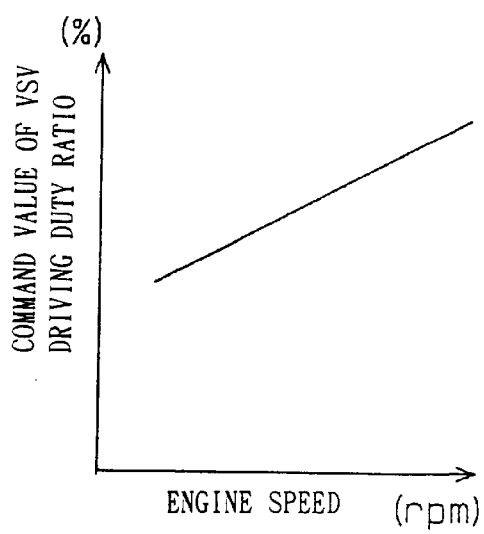
(b)
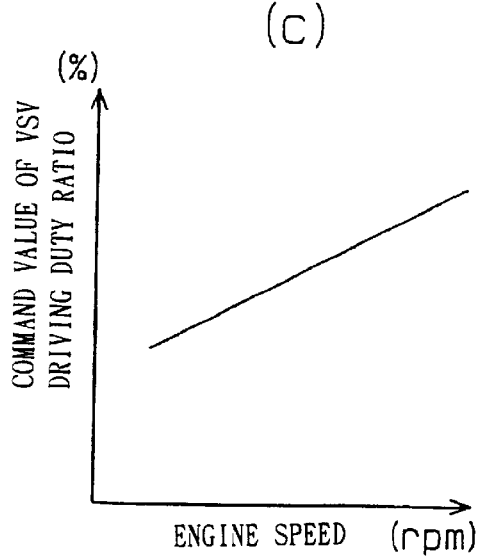
(c)
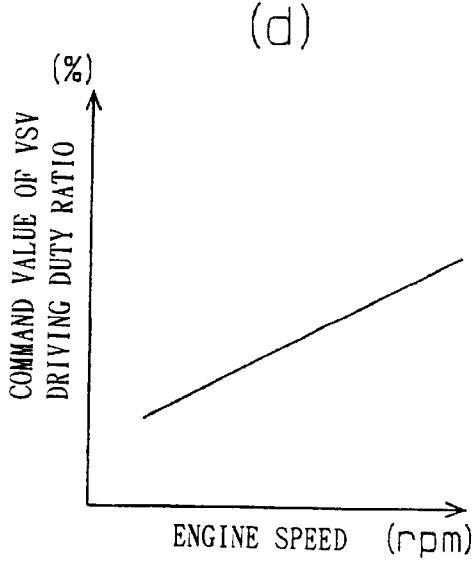
(d)

FIG. 32

FIRST MAP A (CONTROL VALUE FOR FIRST BANK $1_A$ : DUTY TIME)

| LOAD / REV. SPEED | 20 | 30 | 40 |
|---|---|---|---|
| 500 | 30 ms | 25 ms | 18 ms |
| 600 | 32 ms | 20 ms | 17 ms |
| 700 | 28 ms | 18 ms | 16 ms |

FIG. 33

SECOND MAP B (CONTROL VALUE FOR SECOND BANK $1_B$ : DUTY TIME)

| LOAD / REV. SPEED | 20 | 30 | 40 |
|---|---|---|---|
| 500 | 18 ms | 18 ms | 25 ms |
| 600 | 19 ms | 22 ms | 18 ms |
| 700 | 30 ms | 18 ms | 17 ms |

FIG. 34

FIRST MAP B (CONTROL TIMING FOR FIRST BANK $1_A$ : CRANK ANGLE CA)

| LOAD / REV. SPEED | 20 | 30 | 40 | 50 |
|---|---|---|---|---|
| 500 | 20CA | 25CA | 20CA | 18CA |
| 600 | 25CA | 30CA | 20CA | 17CA |
| 700 | 30CA | 25CA | 22CA | 16CA |

FIG. 35

SECOND MAP B (CONTROL TIMING FOR SECOND BANK $1_B$ : CRANK ANGLE CA)

| LOAD / REV. SPEED | 20 | 30 | 40 | 50 |
|---|---|---|---|---|
| 500 | 25CA | 18CA | 30CA | 22CA |
| 600 | 20CA | 17CA | 30CA | 20CA |
| 700 | 25CA | 16CA | 25CA | 18CA |

FIG. 49

COMPENSATION VALUE T (ms) OF VSV CHANGING TIMING

|  |  | IGNITION TIMING COMPENSATION VALUE (CA) | | | |
|---|---|---|---|---|---|
|  |  | −5 | 0 | 5 | 10 |
|  | 500 | 1.7 | 0 | −1.7 | −3.5 |
|  | 600 | 1.5 | 0 | −1.5 | −3.0 |
|  | 700 | 1.3 | 0 | −1.3 | −2.5 |

IDLING SPEED CONTROL DEVICE OF INTERNAL COMBUSTION ENGINE AND VARIABLE VIBRATION ISOLATING SUPPORT DEVICE

BACKGROUND OF THE INVENTION

The present invention relates to a variable vibration isolating support device for supporting an internal combustion engine while controlling the vibration of the internal combustion engine, and a technique to control the idling speed of an internal combustion engine to which an air pressure actuation mechanism such as a variable vibration isolating support device is mounted side by side.

Generally, an internal combustion engine mounted on an automobile or the like has a cylinder block with a plurality of cylinders, and a cylinder head fixed to the cylinder block. In the cylinder block, a plurality of cylinders are formed, and in each cylinder, a piston which can freely reciprocate is loaded. The piston of each cylinder is connected to a crank shaft rotatably supported in the cylinder block through a connecting rod, so that the reciprocating motion of the piston may be changed into the rotational movement of the crank shaft.

In each cylinder, a combustion chamber enclosed by the upper surface of the piston, the inner wall of the cylinder, and the cylinder head is formed. In the cylinder head, an intake port and an exhaust port are formed so that the opening ends thereof may face the combustion chamber. Furthermore, to the cylinder head, a spark plug is attached, facing the combustion chamber of each cylinder.

The intake port leads to an intake branch tube attached to the cylinder head. The intake branch tube leads to an air cleaner box through an intake tube. To each branch tube of the intake branch tube, a fuel injection valve is attached so that the injection hole thereof may face the intake port.

The exhaust port leads to an exhaust branch tube attached to the cylinder head. The exhaust branch tube leads to a muffler through an exhaust tube. In the course of the exhaust tube, an exhaust gas purifying catalyst for purifying the injurious ingredients in the exhaust gas is mounted.

In the internal combustion engine arranged like this, the piston descends so that the pressure in the combustion chamber may be negative, in the cylinder at the intake stroke. The negative pressure is applied to the intake tube through the intake port and the intake branch tube. The fresh air taken in the intake tube through the air cleaner box flows to the intake branch tube by receiving the negative pressure, and next flows to the intake port. The fresh air flowing into the intake port is sucked into the combustion chamber while forming gaseous mixture by being mixed with the fuel injected from the fuel injection valve.

When the cylinder has moved from the intake stroke to the compression stroke, the piston rises so that the gaseous mixture filled in the combustion chamber may be compressed. The compressed gaseous mixture is fired by the spark plug and explodes. The explosion power of the gaseous mixture presses down the piston. At this time, the cylinder moves from the compression stroke to the explosion stroke.

In the cylinder in which the explosion stroke has finished, the piston rises again so that the burned gas in the combustion chamber may be discharged to the exhaust port. The burned gas (exhaust gas) discharged to the exhaust port is introduced to the exhaust tube through the exhaust branch tube, and is purified at the exhaust gas purifying catalyst mounted in the course of the exhaust tube. The exhaust gas purified at the exhaust gas purifying catalyst is released into the atmosphere through the exhaust tube and the muffler.

In an internal combustion engine, for controlling the amount of fresh air supplied into the combustion chamber, a throttle valve is provided in the course of the intake tube. Moreover, to the intake tube, a bypass passage making a detour around the throttle valve is attached, and to the bypass passage, an idling speed control valve (ISCV) for controlling the flow rate in the bypass passage is mounted.

At the time of idling when the throttle valve is entirely closed, the ISCV is opened so that fresh air may be supplied to the combustion chamber of each cylinder. The opening of the ISCV is determined so that the idling speed of the internal combustion chamber may be a desired target idling speed.

By using the ISCV, even at the time of idling when the throttle valve is entirely closed, a desired amount of fresh air can be supplied to the internal combustion engine, and the operating condition of the internal combustion engine can be made to be stable.

On the other hand, in a case where the internal combustion engine is mounted on a body, for preventing various types of vibrations such as an idling vibration of an internal combustion engine or an engine shake from being transmitted to the body side, a variable vibration isolating support device which changes the vibration isolating characteristics according to the various types of vibrations, is used.

As a variable vibration isolating support device, for example, a liquid sealing type vibration isolating device described in JP U Hei4-77041, an active mount described in JP A Hei6-16050, and the like are well known.

The liquid sealing type vibration isolating device described in Japanese Utility Model Application Laid-Open (JP-U) No. Hei4-77041 comprises: a hydraulic liquid chamber made in such a way that a part of the chamber wall is formed by a vibration isolating base body made of an elastic body; a first compensating liquid chamber leading to the hydraulic liquid chamber through a first orifice and made in such a way that a part of the chamber wall is formed by a first diaphragm; a first air chamber separated from the first compensating liquid chamber by the first diaphragm; a second compensating liquid chamber leading to the hydraulic liquid chamber through a second orifice and made in such a way that a part of the chamber wall is formed by a second diaphragm; and a second air chamber separated from the second compensating liquid chamber by the second diaphragm.

The second orifice is formed such that the diameter thereof is larger than that of the first orifice. It is arranged that the atmospheric pressure is introduced into the first air chamber at all times and into the second air chamber, the negative pressure and the atmospheric pressure are selectively introduced.

As the method to selectively introduce the atmospheric pressure and the negative pressure into the second air chamber, while connecting a negative pressure passage to the intake passage of the internal combustion engine on the down stream of the throttle valve, an atmospheric passage is connected to the intake passage on the upper stream side of the throttle valve, and the negative pressure passage, the atmospheric passage, and the second air chamber are connected through a three way switching valve.

The three way switching valve comprises: a valve body for switching between the continuity of the negative pressure passage and the second air chamber (closing of the atmosphere passage), and the continuity of the atmosphere passage and the second air chamber (closing of the negative pressure passage); and an electromagnetic solenoid for driving the valve body, and the electromagnetic solenoid drives the valve body according to the driving pulse signal corresponding to the ratio of the time of continuity of the negative pressure passage and the second air chamber, to the time of continuity of the atmosphere passage and the second air chamber (duty ratio).

In this case, into the air chamber, the atmosphere flowing in the intake passage on the upper stream side of the throttle valve, and the intake tube negative pressure produced in the intake passage on the down stream side of the throttle valve are selectively introduced.

For example, when decreasing comparatively high frequency vibrations such as an idling vibration, the liquid sealing type vibration isolating device makes the volume of the second compensating liquid chamber variable, and decreases the dynamic spring constant of the whole system, by introducing the atmosphere into the second air chamber to make the diaphragm be in a movable state.

When decreasing comparatively low frequency vibrations such as an engine shake, the liquid sealing type vibration isolating device makes the volume of the second compensating liquid chamber constant, and increases the damping coefficient of the whole system, by introducing the negative pressure into the second air chamber to adhere the diaphragm to the wall surface.

Next, the active mount described in JP A Hei6-16050 has a rubber member and a liquid sealing portion connected by a variable orifice, and is arranged such that the opening area of the opening portion of the variable orifice is variable according to the vibration characteristics.

The active mount estimates the cylinder reaching the explosion stroke and the explosion timing thereof by using the cylinder discrimination signal outputted for every one revolution of the cam shaft of the internal combustion engine, the crank angle signal outputted for every revolution of a certain angle of the crank shaft, and the like, and drives the variable orifice a certain time before the estimated explosion timing so as to change the dynamic spring constant of the whole active mount.

By the way, in the case of a variable vibration isolating support device obtaining a desired vibration isolating characteristics by selectively introducing the intake tube negative pressure and the atmosphere, such as a liquid sealing type vibration isolating device described in the above mentioned Japanese Utility Model Application Laid-Open (JP-U) No. Hei44-77041, if the intake tube negative pressure is introduced after the atmosphere has been introduced, the atmosphere in the variable vibration isolating support device flows into the intake passage on the down stream side of the throttle valve through the negative pressure passage, so that the amount of the intake air of the internal combustion engine may be increased. When the amount of the intake air is increased, the amount of the fuel injection is also increased accompanied with that, and consequently, the engine speed of the internal combustion engine is raised.

Especially, in a case where the internal combustion engine is in the state of idling and the control of the engine speed by the ISCV is performed, the fresh air of a flow rate more than that controlled by the ISCV flows into the internal combustion engine by the operation of the variable vibration isolating support device, and the idling speed is raised to a speed not less than the desired target idling speed, and problems of giving adverse effects to the operational characteristics, the fuel consumption rate, and the like of the internal combustion engine, are produced.

Furthermore, in the liquid sealing type vibration isolating device described in Japanese Utility Model Application Laid-Open (JP-U) No. Hei4-77041, the control is performed such that the atmosphere is introduced when absorbing variable comparatively high frequency vibrations, and the negative pressure is introduced when damping comparatively low frequency vibrations. However, in the case of a V-type internal combustion engine, since the angle and the timing at which the vibrations are inputted into the vibration isolating device, are different depending on whether the vibrations are those produced by the explosion of the gaseous mixture in the cylinders of the bank on one side or those produced by the explosion of the gaseous mixture in the cylinders of the bank on the other side, there is such a problem that when using the liquid sealing type vibration isolating device, the vibrations of a V-type internal combustion engine cannot effectively be restrained.

In a variable vibration isolating support device which changes the vibration isolating characteristics by selectively introducing the atmosphere and the negative pressure, when moving from the state where the negative pressure is continuously introduced to the state where the atmosphere and the negative pressure are alternately introduced at a specified ratio, the degree of negative pressure in the air chamber is gradually decreased, and just after the movement, the diaphragm vibrates at a place near the wall surface, and therefore, there is such a problem that hammering noises are produced by the collision of the diaphragm and the wall surface.

Furthermore, in the active mount described in Japanese Patent Application Laid-Open (JP-A) No. Hei6-16050, considering that the ignition timing of each cylinder is the same timing, that is, considering that the explosion timings of all cylinders are the same timing, the dynamic spring constant of the active mount is changed a certain time before the explosion timing thereof. On the other hand, in Japanese Patent Application Laid-Open (JP-A) No. Hei3-124967, an internal combustion engine in which the fluctuation of the engine speed at the time of idling is restrained by compensating the ignition timing for every cylinder, is disclosed. When the active mount is applied to an internal combustion engine like this, it is possible that the timing to change the dynamic spring constant deviates from the ignition timing of each cylinder, and there is such a risk that the idling vibration of the internal combustion engine cannot effectively be restrained.

SUMMARY OF THE INVENTION

The present invention is made due to the above mentioned various types of problems, and a first object thereof is to prevent the engine speed at the time of idling from excessively rising so as to prevent the operational characteristics and the fuel consumption rate of an internal combustion engine from getting worse, in an internal combustion engine to which an air pressure actuation mechanism such as a variable vibration isolating support device changing the vibration isolating characteristics by selectively introducing the intake air negative pressure and the atmospheric pressure, is mounted side by side.

A second object of the present invention is to provide a technique by which the vibrations produced in a V-type internal combustion engine can effectively be restrained, in a variable vibration isolating support device supporting a V-type internal combustion engine on the body side.

A third object of the present invention is to provide a technique by which the hammering noises caused by the collision of the diaphragm and the wall surface can be prevented from occurring, in a variable vibration isolating support device which changes the vibration isolating characteristics by selectively introducing the atmosphere and the negative pressure.

A fourth object of the present invention is to provide a variable vibration isolating support device by which a sufficient vibration isolating effect can be obtained, even if the ignition timing is different for every cylinder at the time of idling of the internal combustion engine.

The first invention has adopted the following means in order to solve the first problem.

That is, an idling speed control device of an internal combustion engine according to the first invention, comprises:

a throttle valve located in the intake passage of the internal combustion engine;

an intake air amount detection means for detecting the amount of fresh air taken in the internal combustion engine;

an idling speed control means for controlling the intake air amount of the internal combustion engine to make the engine speed be a desired target idling speed, at the time of idling of the internal combustion engine;

an air pressure actuation mechanism operated by selectively introducing the atmospheric pressure and the intake tube negative pressure produced in the intake passage on the down stream side of the throttle valve; and an intake air amount compensating means for compensating the adjusting position of the idling speed control means in the direction of decreasing the intake air amount of the internal combustion engine, when the intake tube negative pressure is introduced after the atmospheric pressure has been introduced into the air pressure actuation mechanism.

In an idling speed control device arranged like this, the air pressure actuation mechanism is operated by selectively introducing the atmospheric pressure and the intake tube negative pressure produced in the intake passage on the down stream side of the throttle valve. When the intake tube negative pressure is introduced after the atmospheric pressure has been introduced by the air pressure actuation mechanism, the intake air amount compensating means compensates the adjusting position of the idling speed control means in the direction of decreasing the amount of intake air.

In this case, at the same time that the atmosphere introduced into the air pressure actuation mechanism is sucked in the intake passage by receiving the intake tube negative pressure in the intake passage on the down stream side of the throttle valve, the amount of intake air supplied to the internal combustion engine through the idling speed control means, is decreased.

Consequently, even if the atmosphere flows into the intake passage from the air pressure actuation mechanism by the operation of the air pressure actuation mechanism, the amount of intake air of the internal combustion engine is not increased, so that the rising of the engine speed may be prevented. Accordingly, worsening of the fuel consumption rate, worsening of the operational characteristics, and the like caused by the excessive rising of the engine speed can be prevented.

It is also possible that the intake air amount compensating means determines the compensating amount according to the operational state of the air pressure actuation mechanism. Specifically, the intake air amount compensating means specifies the amount of atmosphere flowing from the air pressure actuation mechanism to the intake passage, according to the operational state of the air pressure actuation mechanism, and determines the compensating amount, according to the specified amount of atmosphere.

Consequently, the fluctuation of the amount of intake air of the internal combustion engine by the operation of the air pressure actuation mechanism can be prevented, and the idling speed converges on the target idling speed without fluctuation.

It is also possible that in a case where the adjusting position of the idling speed control means compensated by the intake air amount compensating means is a position below a specified guard value of the lower limit (guard value in the direction of decreasing the amount of intake air), the idling speed control device further has an air pressure actuation mechanism control means for controlling the operational state of the air pressure actuation mechanism to decrease the amount of atmosphere flowing from the air pressure actuation mechanism to the intake passage.

The reason thereof is that if the operation of the air pressure actuation mechanism is stopped in a state where the adjusting position of the idling speed control means is excessively compensated, it is necessary to return the adjusting position of the idling speed control means to the original position in order to increase the amount of intake air of the internal combustion engine, but it takes some time for the idling speed control means to return to the original adjusting position, and there is a risk of inducing the lowering of the idling speed or the stopping of the internal combustion engine in that time.

Moreover, it is also possible that the air pressure actuation mechanism control means controls the air pressure actuation mechanism so as to prohibit the flow of atmosphere into the intake passage from the air pressure actuation mechanism, in a case where the adjusting position of the idling speed control means compensated by the intake air amount compensating means is a position below the guard value of the lower limit.

It is also possible that the idling speed control device further has a lower limit guard value changing means which decreases the guard value of the lower limit, provided that the amount of atmosphere flowing from the air pressure actuation mechanism to the intake passage has an increasing tendency, in a case where the adjusting position of the idling speed control means by the intake air amount compensating means is a position below a specified guard value of the lower limit.

Generally, since the guard value of the lower limit of the adjusting position of the idling speed control means is set to a value to which a margin is added, considering the initial tolerance or the like of the components of the idling speed control means, it is possible to further lower the adjusting position, even if the adjusting position of the idling speed control means has reached the guard value of the lower limit.

However, if only the guard value of the lower limit is simply decreased, there is a risk of inducing the lowering of the idling speed, the stopping of the internal combustion engine or the like because of the decrease of the amount of intake air, when the atmosphere does not flow from the air pressure actuation mechanism to the intake passage. Therefore, in the present invention, the guard value of the lower limit is arranged to be decreased, provided that the amount of atmosphere flowing from the air pressure actuation mechanism to the intake passage has an increasing tendency.

In this case, it is possible to continue the control of the idling speed without stopping the operation of the air pressure actuation mechanism.

It is also possible that the idling speed control device further has a learning prohibiting means for prohibiting the learning processing of the adjusting position while the guard value of the lower limit is being changed by the lower limit guard value changing means, in a case where the adjusting position of the idling speed control means is a learned value learned according to the engine load, the target idling speed and the like.

The reason thereof is that the value used as the adjusting position while the guard value of the lower limit is being changed, is a value which is originally not used, and there is a risk of making the idling speed unstable if the value is used as the learned value.

As an air pressure control mechanism, a variable vibration isolating support device capable of changing the vibration isolating characteristics by selectively introducing the intake tube negative pressure and the atmospheric pressure, can be shown as an example.

In a case where a variable vibration isolating support device is used as an air pressure control mechanism, it is also possible that the idling speed control device has a changing processing stopping means for stopping the introduction changing processing of the intake tube negative pressure and the atmospheric pressure into the variable vibration isolating support device when the engine speed is not less than a specified speed at the time of idling of the internal combustion engine.

In a variable vibration isolating support device, when the atmospheric pressure and the intake tube negative pressure are selectively introduced, especially when the introduction is changed from that of the atmospheric pressure to that of the intake tube negative pressure, the atmosphere introduced into the variable vibration isolating support device is sucked in the intake passage of the internal combustion engine by receiving the intake tube negative pressure, and the amount of intake air of the internal combustion engine is increased. When such an increase of the amount of intake air is detected by the intake air amount detection means, the amount of fuel injection is increased according to the increasing amount thereof, and the engine speed is raised.

The changing processing stopping means judges whether the engine speed raised by the operation of the variable vibration isolating support device is equal to or more than a specified speed or not, and if the engine speed after the rising is judged to be equal to or more than the specified speed, the changing processing of the introduction of the intake tube negative pressure and the atmospheric pressure for the variable vibration isolating support device is stopped.

In this case, the atmosphere does not flow from the variable vibration isolating support device to the intake passage, and the amount of intake air detected by the intake air amount detection means is decreased. If the decrease of the amount of intake air is detected by the intake air amount detection means, the amount of fuel injection is also decreased, and the engine speed is lowered to a speed below the specified speed.

Consequently, the engine speed at the time of idling does not excessively rises, and the fuel consumption rate and the operational characteristics can be prevented from getting worse.

In a case where the idling speed control means is a flow rate control valve controlling the flow rate of intake air and the minimum opening of the flow rate control valve is set in advance, it can also be arranged that the changing processing stopping means stops the changing processing of the introduction of the intake tube negative pressure and the atmospheric pressure into the variable vibration isolating support device, provided that the engine speed is not less than the target idling speed and the opening of the flow rate control valve is the minimum opening, at the time of idling of the internal combustion engine.

In the idling speed control device arranged like this, if the opening of the flow rate control valve at the time when the engine speed becomes not less than the target idling speed, has reached the minimum opening, the changing processing stopping means stops the changing processing of the introduction of the atmospheric pressure and the intake tube negative pressure to the variable vibration isolating support device, and decreases the amount of intake air of the internal combustion engine.

In this case, since the amount of intake air of the internal combustion engine is decreased, the part of decreasing of the intake air amount is detected by the intake air amount detection means, and the amount of fuel injection is decreased according to the part of decreasing thereof. Consequently, the engine speed is lowered to a speed below the target idling speed.

When the engine speed is lowered to a speed below the target idling speed, the flow rate control valve makes the opening larger so as to raise the engine speed to the target idling speed, and the opening of the flow rate control valve becomes larger than the minimum opening, and consequently, the idling speed control by the flow rate control valve is continued.

It is also possible that the idling speed control device has a target idling speed compensating means for raising the target idling speed by a specified amount, when the changing processing of the introduction of the intake tube negative pressure and the atmospheric pressure to the variable vibration isolating support device, is stopped.

Generally, the target idling speed of an internal combustion engine to which no variable vibration isolating support device is mounted side by side, is set to a speed in the rotational area where the vibration of the internal combustion engine at the time of idling is lowered. However, the target idling speed of an internal combustion engine to which a variable vibration isolating support device is mounted side by side, is set to a speed in the rotational area lower than the target idling speed of an internal combustion engine to which no variable vibration isolating support device is mounted side by side, expecting the vibration isolating effect of the variable vibration isolating support device, and therefore, when the variable vibration isolating support device is stopped, the idling vibration of the internal combustion engine gets worse.

Then, when the changing processing of the introduction of the intake tube negative pressure and the atmospheric pressure to the variable vibration isolating support device, is stopped, by increasing the target idling speed by a specified amount by using the target idling speed compensating means, the engine speed can be raised to a speed at which the idling vibration is decreased, and the transfer of the vibration of the internal combustion engine to the body side can be restrained.

It is also possible that the idling speed control device has a changing frequency compensating means for decreasing the changing frequency of the introduction of the intake tube negative pressure and the atmospheric pressure to the variable vibration isolating support device by a specified amount, when the engine speed becomes not less than the specified speed at the time of idling of the internal combustion engine.

In this case, since the amount of intake air of the internal combustion engine can be decreased without stopping the variable vibration isolating support device, the engine speed can be decreased while obtaining the vibration isolating effect by the variable vibration isolating support device.

Furthermore, it is also possible that the changing frequency compensating means decreases the changing frequency of the introduction the intake tube negative pressure and the atmospheric pressure to the variable vibration isolating support device by a specified amount, provided that the engine speed is not less than the target idling speed and the opening of the flow rate control valve is the minimum opening, at the time of idling of the internal combustion engine.

The second invention has adopted the following means in order to solve the second problem. That is, the variable vibration isolating support device according to the second invention, comprises: a vibration isolating support means for supporting the V-type internal combustion engine so that the vibration of the V-type internal combustion engine may not be transmitted to the body side; and a vibration isolating characteristic changing means for changing the vibration isolating characteristics of the vibration isolating support means, according to the vibration produced at the bank on one side of the V-type internal combustion engine and the vibration produced at the bank on the other side of the V-type internal combustion engine.

In the variable vibration isolating support device arranged like this, when the vibration is produced at the bank on one side of the V-type internal combustion engine, the vibration isolating characteristic changing means changes the vibration isolating characteristics of the vibration isolating support means to the vibration isolating characteristics corresponding to the vibration produced at the bank on one side. In this case, the vibration produced at the bank on one side is damped by the vibration isolating support means, and is not transmitted to the body side.

On the other hand, when the vibration is produced at the bank on the other side of the V-type internal combustion engine, the vibration isolating characteristic changing means changes the vibration isolating characteristics of the vibration isolating support means to the vibration isolating characteristics corresponding to the vibration produced at the bank on the other side. In this case, the vibration produced at the bank on the other side is damped by the vibration isolating support means, and is not transmitted to the body side.

Accordingly, by using the variable vibration isolating support device, the vibration isolating characteristics are changed according to the vibration produced at the bank on one side of the V-type internal combustion engine and the vibration produced at the bank on the other side, and consequently, the vibration produced at each bank of the V-type internal combustion engine can effectively be damped.

It is also possible that the variable vibration isolating support device further has a vibration discrimination means comprising: a first vibration discrimination means which discriminates the vibration produced at the bank on one side, by the explosion timing of the gaseous mixture in the cylinders at the bank on one side; and a second vibration discrimination means which discriminates the vibration produced at the bank on the other side, by the fact that the gaseous mixture explodes in the cylinders at the bank on the other side.

In a case where the vibration isolating support means has a mechanism which changes the vibration isolating characteristics according to the control signal outputted from the vibration isolating characteristic changing means, it is also possible that the vibration isolating characteristic changing means alternately outputs a first control signal corresponding to the vibration produced at the bank on one side, and a second control signal corresponding to the vibration produced at the bank on the other side.

In a V-type internal combustion engine, the gaseous mixture is burned and exploded alternately in the cylinders of the bank on one side and in the cylinders of the bank on the other side, and therefore, the vibration isolating characteristic changing means alternately outputs the first control signal corresponding to the vibration produced at the bank on one side and the second control signal corresponding to the vibration produced at the bank on the other side, so that the vibration isolating characteristics of the vibration isolating support means may be changed to those corresponding to each vibration, in a case where the vibration is produced at the bank on one side and in a case where the vibration is produced at the bank on the other side.

Consequently, the vibration produced at each bank of the V-type internal combustion engine is effectively damped, and is not transmitted to the body side.

The third invention has adopted the following means in order to solve the above mentioned third problem. That is, the variable vibration isolating support device according to the third invention, comprises: a variable vibration isolating support means having a space portion whose wall surface is partly formed by a diaphragm, and alternately introducing the negative pressure and the atmospheric pressure into the space portion at a specified ratio when the operational condition of the internal combustion engine is in the first operational area, and continuously introducing the negative pressure into the space portion when the operational condition of the internal combustion engine is in the second operational area; and a pressure control means which alternately introduces the negative pressure and the atmospheric pressure at a specified ratio after the atmospheric pressure has been once introduced into the space portion, when the operational condition of the internal combustion engine has moved from the second operational area to the first operational area.

In the variable vibration isolating support device arranged like this, the variable vibration isolating support means continuously introduces the negative pressure into the space portion when the operational condition of the internal combustion engine is in the second operational area. In this case, the diaphragm is in a state of adhering to the wall surface of the space portion.

When the operational condition of the internal combustion engine is in the first operational area, the variable vibration isolating support means alternately introduces the negative pressure and the atmospheric pressure into the space portion at a specified ratio. In this case, at the space portion, the introduction of the atmosphere and the discharge of the atmosphere are alternately performed, and the diaphragm vibrates according to that.

In a case where the operational condition of the internal combustion engine has moved from the second operational area to the first operational area, the variable vibration isolating support means alternately introduces the negative pressure and the atmospheric pressure into the space portion after the pressure control means has once introduced the atmospheric pressure into the space portion. In this case, since the diaphragm begins to vibrate after being separated from the wall surface of the space portion, the collision of the diaphragm and the wall surface does not occur.

Consequently, the occurrence of the hammering noise because of the collision of the diaphragm and the wall surface can be prevented.

The fourth invention has adopted the following means in order to solve the fourth problem. That is, the variable vibration isolating support device according to the fourth invention, comprises: a vibration isolating support means which supports the internal combustion engine so that the vibration of the internal combustion engine may not be transmitted to the body side;

a vibration isolating characteristic changing means which changes the vibration isolating characteristics of the vibration isolating support means before the gaseous mixture explodes in each cylinder of the internal combustion engine;

an explosion timing changing means which changes the substantial explosion timing of each cylinder by changing the ignition timing or the fuel injection timing independently for every cylinder of the internal combustion engine; and a compensating means of the vibration isolating characteristic changing timing which compensates the changing timing of the vibration isolating characteristics by the vibration isolating characteristic changing means, according to the explosion timing changed by the explosion timing changing means.

In the variable vibration isolating support device arranged like this, when the explosion timing of a certain cylinder is changed by the explosion timing changing means, the compensating means of the vibration isolating characteristic changing timing compensates the changing timing of the vibration isolating characteristics of the vibration isolating support means, according to the explosion timing after being changed.

In this case, the vibration isolating characteristics of the vibration isolating support means is changed at a timing corresponding to the explosion timing of the cylinder, and the vibration produced by the explosion in the cylinder is effectively damped.

Consequently, even if the explosion timing for every cylinder is different, the vibration produced by the explosion in each cylinder is surely damped.

Furthermore, it is preferable that the changing timing of the vibration isolating characteristics is arranged to be compensated to the advance side as the explosion timing is changed to the advance side.

BRIEF DESCRIPTION OF THE DRAWINGS

FIG. 8 is a definite example of a map to be seen at the time of calculation of the VSV driving duty ratio;

FIG. 32 is a figure showing a definite example of a first map A;

FIG. 33 is a figure showing a definite example of a second map A;

FIG. 34 is a figure showing a definite example of a first map B;

FIG. 35 is a figure showing a definite example of a second map B;

FIG. 49 is a figure showing a definite example of the map A showing the relation among the ignition timing at the time of idling, the engine speed, and the compensation value of the VSV changing timing;

DESCRIPTION OF THE PREFERRED EMBODIMENTS

The embodiments of the present invention will be described below on the basis of the drawings.

<Embodiment 1>

Figure 1:
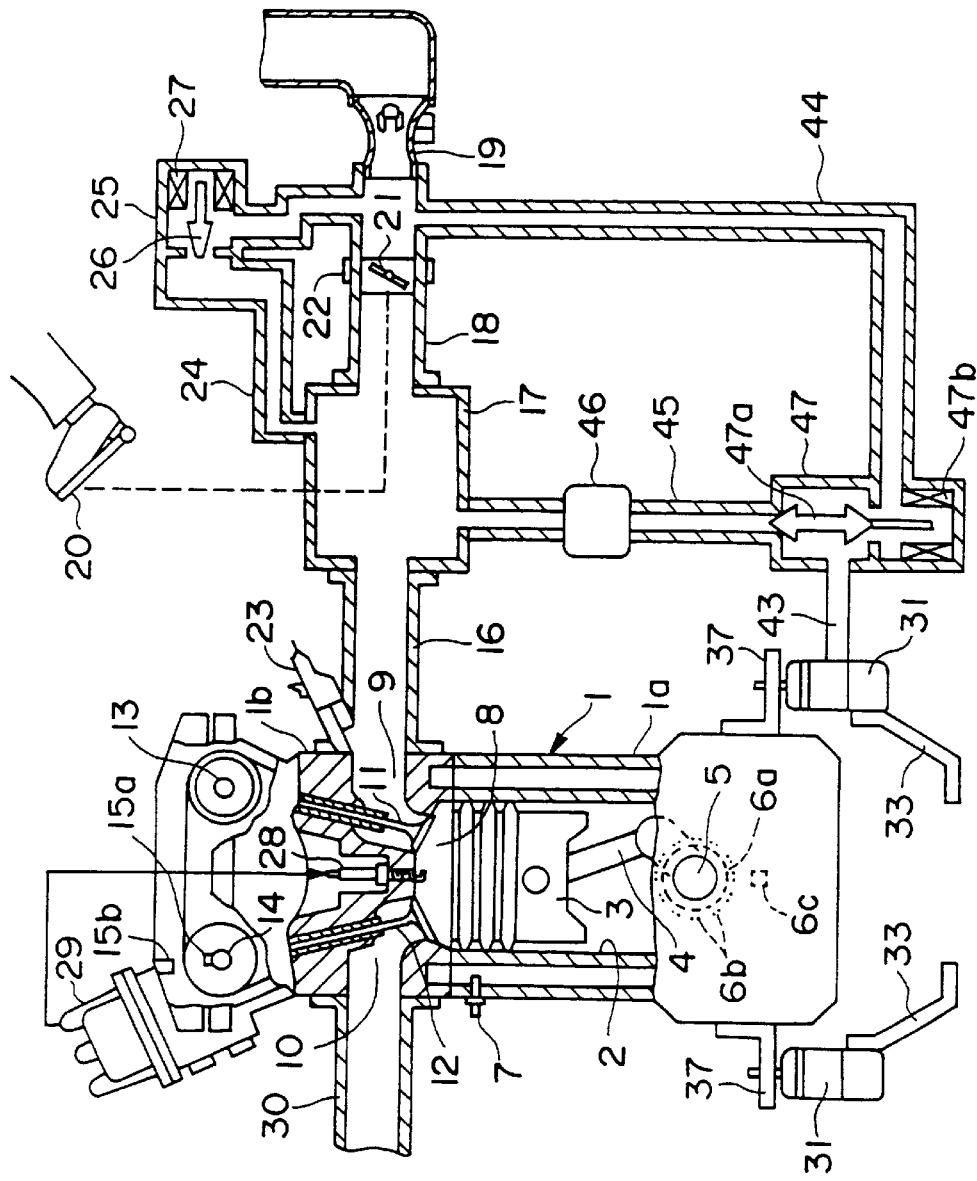
FIG. 1 is a rough structural figure of an internal combustion engine to which an idling speed control device is applied.

FIG. 1 is a rough structural figure of an internal combustion engine to which an idling speed control device of an internal combustion engine according to the first invention is applied.

The internal combustion engine 1 shown in FIG. 1 is a straight 4 cylinder internal combustion engine for an automobile.

In a cylinder block 1a of the internal combustion engine 1, 4 pieces of cylinders 2 are formed, and in each cylinder 2, a piston 3 is contained in such a way that the reciprocating motion is possible. Each piston 3 is connected to a crank shaft 5 as an engine output shaft through a connecting rod 4, and it is arranged that the reciprocating motion of the piston 3 is transformed into the rotational movement of the crank shaft 5 through the connecting rod 4.

To one end of the crank shaft 5, a timing rotor 6a is attached. On the periphery of the timing rotor 6a, a plurality of projections 6b are formed at equal intervals. To the cylinder block 1a near the timing rotor 6a, an electromagnetic pickup 6c is attached.

The electromagnetic pickup 6c outputs a pulse signal each time each projection 6b of the timing rotor 6a passes the front, when the crank shaft 5 and the timing rotor 6a rotates. Thus, the timing rotor 6a, the projections 6b, and the electromagnetic pickup 6c compose a crank position sensor 6.

To the cylinder block 1a, a water temperature sensor 7 for detecting the temperature of the cooling water for the cooling of an internal combustion engine is attached. To the upper end of the cylinder block 1a, a cylinder head 1b is attached. In each cylinder 2, a combustion chamber 8 surrounded by the wall surface of the cylinder head 1b and the upper surface of the piston 3 is formed.

In the cylinder head 1b, an intake port 9 and an exhaust port 10 are formed such that the opening ends thereof face the combustion chamber 8, and a spark plug 28 is attached, facing the combustion chamber 8.

The opening ends of the intake port 9 and the exhaust port 10 are opened and closed by an intake valve 11 and an exhaust valve 12 supported by the cylinder head 1b in such a way that the reciprocating motion is free.

The intake valve 11 and the exhaust valve 12 are driven to open and close by a cam shaft 13 on the intake side and a cam shaft 14 on the exhaust side rotatably supported by the cylinder head 1b. The cam shaft 13 on the intake side and the cam shaft 14 on the exhaust side are connected to the crank shaft 5 through a timing belt (not shown in the figure), and the rotation of the crank shaft 5 is transmitted to the cam shaft 13 on the intake side and the cam shaft 14 on the exhaust side through the timing belt.

At one place on the peripheral surface of the cam shaft 14 on the exhaust side, a projection 15a is formed. To the cylinder head 1b near the cam shaft 14 on the exhaust side on which this projection 15a is formed, an electromagnetic pickup 15b is attached. The electromagnetic pickup 15b outputs a pulse signal each time the projection 15b passes the front, when the cam shaft 14 on the exhaust side rotates. Thus, the projection 15a and the electromagnetic pickup 15b compose a cam position sensor 15.

The spark plug 28 is connected to an ignitor (not shown in the figure) through a distributor 29. The ignitor outputs the driving voltage of the spark plug 28. The driving voltage outputted from the ignitor is applied to the spark plug 28 of a proper cylinder 2 by the distributor 29. The intake port 9 leads to an intake branch tube 16 connected to the cylinder head 1a. The intake branch tube 16 leads to an intake tube 18 through a surge tank 17. The intake tube 18 is connected to an air cleaner box (not shown in the figure) through an air flow meter 19. The intake branch tube 16, the surge tank 17, and the intake tube 18 realize an intake passage according to the present invention. The air flow meter 19 outputs an electric signal corresponding to the mass of fresh air flowing into the intake tube 18, and realizes an intake air amount detection means according to the present invention.

To each branch tube of the intake branch tube 16, a fuel injection valve 23 is attached in such a way that the injection nozzle thereof faces to the intake port 9 of each cylinder 2. In the course of the intake tube 18, a throttle valve 21 which controls the flow rate in the intake tube 18, coupled to an accelerator pedal 20 installed in the vehicle, is mounted. To the throttle valve 21, a throttle position sensor 22 which outputs an electric signal corresponding to the opening of the throttle valve 21, attached.

The intake tube 18 on the upper stream side of the throttle valve 21 and the surge tank 17 are connected by a bypass passage 24 making a detour around the throttle valve 21. In the course of the bypass passage 24, a linear solenoid type idling speed control valve (ISCV) 25 for controlling the flow rate in the bypass passage 24, is mounted.

The idling speed control valve (ISCV) 25 realizes an idling speed control means according to the present invention, and is composed of a valve body 26 which repeats opening and closing of the channel in the bypass passage 24, and an electromagnetic solenoid 27 which drives the valve body 26.

When a driving voltage having a pulse width corresponding to the ratio of the valve opening time of the valve body 26 to the valve closing time (duty ratio) is applied, the electromagnetic solenoid 27 drives the valve body 26 to open and close according to that pulse width.

Figure 2:
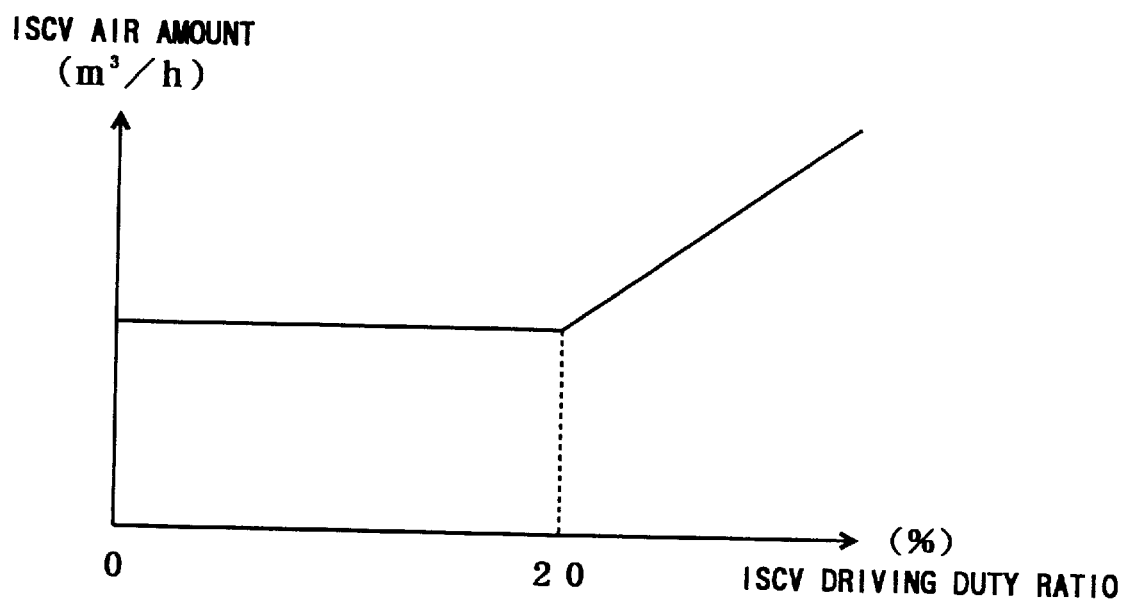
FIG. 2 is a graph showing the relation between the ISCV driving duty ratio and the ISCV air amount.

As shown in FIG. 2, the relation between the air amount passing the idling speed control valve (ISCV) 25 and the duty ratio is such a relation that the duty ratio and the air amount are proportional when the duty ratio is not less than 20% (ratio of the valve opening time to the valve closing time is 20%:80%), but when the duty ratio is less than 20%, the proportional relation between the duty ratio and the air amount does not hold and the air amount becomes approximately constant.

That is, even if the driving voltage corresponding to the duty ratio of less than 20% is applied to the idling speed control valve (ISCV) 25, the amount of air passing the idling speed control valve (ISCV) 25 cannot be decreased.

In this case, the adjusting position (opening of the valve body 26) of the idling speed control valve (ISCV) 25 at the time of applying of the driving voltage corresponding to the duty ratio: 20%, is the lower limit guard value.

On the other hand, the exhaust port 10 leads to an exhaust branch tube 30 connected to the cylinder head 1b, and the exhaust branch tube 30 is connected to a muffler through an exhaust tube, an exhaust gas purifying catalyst, and the like (not shown in the figure).

In the internal combustion engine 1 arranged as mentioned above, at the intake stroke of a certain cylinder 2, the piston 3 of the cylinder 2 begins to fall from a position near the top dead center, and the pressure in the combustion chamber 8 becomes negative. Approximately at the same time, the intake valve 11 is opened, and the combustion chamber 8 and the intake port 9 are connected. The negative pressure in the combustion chamber 8 is applied to the intake branch tube 16 through the intake port 9, and next, applied to the surge tank 17.

At this time, if the throttle valve 21 or the idling speed control valve (ISCV) 25 is opened, the fresh air on the upper stream side of the throttle valve, that is, the fresh air flowing in the intake tube 18 through the air cleaner box flows into the surge tank 17 by receiving the negative pressure.

The fresh air flowing into the surge tank 17 flows into the intake port 9 through the intake branch tube 16, and is introduced into the combustion chamber 8 while being mixed with the fuel injected from the fuel injection valve 23.

When the piston 3 begins to rise after it has fallen to the bottom dead center, the cylinder 2 moves to the compression stroke, and the intake valve 11 is closed. The gaseous mixture in the combustion chamber 8 is compressed by the rising of the piston 3. When the piston 3 rises to a position near the top dead center, a driving voltage is outputted from the ignitor. This driving voltage is applied to the spark plug 28 of the cylinder 2 by the distributor 29, and the spark plug 28 is fired.

The gaseous mixture compressed in the combustion chamber 8 is burned and exploded by the firing of the spark plug 28, and the cylinder 2 moves to the explosion stroke. At the explosion stroke, the piston 3 is pressed down by the explosion power of the gaseous mixture, so that the crank shaft 4 may be rotated.

When the piston 3 begins to rise after it has fallen to the bottom dead center, the cylinder 2 moves to the exhaust stroke, and the exhaust valve 12 is opened. The burned gas in the combustion chamber 8 is discharged to the exhaust port 10 by the rising of the piston 3, and is discharged from the exhaust port 10 to the exhaust branch tube 30.

When the internal combustion engine 1 is in the idling state, the depressing amount of the accelerator pedal 20 is [0], and the throttle valve 21 is entirely closed, and therefore, it is necessary to supply the fresh air to the combustion chamber 8 by the continuity of the bypass passage 24. Accordingly, when the internal combustion engine 1 is in the idling state, the idling speed control valve (ISCV) 25 is opened and the bypass passage 24 is made to be live. At that time, by controlling the opening of the idling speed control valve (ISCV) 25, the idling speed of the internal combustion engine 1 can be controlled.

The internal combustion engine 1 arranged as mentioned above is mounted in an engine room of an automobile, and the crank shaft 5 is drivingly connected to the wheels of the automobile through an automatic•transmission or the like (automatic•transmission and wheels are not shown in the figure). The internal combustion engine 1 is supported in the engine room through a variable vibration isolating support device (ACM) 31 as a cushioning member.

Figure 3:
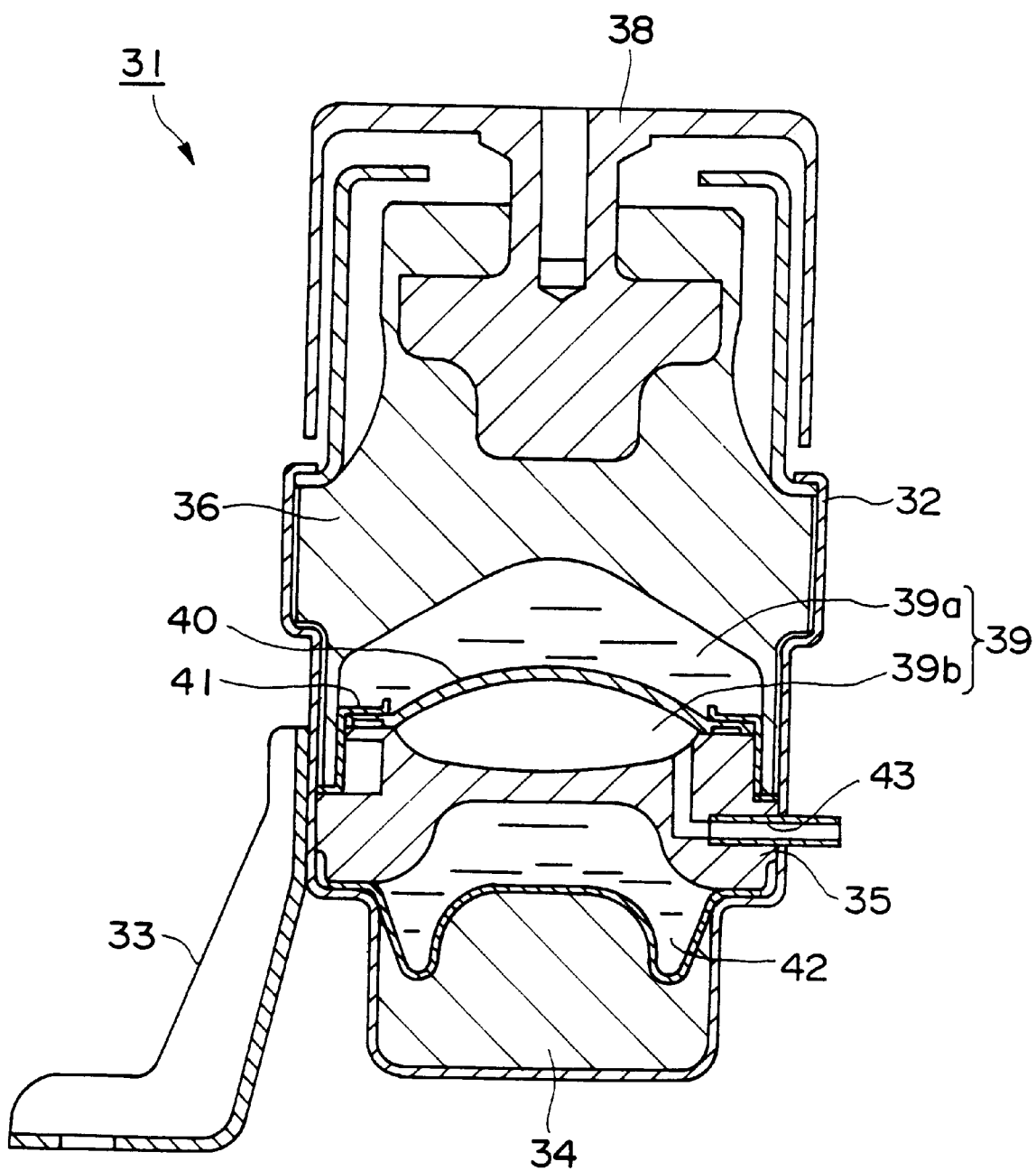
FIG. 3 is a figure showing the internal structure of a variable vibration isolating support device.

The ACM 31 has an outer casing hardware 32 shaped like a cylinder with a bottom, as shown in FIG. 3. The outer casing hardware 32 is connected to a member (not shown in the figure) located in the engine room through a bracket 33 on the body side.

In the bottom portion of the outer casing hardware 32, an elastic body 34 such as a rubber is forced, and above the elastic body 34, a partition board 35 made of a disc-like rigid body having an outside diameter approximately equal to the inside diameter of the outer casing hardware 32 is fitted so as to divide the interior of the outer casing hardware 32 into upper and lower rooms.

Above the partition board 35 in the outer casing hardware 32, a vibration isolating base body 36 made of rubber or the like is forced. The vibration isolating base body 36 is connected to a bracket 37 on the internal combustion engine side attached to the internal combustion engine 1 through a connector 38.

Above the partition board 35 in the outer casing hardware 32, a space portion 39 surrounded by the vibration isolating base body 36 and the partition board 35 is formed, and the space portion 39 is divided into two pieces of space portions 39a, 39b by a diaphragm 40 whose periphery is held between a fixing ring 41 and the partition board 35. Below the partition board 35 in the outer casing hardware 32, a space portion 42 surrounded by the elastic body 34 and the partition board 35 is formed.

In the space portion 42 and the space portion 39a located above the diaphragm 40, liquid is sealed (hereafter, the space portion 39a is called a main liquid chamber, and the space portion 42 is called a secondary liquid chamber). The main liquid chamber 39a and the secondary liquid chamber 42 are connected through an orifice (not shown in the figure), so that the liquid can come and go between the main liquid chamber 39a and the secondary liquid chamber 42 when the vibration isolating base body 36 is deformed by the vibration of the body of the automobile or the internal combustion engine 1.

The space portion 39b positioned below the diaphragm 40 leads to an intake and exhaust passage 43 formed in the partition board 35 and the outer casing hardware 32. The intake and exhaust passage 43 is a passage to supply the atmosphere to the space portion 39b, and to discharge the atmosphere in the space portion 39b.

For example, when the atmosphere is introduced into the space portion 39b by the intake and exhaust passage 43, the volume of the space portion 39b is increased, and the diaphragm 40 is separated from the partition boar 35. Consequently, the displacement of the diaphragm 40 becomes free (fluctuation of the volume of the space portion 39b becomes free), and the ACM 31 becomes softest as a cushioning member. That is, when a vibration is inputted into the ACM 31, the vibration can be absorbed by the displacement of the diaphragm (change of the volume of the space portion 39b).

On the other hand, when the atmosphere in the space portion 39b is discharged by the intake and exhaust passage 43, the volume of the space portion 39b is decreased. Then, when the atmosphere in the space portion 39b is entirely discharged, the diaphragm 40 is adhered to the partition board 35, and the displacement of the diaphragm 40 becomes impossible (fluctuation of the volume of the space portion 39b becomes impossible), and consequently, the ACM 31 becomes hardest as a cushioning member. That is, when a vibration is inputted into the ACM 31, the vibration cannot be absorbed by the displacement of the diaphragm (change of the volume of the space portion 39b), and the result is that the vibration is damped only by the coming and going of the liquid between the main liquid chamber 39a and the secondary liquid chamber 42.

The control of the ACM 31 as mentioned above is performed according to the operational condition of the internal combustion engine 1, for example, by making it softer at the time of high speed revolution of the internal combustion engine 1 and making it harder at the time of low speed revolution. Furthermore, in the internal combustion engine 1, when the gaseous mixture is exploded in the combustion chamber 8, that is, when the reciprocating motion of the piston 3 is changed into the rotational movement of the crank shaft 5, a vibration to turn the cylinder block 1a in the rotational direction of the crank shaft 5 is produced. Therefore, it is also preferable that at the timing of explosion of the gaseous mixture, a specified amount of atmosphere is introduced into the space portion 39b of the ACM 31 and at the other timings, the atmosphere in the space portion 39b is discharged. In this case, since the ACM 31 becomes softer in synchronization with the explosion of the gaseous mixture, the vibration caused by the explosion of the gaseous mixture can suitably be absorbed.

Here, returning to FIG. 1, an air intake and exhaust mechanism to supply and discharge the atmosphere to and from the space portion 39b of the ACM 31, will be described.

The intake and exhaust passage 43 of the ACM 31 is connected to a vacuum switching valve (VSV) 47. To this VSV 47, an atmosphere passage 44 and a negative pressure passage 45 are connected besides the intake and exhaust passage 43. The atmosphere passage 44 is connected to the intake tube 18 positioned on the down stream side of the air flow meter 19 and on the upper stream side of the throttle valve 21. The negative pressure passage 45 is connected to the surge tank 17 positioned on the down stream side of the throttle valve 21. In the course of the negative pressure passage 45, a negative pressure tank 46 is provided.

The VSV 47 is a three way switching valve comprising: a valve body 47a for switching the continuity between the continuity of the intake and exhaust passage 43 and the atmosphere passage 44 (closing of the negative pressure passage 45), and the continuity of the intake and exhaust passage 42 and the negative pressure passage 45 (closing of the atmosphere passage 44); and an electromagnetic solenoid 47b for driving the valve body 47a.

The valve body 47a is usually held at a position to close the negative pressure passage 45 and at the same time, to connect the intake and exhaust passage 43 and the atmosphere passage 44, by the urging force of a coil spring (not shown in the figure).

When a specified voltage is applied to the electromagnetic solenoid 47b, the electromagnetic solenoid 47b excites a core (not shown in the figure), and the excited core produces a magnetic force to attract the valve body 47a. At this time, the valve body 47a moves against the urging force of the spring so as to close the atmosphere passage 44 and at the same time, to connect the intake and exhaust passage 43 and the negative pressure passage 45.

The driving control of the VSV 47 arranged like this is performed by performing the duty control of the applied voltage of the electromagnetic solenoid 47b. That is, the VSV 47 is driven by applying, to the electromagnetic solenoid 47b, a driving pulse signal with a pulse width corresponding to the ratio (duty ratio) of the time of continuity of the intake and exhaust passage 42 and the atmosphere passage 44, to the time of continuity of the intake and exhaust passage 42 and the negative pressure passage 45.

Specifically, when a driving pulse signal corresponding to the duty ratio: 0% is applied to the electromagnetic solenoid 47b, the electromagnetic solenoid 47b does not produce a magnetic force, and the valve body 47a is held at a position to close the negative pressure passage 45 and at the same time, to connect the intake and exhaust passage 43 and the atmosphere passage 44. In this case, the atmosphere in the intake tube 18 on the upper stream side of the throttle valve 21 is continuously introduced into the space portion 39b of the ACM 31. Consequently, the volume of the space portion 39b is increased, and the diaphragm 40 is separated from the partition board 35. That is, the displacement of the diaphragm 40 becomes free.

On the other hand, when a driving pulse signal corresponding to the duty ratio: 100% is applied to the electromagnetic solenoid 47b, the electromagnetic solenoid 47b produces a magnetic force, and the valve body 47a moves to a position to close the atmosphere passage 44 and at the same time, to connect the intake and exhaust passage 43 and the negative pressure passage 45. In this case, the intake tube negative pressure produced in the surge tank 17 on the down stream side of the throttle valve 21 is continuously applied into the space portion 39b of the ACM 31. Consequently, the atmosphere in the space portion 39b is entirely sucked out, and the diaphragm 40 adheres onto the partition board 35. That is, the displacement of the diaphragm 40 becomes impossible.

When a driving pulse signal corresponding to the duty ratio which is larger than 0% and smaller than 100% is applied to the electromagnetic solenoid 47b, the electromagnetic solenoid 47b alternately repeats the occurrence and the stop of the magnetic force at a specified ratio, and consequently, the valve body 47a repeats the advance and the retreat between a position to close the negative pressure passage 45 and a position to close the atmosphere passage 44.

In this case, into the space portion 39b of the ACM 31, the atmosphere and the intake tube negative pressure are alternately introduced. At that time, when the atmosphere is introduced after the intake tube negative pressure has been applied to the space portion 39b, the pressure in the main liquid chamber 39a is increased since the volume of the space portion 39b is increased and at the same time, the volume of the main liquid chamber 39a is decreased. Consequently, the vibration isolating base body 36 is pressed up. That is, the ACM 31 performs an expanding action.

On the other hand, when the intake tube negative pressure is applied after the atmosphere has been introduced into the space portion 39b, the atmosphere in the space portion 39b is discharged into the intake and exhaust passage 43, and consequently, the volume of the space portion 39b is decreased and at the same time, the volume of the main liquid chamber 39a is increased. Consequently, the pressure in the main liquid chamber 39a is decreased and the vibration isolating base body 36 is pulled down. That is, the ACM 31 performs a shrinkage action.

By controlling the VSV 47 as mentioned above, the amount of atmosphere in the space portion 39b is controlled, and the hardness of the ACM 31 as a cushioning member is controlled. Furthermore, by making the ACM 31 perform the expansion action and the shrinkage action in synchronization with the explosion timing of each cylinder 2 of the internal combustion engine 1, it becomes possible to accurately absorb the vibration caused by the explosion of the gaseous mixture.

Furthermore, when the introduction of atmosphere and the applying of the intake tube negative pressure to the space portion 39b are repeated, the atmosphere supplied into the space portion 39b through the atmosphere passage 44, the VSV 47, and the intake and exhaust passage 43 from the intake passage (intake tube 18) on the upper stream side of the throttle valve 21, is discharged to the intake passage (surge tank 17) on the down stream side of the throttle valve 21 through the intake and exhaust passage 43, the VSV 47, and the negative pressure passage 45.

Figure 4:
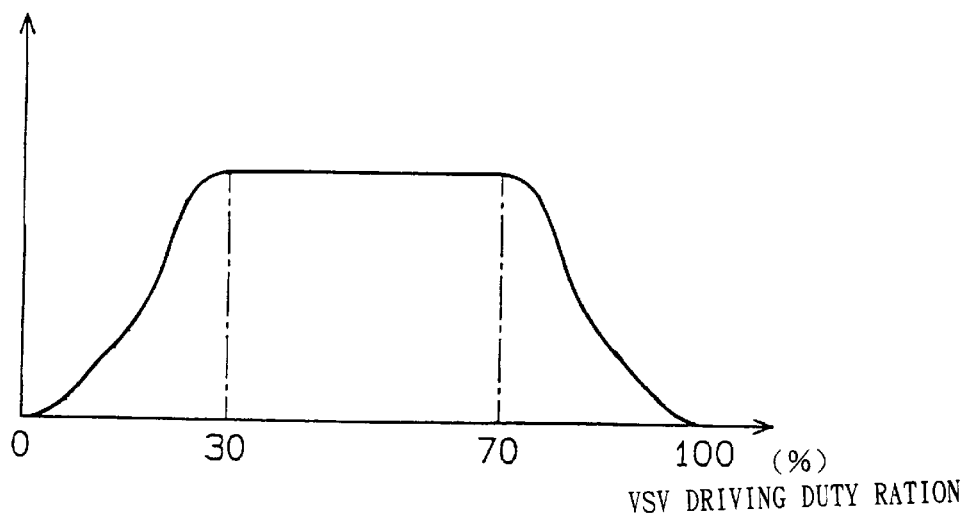
FIG. 4 is a graph showing the relation between the VSV driving duty ratio and the ACM discharge air amount.

Here, the relation between the amount of the atmosphere flowing into the surge tank 17 from the ACM 31 (hereafter, referred to simply as the ACM discharge air) and the duty ratio, is as shown by a graph in FIG. 4. It is clear from the graph that when the duty ratio is 0% or 100%, the amount of the ACM discharge air becomes [0]. When the duty ratio is a value between 30% and 70%, the amount of the ACM discharge air becomes constant to the change of the duty ratio and becomes the maximum value. When the duty ratio is a value between 0% and 30%, the amount of the ACM discharge air is increased proportionally to the increase of the duty ratio. When the duty ratio is a value between 70% and 100%, the amount of the ACM discharge air is decreased inversely proportionally to the increase and decrease of the duty ratio.

The reason why the ACM discharge air is produced when the duty ratio is a value between 0% and 100%, is that as mentioned above, the supply and the discharge of atmosphere are repeated in the space portion 39b of the ACM 31, and especially, the reason why the amount of the ACM discharge air becomes the maximum value when the duty ratio is a value between 30% and 70%, is that the valve body 47a of the VSV 47 is held in a specified position between a position to close the negative pressure passage 45 and a position to close the atmosphere passage 44, and the atmosphere passage 44 and the negative pressure passage 45 substantially become in the state of continuity.

Figure 5:
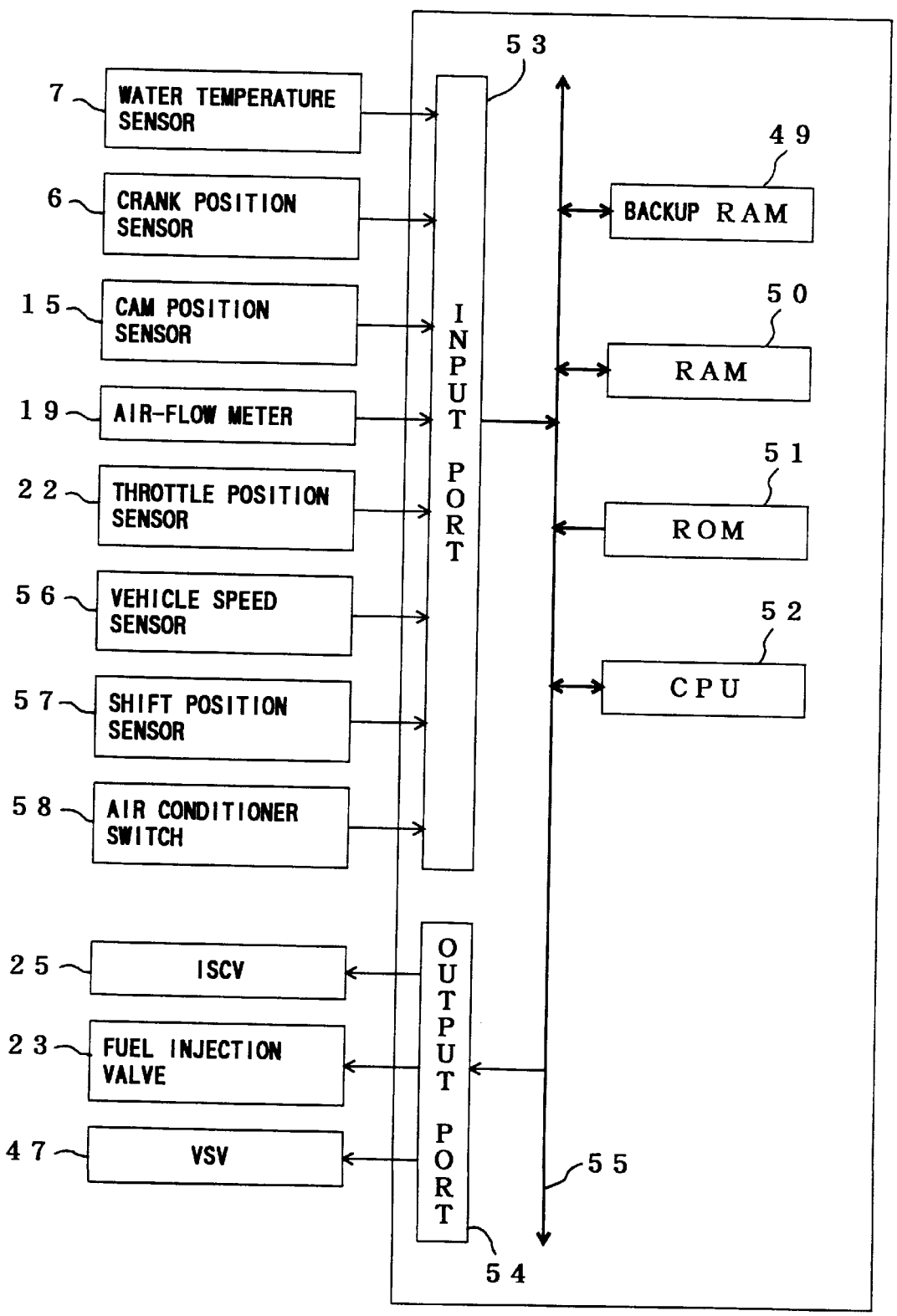
FIG. 5 is a block diagram showing the internal structure of the ECU.

Next, the electrical arrangement of the idling speed control device according to the present embodiment will be described on the basis of FIG. 5.

The idling speed control device has an electronic control unit (ECU) 48 which performs the controls of the operational state of the internal combustion engine 1, such as the ignition timing control, the fuel injection timing control, and the fuel injection amount control.

The ECU 48 has a backup RAM 49, a RAM 50, a ROM 51, a CPU 52, an input port 53, and an output port 54 which are mutually connected by a bi-directional bus 55.

The ROM 51 is a memory circuit for storing various types of control programs, maps to be seen when performing the various types of control programs, and the like. According to the control programs stored in the ROM 51, the CPU 52 performs various types of calculation processing. The RAM 50 is a memory for temporarily storing the calculation results of the CPU 52, the output signal from each sensor, and the like. The backup RAM 49 is a non-volatile memory capable of storing the data even when the operation of the internal combustion engine 1 is stopped.

The input port 53 is connected to various types of sensors such as a water temperature sensor 7, a crank position sensor 6, a cam position sensor 15, an air flow meter 19, a throttle position sensor 22, a vehicle speed sensor 56, a shift position sensor 57, and an air conditioner switch 58, through the electrical wiring, and inputs the output signal value of each sensor through the bus 55 into the RAM 50 and the CPU 52.

The output port 54 is connected to the ISCV 25, the fuel injection valve 23, the VSV 47, and the like, and sends the control signal from the CPU 52 to the ISCV 25, the fuel injection valve 23, or the VSV 47.

Furthermore, the vehicle speed sensor (omitted in FIG. 1) is a sensor for detecting the running speed of the vehicle on the basis of the rotational speed of the gear mounted in the automatic•transmission. The shift position sensor 57 is a sensor for outputting an electric signal corresponding to the shift position of the shift lever in the automatic•transmission, and the air conditioner switch 58 is a sensor for outputting a signal corresponding to the ON or the OFF of the air conditioner mounted on the vehicle.

Figure 6:
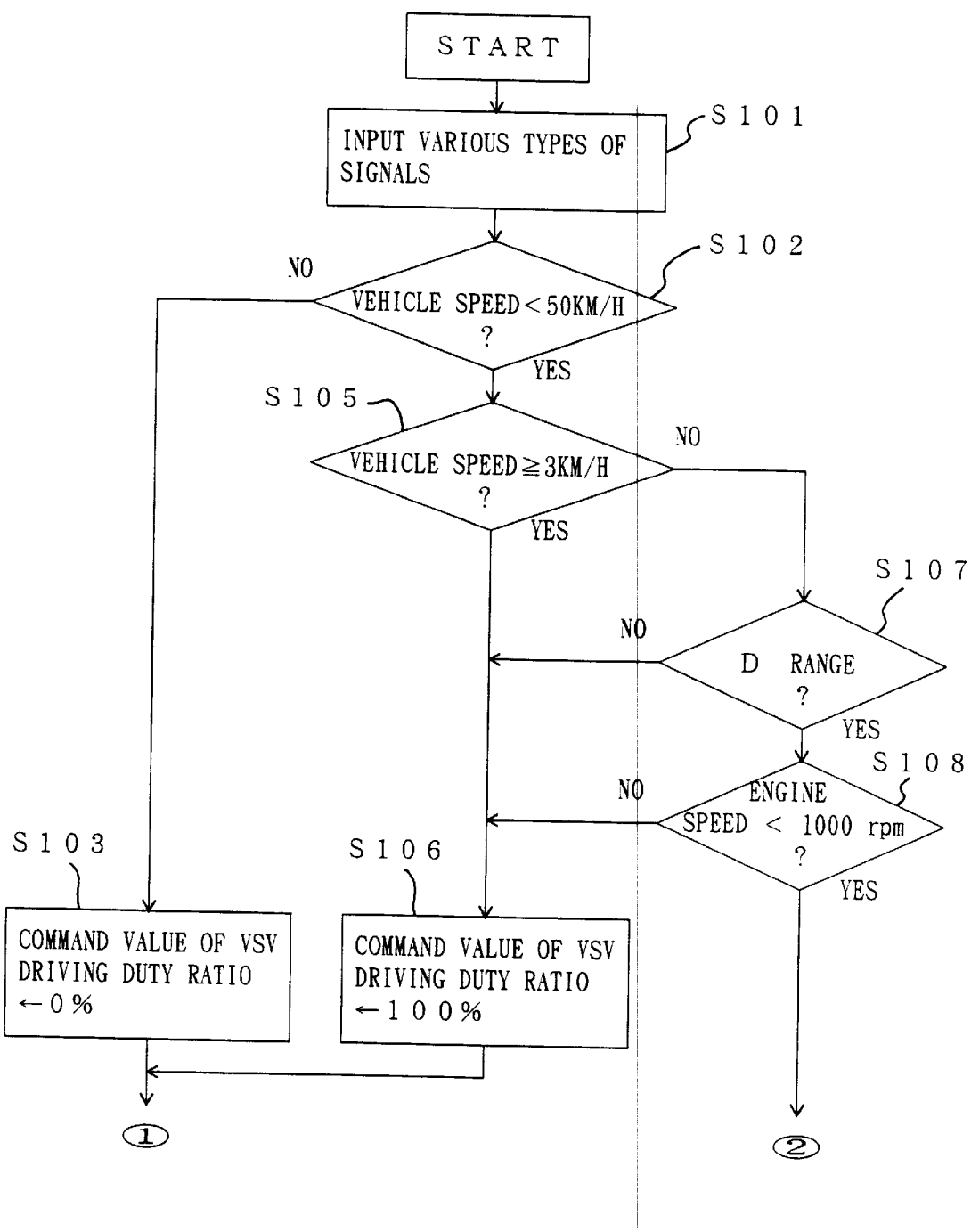
FIG. 6 is a flow chart showing the calculation handling routine of the VSV driving duty ratio according to a first embodiment.
Figure 7:
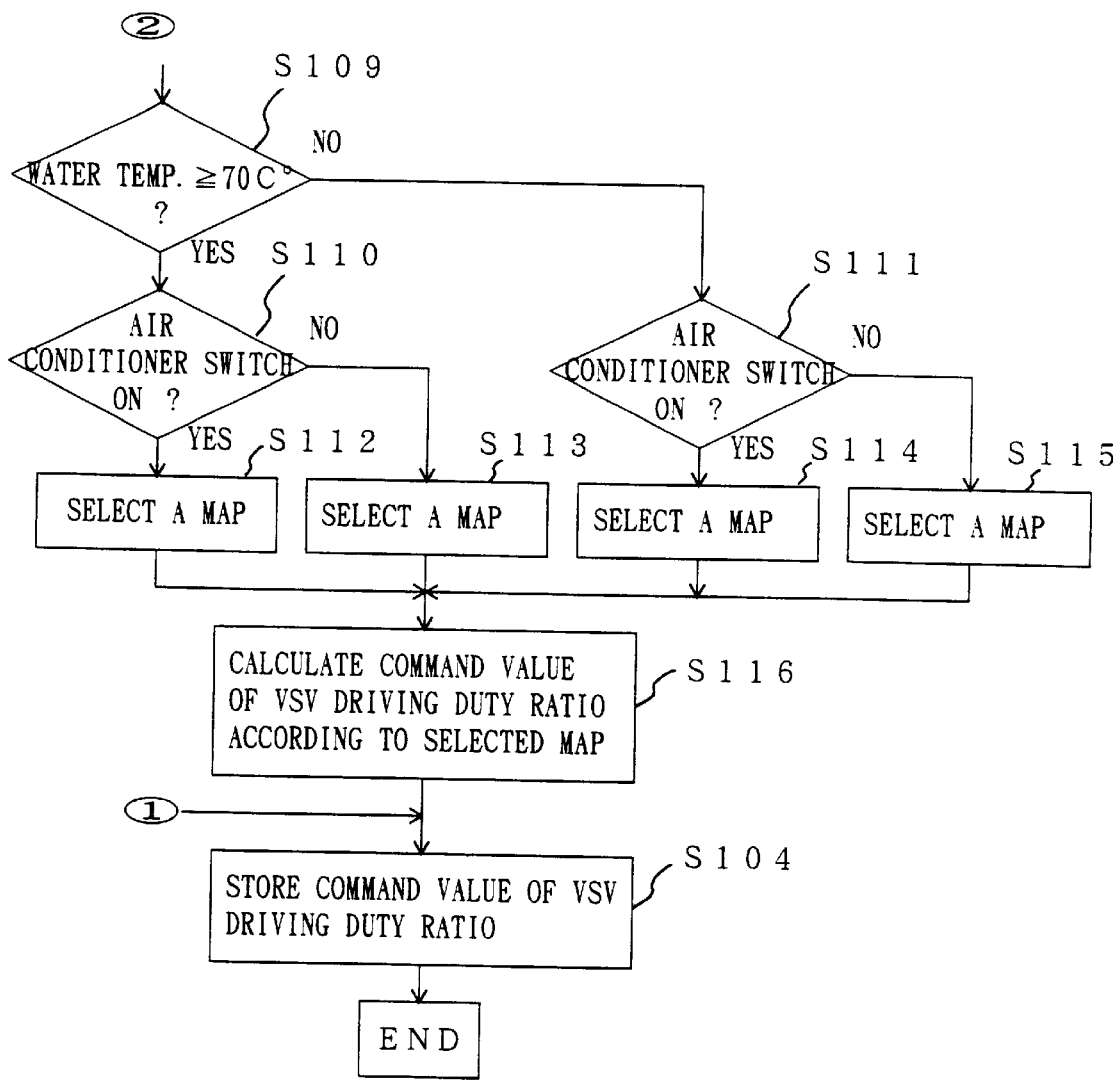
FIG. 7 is a flow chart showing the calculation handling routine of the VSV driving duty ratio according to the first embodiment.

Here, the process to calculate the VSV 47 driving duty ratio will be described on the basis of FIGS. 6, 7. FIGS. 6, 7 are flow charts showing the handling routine for calculating the VSV driving duty ratio. This handling routine is stored in the ROM 51, and is executed by the CPU 52 each time the crank position sensor 6 outputs a signal.

In the handling routine, at the S101 shown in FIG. 6, the CPU 52 inputs the output signals of the various types of sensors. At the S102, the CPU 52 judges whether the vehicle running speed is less than 50 km/h or not, on the basis of the output signal of the vehicle speed sensor 56 (vehicle running speed).

When the vehicle running speed is judged to be not less than 50 km/h at the S102, the CPU 52 considers that the vehicle is in a high speed running state, and advances to the S103, and after setting the VSV driving duty ratio to [0%], it advances to the S104 shown in FIG. 7.

At the S104, the CPU 52 writes the duty ratio: 0% set at the S103 in a specified area of the RAM 50. When the execution of the processing at the S104 has been finished, the CPU 52 finishes the execution of the present routine. After that, the CPU 52 reads out the duty ratio: 0% stored in the RAM 50, and applies a driving pulse signal corresponding to the duty ratio: 0% to the electromagnetic solenoid 47b of the VSV 47.

In this case, at the VSV 47, the intake and exhaust passage 43 and the atmosphere passage 44 lead to each other, and the atmosphere flows into the space portion 39b of the ACM 31. Consequently, the fluctuation of the volume of the space portion 39b becomes free, and the ACM 31 becomes softest and the amount of the ACM discharge air becomes [0].

When the vehicle running speed is judged to be less than 50 km/h at the S102, the CPU 52 considers that the vehicle is in a middle or low speed running state, or in a stopping state, and advances to the S105. At the S105, the CPU 52 judges whether the vehicle running speed is equal to or more than 3 km/h or not.

When the vehicle running speed is judged to be not less than 3 km/h at the S105, the CPU 52 considers that the vehicle is in a middle or low speed running state, and advances to the S106. At the S106, the CPU 52 sets the VSV driving duty ratio to [100%]. Then, the CPU 52 advances to the S104 shown in FIG. 7, and writes the duty ratio: 100% set at the S106 in a specified area of the RAM 50, and finishes the execution of the present routine. After that, the CPU 52 reads out the duty ratio: 100% stored in the RAM 50, and applies a driving pulse signal corresponding to the duty ratio: 100% to the electromagnetic solenoid 47b of the VSV 47.

In this case, at the VSV 47, the intake and exhaust passage 43 and the negative pressure passage 45 lead to each other, and the intake tube negative pressure is applied to the space portion 39b of the ACM 31. Consequently, the atmosphere in the space portion 39b is entirely discharged, and the volume of the space portion 39b becomes [0]. Consequently, the fluctuation of the volume of the space portion 39b becomes impossible, and the ACM 31 becomes hardest and the amount of the ACM discharge air becomes [0].

When the vehicle running speed is judged to be less than 3 km/h at the S105, the CPU 52 considers that the vehicle is in a stopping state or in a creeping speed running state and advances to the S107. The processing at the S107 and afterward is a processing having an object to restrain the transmission of the idling vibration of the internal combustion engine 1 to the body side, especially when the vehicle is in a stopping state. The reason thereof is that the idling vibration of the internal combustion engine 1 at the time of stopping of the vehicle is easily felt by the body of the crew of the vehicle. In other words, it is possible to attempt the improvement of the riding quality by suitably restraining the transmission of the idling vibration to the body side.

First, at the S107, the CPU 52 refers to the output signal value of the shift position sensor 57, and judges whether the shift lever of the automatic•transmission is positioned in the driving range or not, that is, whether the idling vibration of the internal combustion engine 1 is in a large state or not.

At the S107, when it is judged that the shift lever of the automatic•transmission is positioned in a range other than the driving range, the CPU 52 considers that the idling vibration of the internal combustion engine 1 is comparatively small, and advances to the S106.

On the other hand, at the S107, when it is judged that the shift lever of the automatic•transmission is positioned in the driving range, the CPU 52 considers that the idling vibration of the internal combustion engine 1 is comparatively large, and advances to the S108.

At the S108, the CPU 52 judges whether the engine speed is lower than 1000 rpm or not, that is, whether the engine speed is in a range where the speed can be considered as the idling speed or not, on the basis of the output signal of the crank position sensor.

At the S108, when it is judged that the engine speed is not less than 1000 rpm, the CPU 52 considers that the engine speed exceeds the range where the engine speed can be considered as the idling speed, and advances to the S106. On the other hand, when it is judged that the engine speed is lower than 1000 rpm, the CPU 52 considers that the engine speed is in the range where the engine speed can be considered as the idling speed, and advances to the S109 shown in FIG. 7.

At the S109, the CPU 52 judges whether the output signal value of the water temperature sensor 7 (temperature of the cooling water) is equal to or more than a specified temperature (for example, 70° C.) or not, that is, whether the internal combustion engine 1 is in the warming up state after the start-up, or in the state of finishing the warming up, or not.

At the S109, when the output signal value of the water temperature sensor 7 (temperature of the cooling water) is judged to be not less than 70° C., the CPU 52 considers that the internal combustion engine 1 is in the state of finishing the warming up, and advances to the S110. On the other hand, when the output signal value of the water temperature sensor 7 is judged to be less than 70° C., the CPU 52 considers that the internal combustion engine 1 is in the warming up state, and advances to the S111.

At the S110 and the S111, the CPU 52 judges whether the air conditioner is in the ON state or in the OFF state, on the basis of the output signal of the air conditioner switch 58.

At the S110, when it is judged that the air conditioner is in the ON state, the CPU 52 advances to the S112, and when it is judged that the air conditioner is in the OFF state, the CPU 52 advances to the S113. At the S111, when it is judged that the air conditioner is in the ON state, the CPU 52 advances to the S114, and when it is judged that the air conditioner is in the OFF state, the CPU 52 advances to the S115.

At the S112, the CPU 52 selects the map of FIG. 8 (a) from among the maps shown in FIGS. 8(a) to 8(d). At the S113, the CPU 52 selects the map of FIG. 8(b) from among the maps shown in FIGS. 8(a) to 8(d). At the S114, the CPU 52 selects the map of FIG. 8(c) from among the maps shown in FIGS. 8(a) to 8(d). At the S115, the CPU 52 selects the map of FIG. 8(d) from among the maps shown in FIGS. 8(a) to 8(d).

The maps shown in FIGS. 8(a) to 8(d) are maps showing the relation between the engine speed and the VSV driving duty ratio, and it is arranged that when the engine speed is specified, the VSV driving duty ratio is also specified.

The ratio of the change of the VSV driving duty ratio to the change of the engine speed is the same in all of the 4 pieces of maps. Furthermore, as for the VSV driving duty ratio specified by the same engine speed, the duty ratio calculated from the map of FIG. 8 (a) is largest, and the duty ratio becomes smaller in the order of FIG. 8(b), FIG. 8(c), and FIG. 8(d). The reason thereof is that the scale of the idling vibration is different according to the state of water temperature and the state of the air conditioner.

After finishing the execution of the processing of the S112, the S113, the S114, or the S115, the CPU 52 advances to the S116, and calculates the VSV driving duty ratio on the basis of the selected map and the engine speed. The duty ratio calculated here does not become [0%] and [100%], but becomes a value between 0% and 100%.

Next, at the S104, the CPU 52 writes the VSV driving duty ratio calculated at the 116 into a specified area of the RAM 50, and once finishes the execution of the present routine.

After that, the CPU 52 reads out the VSV driving duty ratio stored in the RAM 50, and applies a driving pulse signal corresponding to that VSV driving duty ratio to the electromagnetic solenoid 47b of the VSV 47.

In this case, the atmosphere and the intake tube negative pressure are alternately introduced into the space portion 39b of the ACM 31 at a specified ratio, and consequently, a specified amount of atmosphere is held in the space portion 39b, so that the ACM 31 may have a specified hardness and a specified amount of ACM discharge air may be produced.

Figure 10:
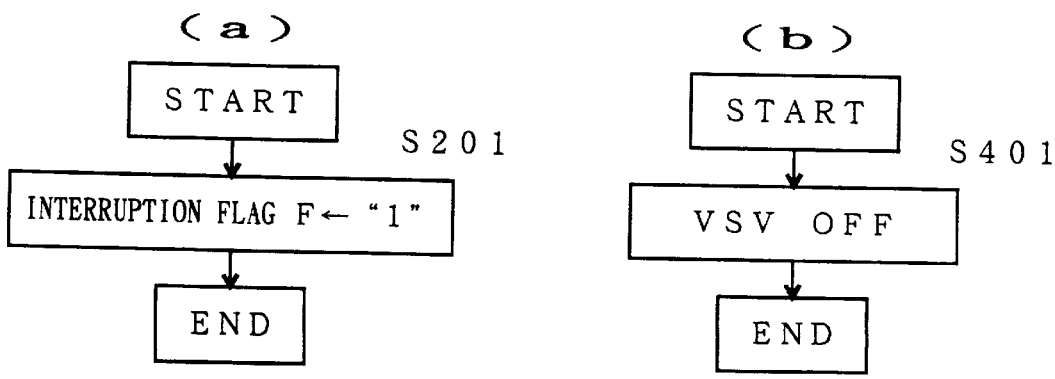
FIG. 10 is a flow chart showing the driving control process of the VSV.
Figure 11:
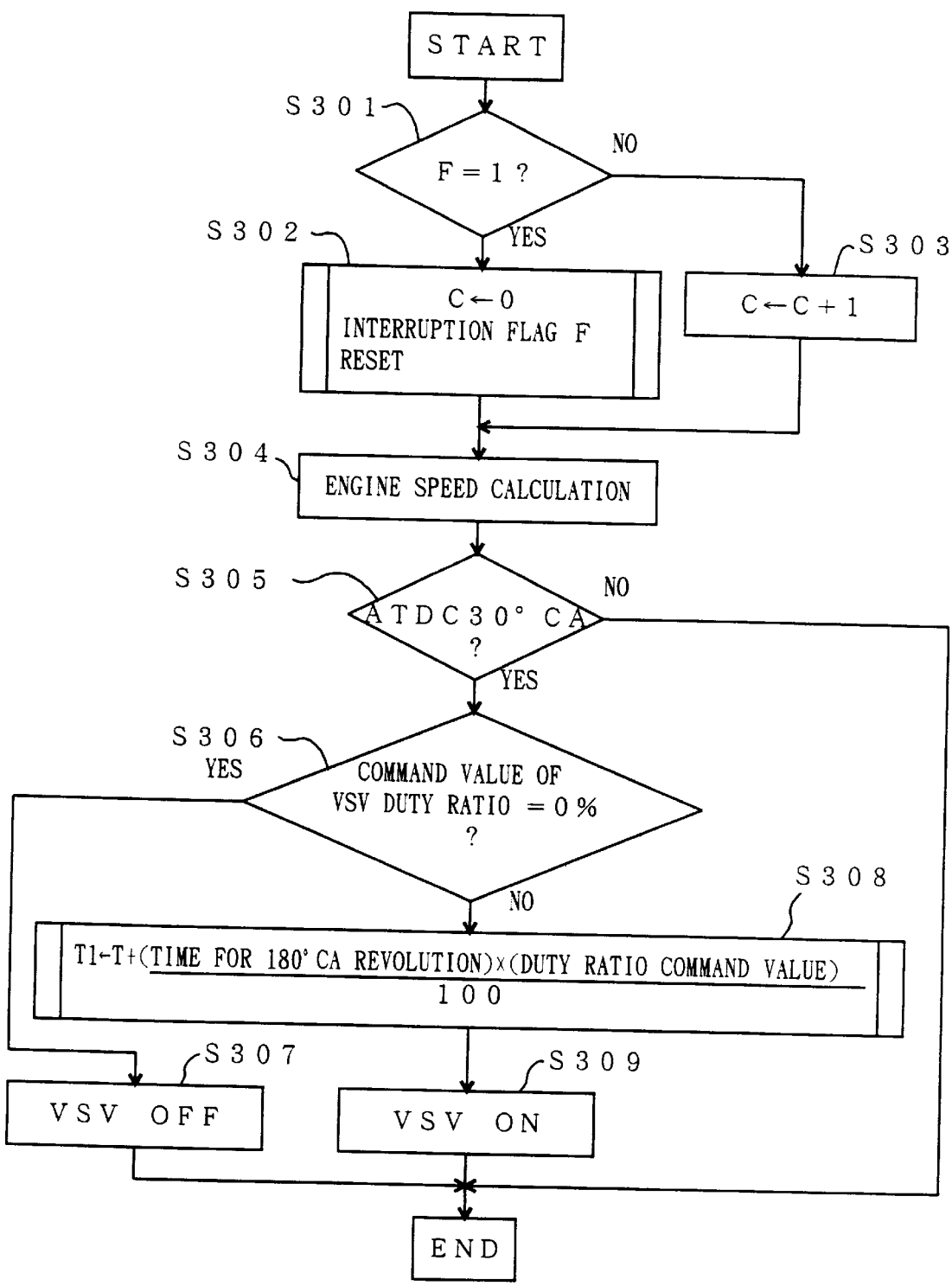
FIG. 11 is a flow chart showing the driving control process of the VSV.

Next, the driving process of the VSV 47 will be described on the basis of FIG. 10 and FIG. 11. FIG. 10(a) shows the handling routine for setting the interruption flag F, and FIG. 10(b) shows the handling routine for making the VSV 47 be in the non-driving state. FIG. 11 shows the handling routine for performing the driving control of the VSV 47. These handling routines are stored in the ROM 51 and performed by the CPU 52.

The handling routine shown in FIG. 10(a) is performed each time the cam position sensor 15 outputs a signal. In this handling routine, at the S201, the CPU 52 sets [1] in the memory area of the interruption flag F set in the RAM 50. Then, the CPU 52 once finishes the execution of the present routine.

The handling routine shown in FIG. 11 is performed by the interruption handling each time the crank position sensor 6 outputs a signal. In this handling routine, at the S301, the CPU 52 judges whether [1] is set in the memory area of the interruption flag F of the RAM 50 or not.

At the S301, when it is judged that [1] is set in the memory area of the interruption flag F of the RAM 50, the CPU 52 advances to the S302, and resets the counter C to [0] and at the same time, resets [0] in the memory area of the interruption flag F of the RAM 50.

On the other hand, at the S301, when it is judged that [1] is not set in the memory area of the interruption flag F of the RAM 50, the CPU 52 advances to the S303, and increases the value of the counter C by one.

Here, the counter C is a counter for detecting the rotational position of the crank shaft 5 on the basis of the count value thereof.

After finishing the execution of processing of the S302 or the S303, the CPU 52 advances to the S304, and calculates the engine speed on the basis of the output signal value of the crank position sensor 6.

At the S305, the CPU 52 refers to the count value of the counter C, and judges whether the crank shaft 6 is positioned at the 30° CA after the top dead center of the piston of a certain cylinder 2 or not. At the S305, when it is judged that the crank shaft 6 is not positioned at the 30° CA after the top dead center of the piston 3 of a certain cylinder 2, the CPU 52 once finishes the execution of the present routine.

On the other hand, at the S305, when it is judged that the crank shaft 6 is positioned at the 30° CA after the top dead center of the piston 3 of a certain cylinder 2, the CPU 52 advances to the S306, and judges whether the VSV driving duty ratio stored in the RAM 50 is [0%] or not.

At the S306, when it is judged that the VSV driving duty ratio stored in the RAM 50 is [0%], the CPU 52 advances to the S307. At the S307, the CPU 52 does not perform the applying of the driving pulse signal to the electromagnetic solenoid 47b of the VSV 47, and makes the VSV 47 be in the non-driving state. After the execution of the processing of the S307, the CPU 52 once finishes the execution of the present routine.

At the S306, when it is judged that the VSV driving duty ratio stored in the RAM 50 is not [0%], the CPU 52 advances to the S308. At the S308, the CPU 52 calculates the interruption execution time T1 of the next time by the handling routine shown in FIG. 10(b). This interruption time T1 is found in such a way that the value obtained by multiplying the time required for the revolution of 180° of the crank shaft 5 by the VSV driving duty ratio, is divided by [100], and the value obtained by that is added to the present time T (time when the crank shaft 5 is positioned, for example, at the 30° CA after the top dead center of the pistons of the first cylinder and the fourth cylinder).

After finishing the execution of the processing of the S308, the CPU 52 advances to the S309, and applies a driving pulse signal corresponding to the VSV driving duty ratio stored in the RAM 50 to the electromagnetic solenoid of the VSV 47. After making the VSV 47 be in the driving state like this, the CPU 52 once finishes the execution of the present routine.

Next, the handling routine shown in FIG. 10(b) is performed by the time interruption processing to the interruption time T1. In this handling routine, at the S401, the CPU 52 stops the applying of a driving pulse signal to the electromagnetic solenoid 47b of the VSV 47, and makes the VSV 47 be in a non-driving state.

Here, the transition of the driving state in the VSV 47 accompanied with the time elapse, based on the processing at the S308 and the S309 of the handling routine in FIG. 11 and the processing at the S401 in FIG. 10(b), will be described along the timing chart in FIG. 9.

Figure 9:
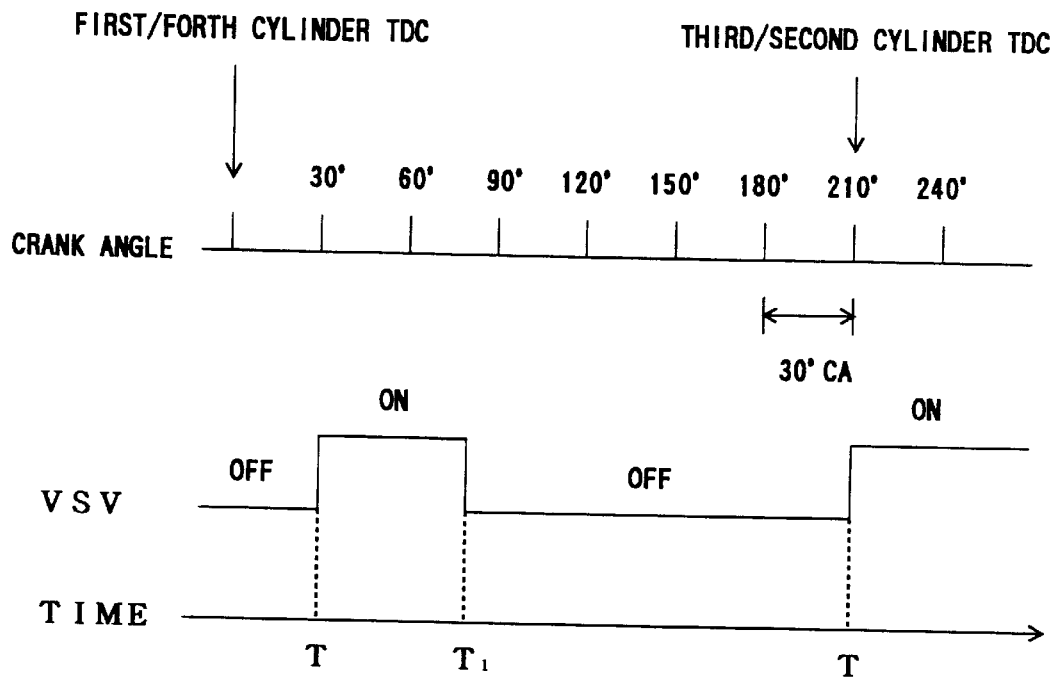
FIG. 9 is a timing chart showing the driving mode of the VSV.

As shown in FIG. 9, for example, when the crank shaft 5 is positioned at the 30° CA after the top dead center of the pistons of the first cylinder and the fourth cylinder, the VSV 47 becomes in the driving state. From this time (present time T) to the interruption time T1, the VSV 47 is held in the driving state.

When advancing from the 30° CA after the top dead center of the pistons of the first cylinder and the fourth cylinder by the 180° CA, the crank shaft 5 is positioned at the 30° CA after the top dead center of the pistons of the third cylinder and the second cylinder. From this time (present time T) to the interruption time T1 (not shown in the figure), the VSV 47 is held in the driving state.

The interruption time T1 to be the time when the driving of the VSV 47 finishes, changes according to the VSV driving duty ratio. For example, in a case where the VSV driving duty ratio is [0%], when an interruption time T1 is calculated at the S308 of the handling routine in FIG. 11, the interruption time T1 is the same time as the present time T (time between the present time T and the interruption time T1 is [0]). Therefore, just after the crank shaft 5 has been positioned at the 30° CA after the top dead center of the piston 3 of each cylinder 2, the interruption time T1 as the driving finishing time of the VSV 47 comes.

That is, even if the crank shaft 5 is positioned at the 30° CA after the top dead center of the piston 3 of each cylinder 2, the VSV 47 is not driven, and the non-driving state is held.

Furthermore, in a case where the VSV driving duty ratio is [50%], when an interruption time T1 is calculated at the S308 of the handling routine in FIG. 11, the interruption time T1 is a time obtained by adding the time required for the crank shaft 5 to advance through 90° CA, to the present time T. Therefore, when the crank shaft 5 has advanced to the 120° CA after the top dead center of the piston 3 of each cylinder 2, the interruption time T1 as the driving finishing time of the VSV 47 comes.

That is, when the crank shaft 5 has advanced to the 120° CA after the top dead center of the piston 3 of each cylinder 2, the VSV 47 moves from the driving state to the non-driving state.

In a case where the VSV driving duty ratio is [100%], when an interruption time T1 is calculated at the S308 of the handling routine in FIG. 11, the interruption time T1 is a time obtained by adding the time required for the crank shaft 5 to advance through 180° CA, to the present time T. Therefore, when the VSV 47 and the crank shaft 5 driven to the 30° CA after the top dead center of the piston 3 of specified cylinders (for example, the first cylinder and the fourth cylinder), have advanced to the 210° CA after the top dead center of the pistons 3 of the specified cylinders, the interruption time T1 as the driving finishing time of the VSV 47 comes.

However, since the 210° CA after the top dead center of the pistons 3 of the first cylinder and the fourth cylinder coincides with the 30° CA after the top dead center of the pistons 3 of the other cylinders (the second cylinder and the third cylinder), the VSV 47 does not become in the non-driving state, and the driving state is held.

Since the driving period of the VSV 47 is set as mentioned above, the atmosphere is held in the space portion 39b of the ACM 31 only when the gaseous mixture is exploded in the combustion chamber 8, in a case where the VSV driving duty ratio is a value between [0%] and [100%]. That is, only just after the time of explosion when the vibration becomes large, the hardness of the ACM 31 as a cushioning member becomes soft. Consequently, the vibration caused by the explosion of the gaseous mixture in each cylinder 2 is absorbed by the ACM 31, and it becomes possible to attempt more suitable decreasing of the idling vibration.

Figure 12:
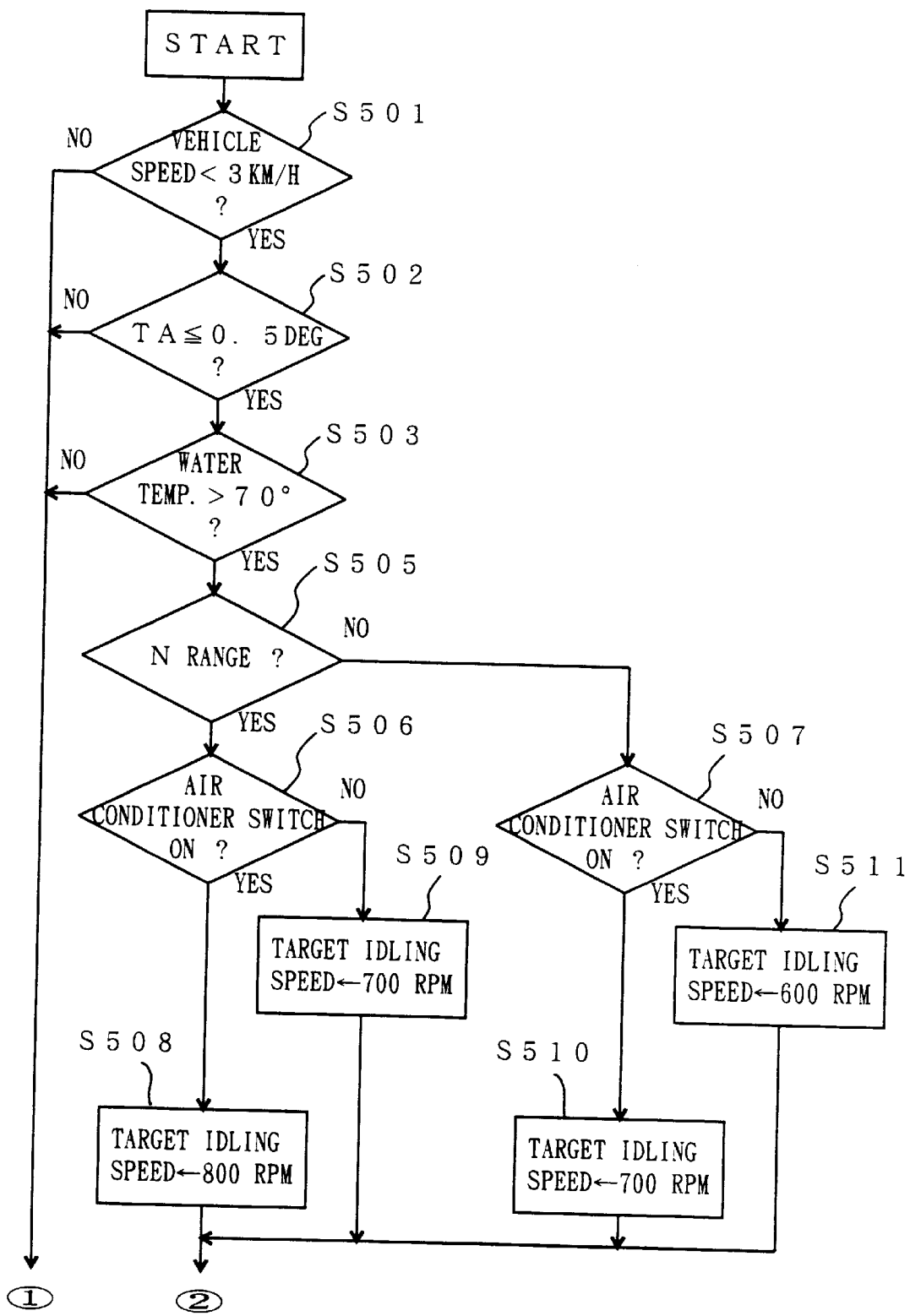
FIG. 12 is a flow chart showing the driving control process of the ISCV according to the first embodiment.
Figure 13:
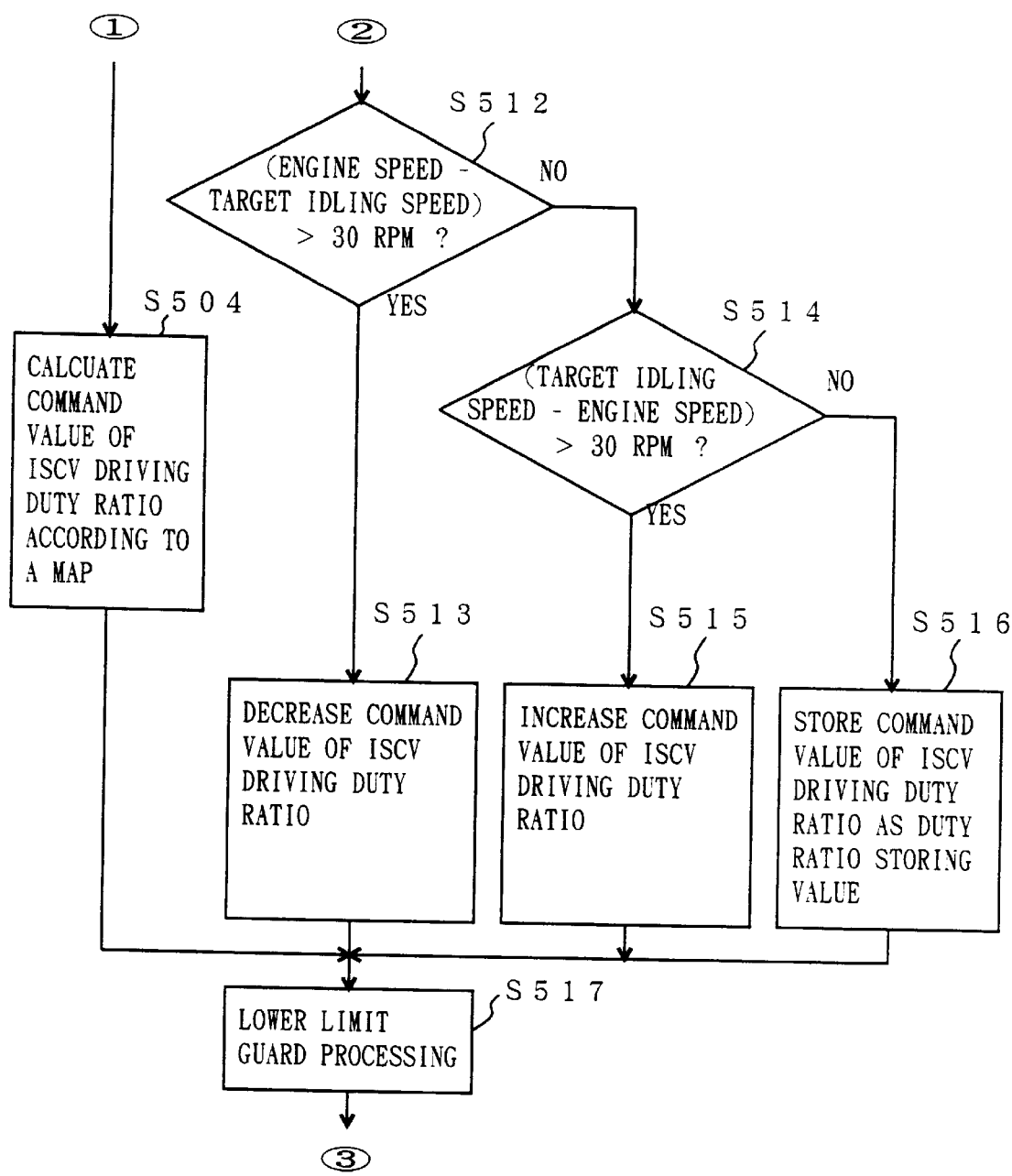
FIG. 13 is a flow chart showing the driving control process of the ISCV according to the first embodiment.
Figure 14:
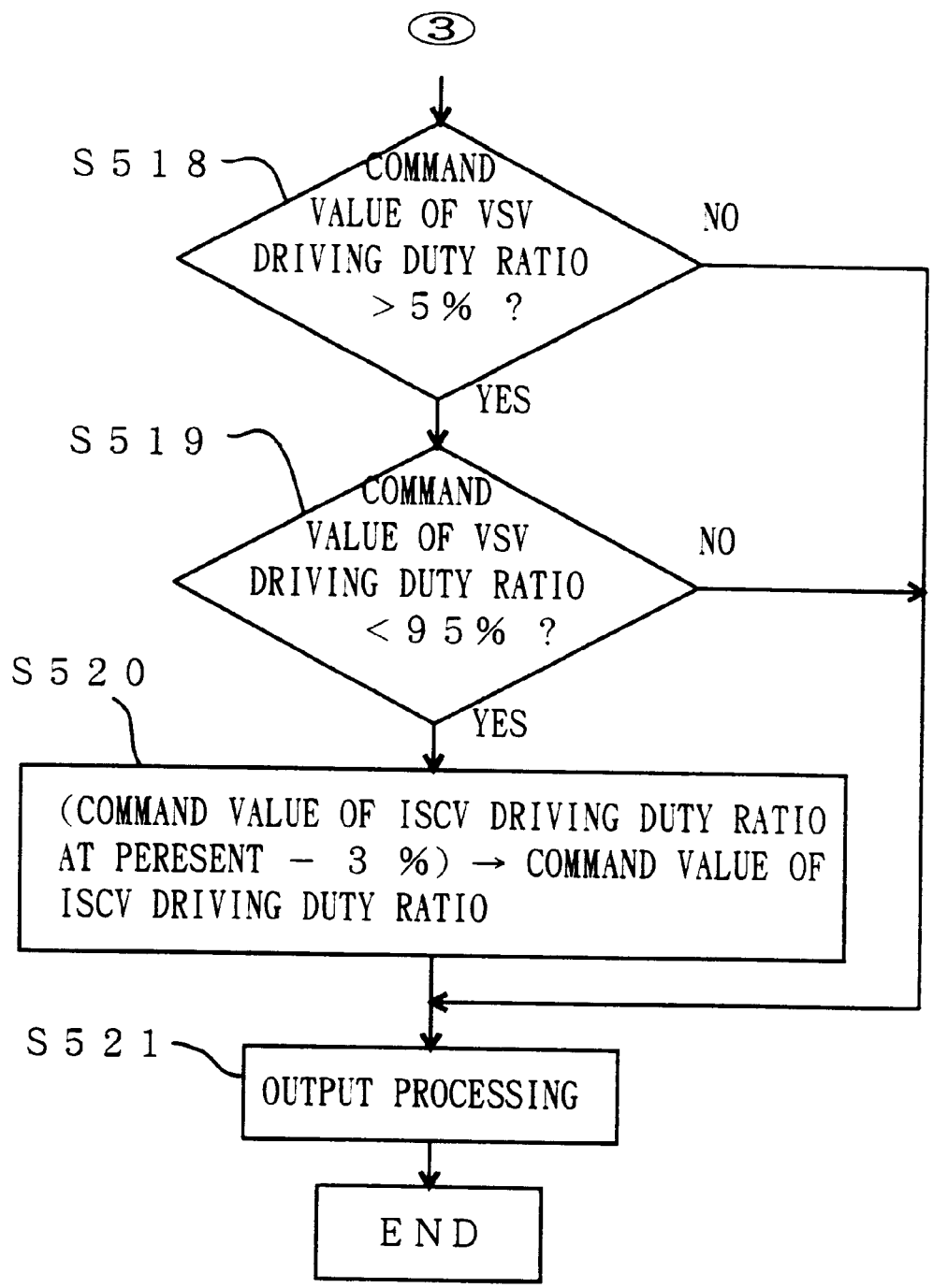
FIG. 14 is a flow chart showing the driving control process of the ISCV according to the first embodiment.

Next, the driving process of the ISCV 25 will be described on the basis of FIG. 12 to FIG. 14. FIG. 12 to FIG. 14 are flow charts showing a handling routine for performing the driving control of the ISCV 25. This handling routine is stored in the ROM 51, and is a routine performed by the CPU 52, for example, for every 100 ms.

In the present routine, first at the S501, the CPU 52 judges whether the vehicle running speed is less than 3 km/h or not. At the S501, when it is judged that the vehicle running speed is not less than 3 km/h, the CPU 52 advances to the S504 shown in FIG. 13, and when it is judged that the vehicle running speed is less than 3 km/h, the CPU 52 advances to the S502.

At the S502, the CPU 52 judges whether the opening TA of the throttle valve 21 is equal to or less than 0.5° or not, on the basis of the output signal value of the throttle position sensor 22.

At the S502, when it is judged that the opening TA of the throttle valve 21 is more than 0.5°, the CPU 52 advances to the S504 in FIG. 13, and when it is judged that the opening TA of the throttle valve 21 is not more than 0.5°, the CPU 52 advances to the S503.

At the S503, the CPU 52 refers to the output signal value of the water temperature sensor 7, and when it is judged that the temperature of the cooling water is not more than 70° C., the CPU 52 advances to the S504.

As an operational state of the vehicle in a case of being judged to advance to the S504 at the S501 to the S503, a state of running on a decreasing path in the state of the accelerator OFF, a state just after the cold start-up, or the like can be shown as an example.

At the S504, the CPU 52 refers to a map (not shown in the figure), and calculates the ISCV driving duty ratio by using the cooling water temperature, the vehicle running speed, the engine speed, and the like as parameters. Furthermore, the map is a map previously found by the experiment or the like so that a duty ratio suitable for the operational states of the vehicle and the internal combustion engine 1 may be calculated. After finishing the execution of the processing of the S504, the CPU 52 advances to the S517.

On the other hand, at the S503, when it is judged that the temperature of the cooling water is not less than 70° C., the CPU 52 advances to the S505. The processing shown in the S505 to the S516 shows the handling process in a case where a feedback control is performed so that the engine speed at the time of idling may be the desired target idling speed.

First, at the S505, the CPU 52 refers to the output signal of the shift position sensor 57, and judges whether the shift lever of the automatic•transmission is positioned in the neutral range or not.

At the S505, when it is judged that the shift lever of the automatic•transmission is positioned in the neutral range, the CPU 52 advances to the S506, and when it is judged that the shift lever is not positioned in the neutral range, the CPU 52 advances to the S507.

At the S506 and the S507, the CPU 52 refers to the output signal of the air conditioner switch 58, and judges whether the air conditioner is in the ON state or not. At the S506, when it is judged that the air conditioner is in the ON state, the CPU 52 advances to the S508, and when it is judged that the air conditioner is in the OFF state, the CPU 52 advances to the S509. Furthermore, at the S507, when it is judged that the air conditioner is in the ON state, the CPU 52 advances to the S510, and when it is judged that the air conditioner is in the OFF state, the CPU 52 advances to the S511.

When advancing to the S508, the CPU 52 sets the target idling speed to [800 rpm], and when advancing to the S509, the CPU 52 sets the target idling speed to [700 rpm]. Furthermore, when advancing to the S510, the CPU 52 sets the target idling speed to [700 rpm], and when advancing to the S511, the CPU 52 sets the target idling speed to [600 rpm].

When the target idling speed is set at either of the S508 to the S511, the CPU 52 advances to the S512 shown in FIG. 13. At the S512, the CU 52 subtracts the target idling speed from the actual engine speed at that time, and judges whether the value obtained by that is larger than 30 rpm or not.

At the S512, when it is judged that the value obtained by subtracting the target idling speed from the actual engine speed is larger than 30 rpm, the CPU 52 advances to the S513, and calculates a new ISCV driving duty ratio by subtracting a specified amount from the ISCV driving duty ratio used for the driving control of the ISCV 25 at that time.

On the other hand, at the S512, when it is judged that the value obtained by subtracting the target idling speed from the actual engine speed is not more than 30 rpm, the CPU 52 advances to the S514.

At the S514, the CU 52 subtracts the actual engine speed from the target idling speed, and judges whether the value obtained by that is larger than 30 rpm or not.

At the S514, when it is judged that the value obtained by subtracting the actual engine speed from the target idling speed is larger than 30 rpm, the CPU 52 advances to the S515, and calculates a new ISCV driving duty ratio by adding a specified amount to the ISCV driving duty ratio used for the driving control of the ISCV 25 at that time.

On the other hand, at the S514, when it is judged that the value obtained by subtracting the actual engine speed from the target idling speed is not more than 30 rpm, the CPU 52 advances to the S516, and considers that the ISCV driving duty ratio used for the driving control of the ISCV 25 at that time is a new ISCV driving duty ratio as it is.

The new ISCV driving duty ratio set at the S504, the S513, the S515, or the S516 is stored in a specified area of the RAM 50.

The ISCV driving duty ratio calculated by the present routine is a learned value, and is used in the cases where various types of controls are performed from this point on. Furthermore, it is also used in a case where the shift lever is shifted from another range to the neutral range, or is shifted from the neutral range to another range, and in a case where the air conditioner is shifted from the ON state to the OFF state, or is shifted from the OFF state to the ON state. That is, at the time of shifting the shifting lever or the air conditioner, since the target idling speed is changed, it is necessary to change the ISCV driving duty ratio, too, according to that. When the states of the shift lever and the air conditioner are changed, the CPU 52 reads out the ISCV driving duty ratio corresponding to the state after the change, and applies it to the electromagnetic solenoid 27 of the ISCV 25.

In the handling routine in FIG. 12 to FIG. 14, after setting a new ISCV driving duty ratio at the S513, S515, and S516, the CPU 52 advances to the S517. At the S517, the CPU 52 performs the lower limit guard processing of the ISCV driving duty ratio. That is, if the ISCV driving duty ratio at the time of performing the processing of the S517 is smaller than the lower limit guard value corresponding to the minimum effective opening of the ISCV 25 (in this case, 20%), the CPU 52 resets the lower limit guard value as the new ISCV driving duty ratio. On the other hand, when the ISCV driving duty ratio is larger than the lower limit guard value, the resetting processing of the ISCV driving duty ratio is not performed.

After performing the processing of the S517, the CPU 52 advances to the S518 shown in FIG. 14, and judges whether the VSV driving duty ratio calculated by the handling routine in the above mentioned FIG. 6 and FIG. 7 is larger than [5%] or not.

At the S518, when it is judged that the VSV driving duty ratio is not more than [5%], the CPU 52 advances to the S521, and when it is judged that the VSV driving duty ratio is larger than [5%], the CPU 52 advances to the S519.

At the S519, the CPU 52 judges whether the VSV driving duty ratio is smaller than [95%] or not, and when the VSV driving duty ratio is not less than [95%], the CPU 52 advances to the S521, and when the VSV driving duty ratio is smaller than [95%], the CPU 52 advances to the S520.

When the CPU 52 advances to the S520, the VSV driving duty ratio is a value between [5%] and [95%]. When the VSV 47 is driven by this VSV driving duty ratio, as mentioned in the description of FIG. 4, the amount of the ACM discharge air is increased. Therefore, at the S520, the CPU 52 subtracts a specified amount: [3%] from the ISCV driving duty ratio at that time, and sets a new ISCV driving duty ratio.

Next, at the S521, after applying a driving pulse signal corresponding to the ISCV driving duty ratio reset at the S520 to the electromagnetic solenoid 27 of the ISCV 25, the CPU 52 once finishes the execution of the present routine.

In a case where the amount of the ACM discharge air is increased like this, since the ISCV driving duty ratio is compensated to be decreased, the amount of air supplied to the internal combustion engine 1 by making a detour around the throttle valve 21, is not increased, and the rising of the engine speed caused by the increase of the amount of air is prevented.

As mentioned above, in a case where the ACM 31 is driven so that the amount of the ACM discharge air may be increased like the idling speed control device according to the present embodiment, the increase of the intake air amount of the internal combustion engine 1 can be prevented by decreasing the amount of air passing through the ISCV 25. Consequently, the rising of the engine speed caused by the increase of the amount of the ACM discharge air because of the operation of the ACM 31, is prevented, and it becomes possible to make the engine speed at the time of idling accurately converge on the target idling speed.

Furthermore, in the present embodiment, such an example that when the ACM discharge air is produced, the amount of air passing through the ISCV 25 is compensated to be decreased by subtracting 3% from the ISCV driving duty ratio, is described, but it is reasonable that the subtracting value is not limited to 3%.

Moreover, in the present embodiment, as the condition for subtracting 3% from the ISCV driving duty ratio, such a condition that the VSV driving duty ratio is a value in the range of 5% to 95% is shown as an example, but the value is not limited to the range of 5% to 95%.

Furthermore, in the present embodiment, at the handling routine in FIG. 12 to FIG. 14, an example of advancing to the S517 after performing the processing of the S504 is described, but it is also possible to advance to the S521 after performing the processing of the S504. In this case, when the feedback control for making the engine speed converge on the target idling speed is not performed, that is, when the processing of the S504 in FIG. 13 is performed, it is not performed to decrease the ISCV driving duty ratio by 3%.

In a case where the VSV driving duty ratio is, for example, a value between 5% and 95% and such a state that the ACM discharge air is not produced because of the breakdown of the ACM 31 or the like, is generated, there is a probability that by the handling routine according to the present embodiment, the intake air amount of the internal combustion engine 1 is decreased by the decreasing compensation of the ISCV driving duty ratio so that the internal combustion engine 1 may stop. On the other hand, if it is arranged that the processing of the S521 is performed after the processing of the S504 has been performed, it is not performed to decreasingly compensate the ISCV driving duty ratio when the feedback control is not performed.

In the present embodiment, as an idling speed control means, the ISCV is shown as an example, but it is also possible to use an electronic throttle valve instead of the ISCV. In short, such an arrangement that the intake air amount of the internal combustion engine 1 can be changed at the time of idling of the internal combustion engine 1, is suitable.

In the present embodiment, such an example that the final ISCV driving duty ratio is set after the lower limit guard processing has been performed, is described, but it is also possible to perform the lower limit guard processing after the final ISCV driving duty ratio has been set (for example, after the S520). In this case, the ISCV driving duty ratio is not below the lower limit guard value.

In the present embodiment, such an example that the atmosphere passage 44 connected to the VSV 47 is connected to the intake tube 18 on the upper stream side of the throttle valve 21, is described, but it is also possible that the opening end is located in the atmosphere.

In the present embodiment, as an air pressure actuation mechanism, the ACM 31 is shown as an example, but it is not limited to this, and for example, a brake booster using the intake tube negative pressure, or the like is also possible.

<Embodiment 2>

The second embodiment of the idling speed control device of an internal combustion engine according to the first invention will be described on the basis of FIG. 15 to FIG. 18. Here, only the arrangement different from that of the above mentioned first embodiment will be described, and the detailed description as for the similar arrangements will be omitted.

The present embodiment is different from the above mentioned first embodiment only in the handling routine for the driving control of the ISCV 25, and the other arrangements are similar to those of the above mentioned first embodiment.

Figure 15:
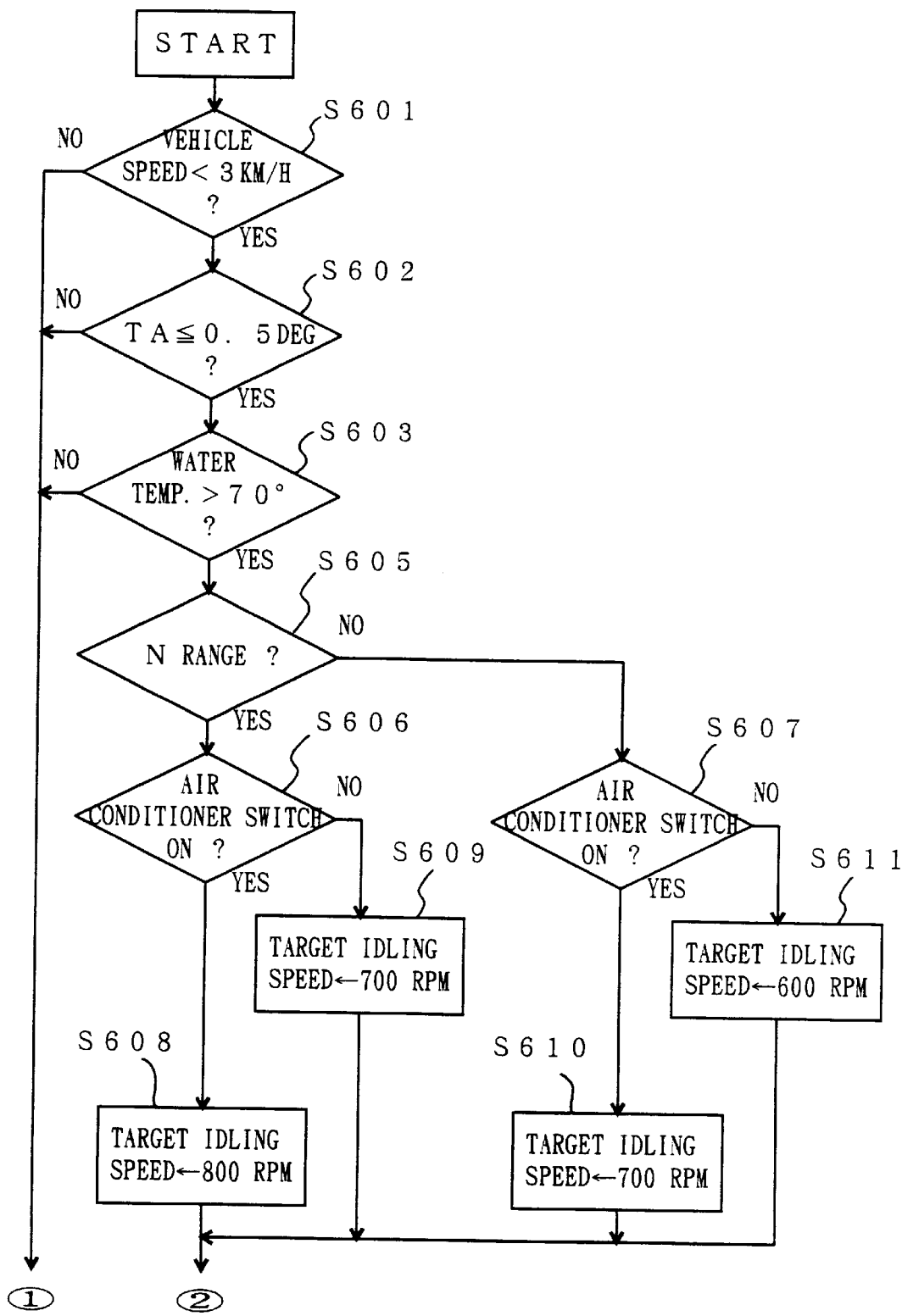
FIG. 15 is a flow chart showing the driving control process of the ISCV according to the second embodiment.
Figure 16:
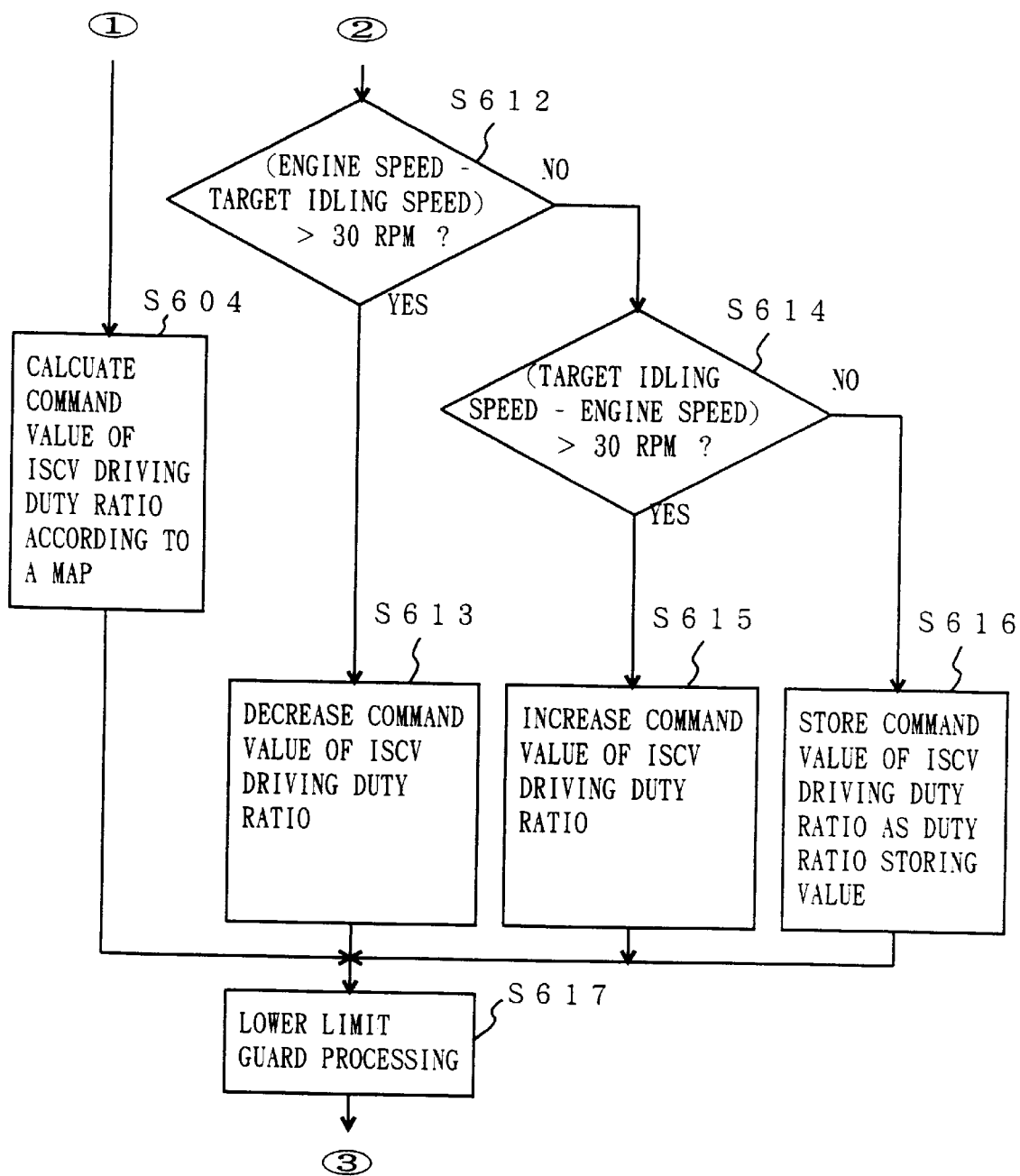
FIG. 16 is a flow chart showing the driving control process of the ISCV according to the second embodiment.
Figures 17, 18:
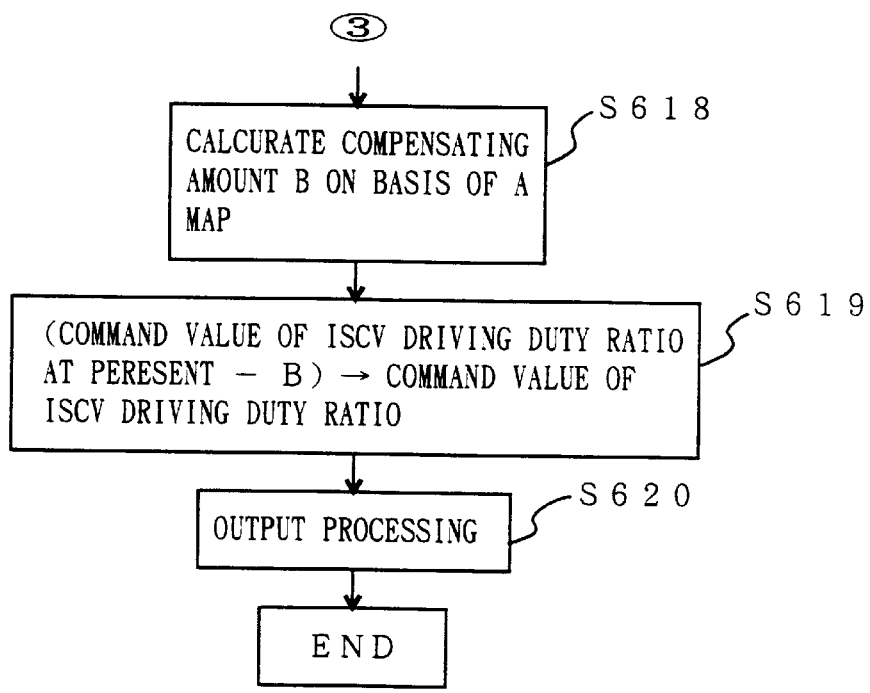
FIG. 17 is a flow chart showing the driving control process of the ISCV according to the second embodiment.
FIG. 18 is a definite example of a map to be seen at the time of calculation of the compensating amount of the ISCV driving duty ratio according to the second embodiment.

FIG. 15 to FIG. 17 are flow charts showing the handling routine for the driving control of the ISCV 25. This handling routine is performed by the CPU 52, for example, for every 100 ms.

Since the S601 to the S617 in the handling routine are similar to the S501 to the S517 in the handling routine according to the above mentioned first embodiment, the description will be omitted here.

After finishing the processing of the S617, the CPU 52 advances to the S618, and refers to a map shown in FIG. 18 to calculate the compensating amount B of the ISCV driving duty ratio corresponding to the VSV driving duty ratio. The transition of the change of the VSV driving duty ratio to the compensating amount B has a tendency similar to the transition of the amount of the ACM discharge air to the VSV driving duty ratio mentioned in the FIG. 4.

That is, when the VSV driving duty ratio is 0% or 100%, the compensating amount B of the ISCV driving duty ratio is [0]. When the VSV driving duty ratio is a value between 30% and 70%, the compensating amount B of the ISCV driving duty ratio is constant to the change of the VSV driving duty ratio and is the maximum value. When the VSV driving duty ratio is a value between 0% and 30%, the compensating amount B of the ISCV driving duty ratio is increased proportionally to the increase of the VSV driving duty ratio. When the VSV driving duty ratio is a value between 70% and 100%, the compensating amount B of the ISCV driving duty ratio is decreased inversely proportionally to the increase of the VSV driving duty ratio.

After finishing the execution of the processing of the S618, the CPU 52 advances to the S619, and calculates a new ISCV driving duty ratio by subtracting the compensating amount B from the ISCV driving duty ratio at that time.

The CPU 52 advances to the S620, and after applying a driving pulse signal corresponding to the ISCV driving duty ratio newly calculated at the S619 to the electromagnetic solenoid 27 of the ISCV 25, the CPU 52 once finishes the execution of the present routine.

In the handling routine according to the present embodiment, it is arranged that at the S618, the compensating amount B corresponding to the amount of the ACM discharge air is calculated, and that at the S619, a new ISCV driving duty ratio is calculated by subtracting the compensating amount B from the ISCV driving duty ratio at that time, and therefore, when controlling the opening of ISCV 25 in the closing direction on the basis of the occurrence of the ACM discharge air, it is possible to make the control amount thereof be a control amount suitable for the amount of the ACM discharge air.

Accordingly, when the ACM discharge air is produced, the engine speed can be made to converge on the target idling speed more suitably.

<Embodiment 3>

The third embodiment of the idling speed control device of an internal combustion engine according to the first invention will be described on the basis of FIG. 19 and FIG. 20. Here, only the arrangement different from that of the above mentioned first embodiment will be described, and the detailed description as for the similar arrangement will be omitted.

The present embodiment is different from the above mentioned first embodiment only in the handling routine for calculating the VSV driving duty ratio, and the other arrangements are similar to those of the above mentioned first embodiment.

Figure 19:
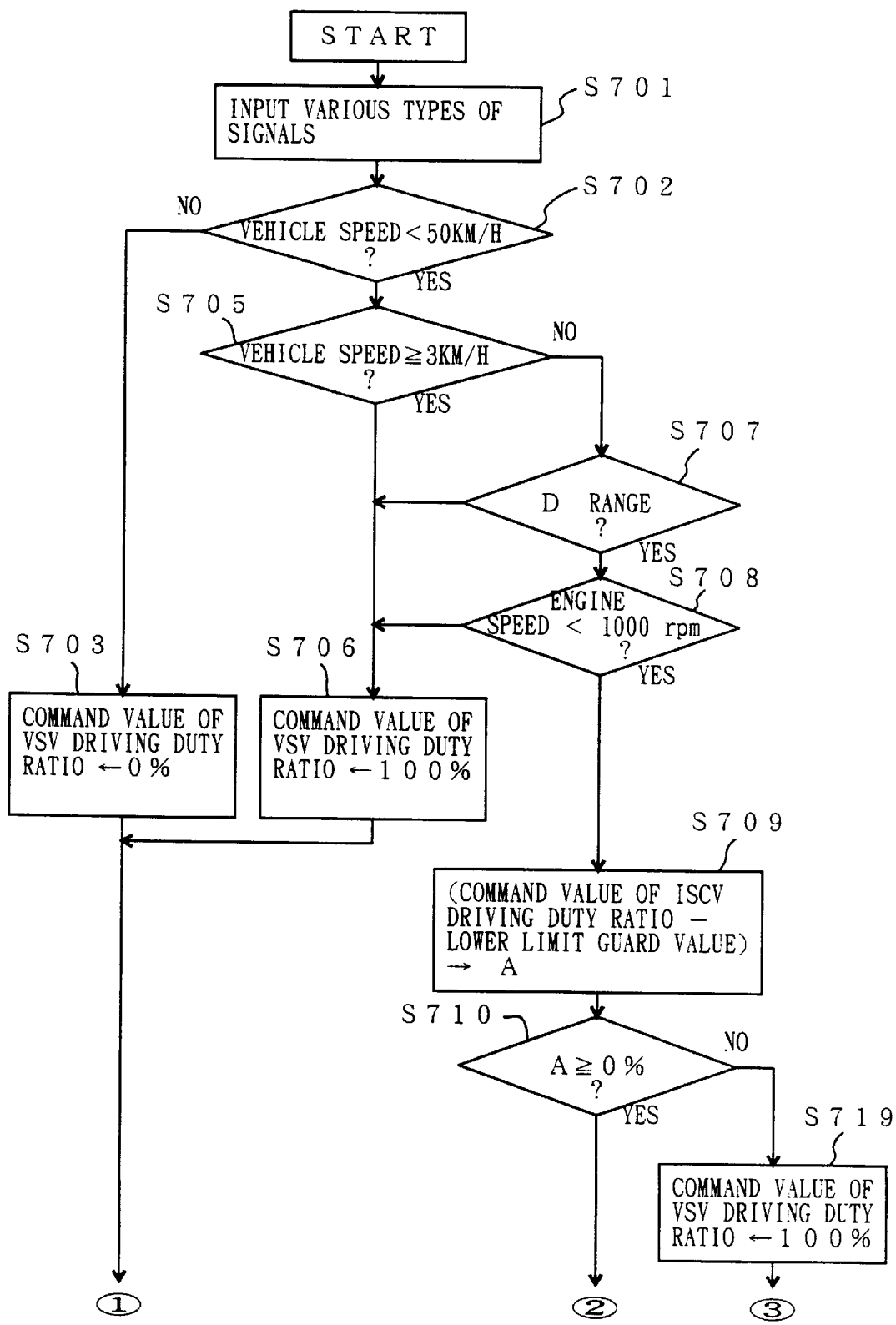
FIG. 19 is a flow chart showing the calculation handling routine of the VSV driving duty ratio according to the third embodiment.
Figure 20:
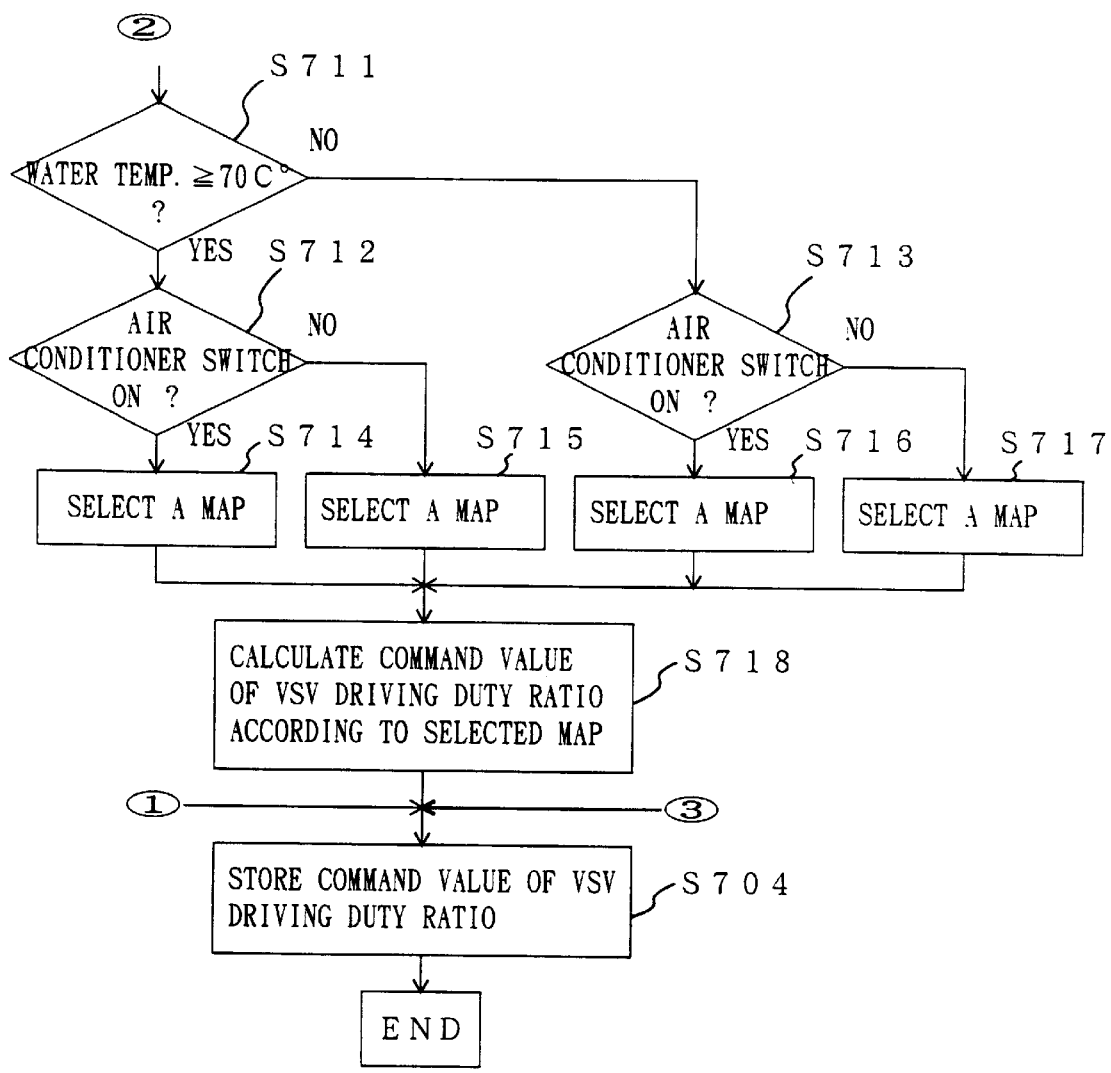
FIG. 20 is a flow chart showing the calculation handling routine of the VSV driving duty ratio according to the third embodiment.

FIG. 19 and FIG. 20 are the handling routine for calculating the VSV driving duty ratio. This handling routine is performed by the CPU 52 each time the crank position sensor 6 outputs a signal.

In the handling routine, since the S701 to the S708 are similar to the S101 to the S108 in the handling routine according to the above mentioned first embodiment, the description will be omitted here.

At the S708, when it is judged that the engine speed is lower than 1000 rpm, the CPU 52 advances to the S709, and sets the value obtained by subtracting the lower limit guard value (20%) from the ISCV driving duty ratio at that time, as the subtraction value A.

At the S710, the CPU 52 judges whether the subtraction value A set at the S709 is equal to or more than 0% or not, that is, whether the ISCV driving duty ratio calculated by the handling routine for the driving control of the ISCV 25 is smaller than the lower limit guard value or not.

At the S710, when it is judged that the subtraction value A is not less than 0%, the CPU 52 advances to the S711. The processing of the S711 to the S718 according to the present handling routine is similar to that of the S109 to the S116 of the handling routine according to the above mentioned first embodiment. That is, when the cooling water temperature of the internal combustion engine 1 is not less than 70° C. and the air conditioner is in the ON state, when the cooling water temperature is not less than 70° C. and the air conditioner is in the OFF state, when the cooling water temperature is less than 70° C. and the air conditioner is in the ON state, and when the cooling water temperature is less than 70° C. and the air conditioner is in the OFF state, the VSV driving duty ratio is calculated from an individual map, respectively.

On the other hand, at the S710, when it is judged that the subtraction value A is less than 0%, the CPU 52 advances to the S719, and sets the VSV driving duty ratio to [0%]. After finishing the execution of the processing of the S719, the CPU 52 advances to the S704. At the S719, by setting the VSV driving duty ratio to [0%], the VSV 47 is driven and controlled so that the ACM discharge air may not be produced. In this case, it does not occur for the opening of the ISCV 25 to be excessively controlled in the closing direction.

Supposing that the above mentioned driving control of the VSV 47 is not performed, the opening of the ISCV 25 is compensated on the basis of the ISCV driving duty ratio smaller than the lower limit guard value, and finally, the amount of air passing through the ISCV 25 reaches the lowest value. In this state, even if the opening of the ISCV 25 is further compensated in the closing direction, the amount of air passing through the ISCV 25 is not decreased, and the opening of the ISCV 25 reaches the minimum value.

Then, if the amount of the ACM discharge air becomes [0] in a state where the opening of the ISCV 25 has reached the minimum value, the opening of the ISCV 25 is compensated in the opening direction so as to ensure the air amount required by the internal combustion engine 1. However, since it takes some time for the opening of the ISCV 25 to return to a desired opening and for the intake air amount of the internal combustion engine 1 to be ensured, such a problem that the engine speed is dropped during that time to worsen the drivability, is produced.

However, in the present embodiment, when the need to make the ISCV driving duty ratio smaller than the lower limit guard value so that the engine speed at the time of idling may converge on the target idling speed, is produced, the opening of the ISCV 25 can be prevented from being excessively compensated in the closing direction and the drop of the engine speed as mentioned above can be prevented, by setting the VSV driving duty ratio to [0%] to make the amount of the ACM discharge air be [0].

According to the above mentioned embodiment, when the need to make the ISCV driving duty ratio smaller than the lower limit guard value, is produced, the VSV 47 is controlled so that the ACM discharge air may not be produced, and therefore, the opening of the ISCV 25 is not excessively compensated in the closing direction and the drop of the engine speed is restrained, and consequently, the worsening of the drivability is prevented.

Furthermore, in the present embodiment, when the need to make the ISCV driving duty ratio smaller than the lower limit guard value, is produced, the VSV driving duty ratio is set to [0%] to make the amount of the ACM discharge air be [0], but [100%] may be used instead of [0%].

Furthermore, in the present embodiment, when the need to make the ISCV driving duty ratio smaller than the lower limit guard value, is produced, the VSV driving duty ratio is set to [0%] to make the amount of the ACM discharge air be [0], but it is also possible to set the VSV driving duty ratio so that the amount of the ACM discharge air may be decreased. In this case, since the amount of air which should pass through the ISCV 25 is increased by the decrease of the amount of the ACM discharge air, the ISCV driving duty ratio becomes larger than the lower limit guard value, and the control of the ISCV 25 can be continued. Moreover, since the operation of the ACM 31 is continued, the worsening of the riding quality is restrained.

<Embodiment 4>

The fourth embodiment of the idling speed control device of an internal combustion engine according to the first invention will be described on the basis of FIG. 21 to FIG. 24. Here, only the arrangement different from that of the above mentioned first embodiment will be described, and the description as for the similar arrangements will be omitted.

The present embodiment is different from the above mentioned first embodiment in the handling routine for the driving control of the ISCV 25, and in the present embodiment, the handling routine to make the lower limit guard value corresponding to the opening of the ISCV 25 smaller than the usual value, is added.

Figure 21:
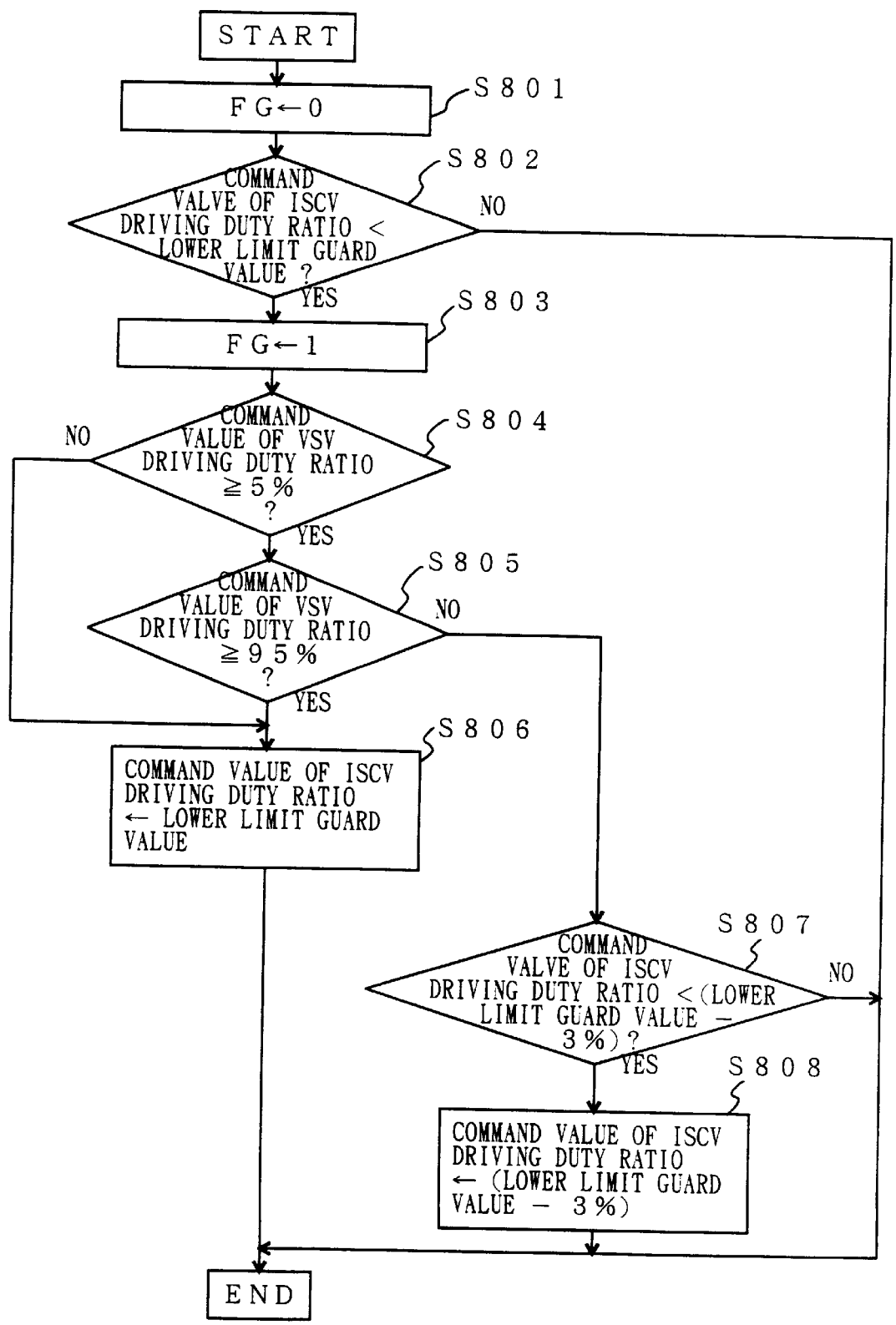
FIG. 21 is a flow chart showing the setting process of the lower limit guard value of the ISCV driving duty ratio according to the fourth embodiment.

FIG. 21 is a flow chart showing the handling routine to make the lower limit guard value smaller than the usual value. This handling routine is performed by the CPU 52 each time the crank position sensor 6 outputs a signal.

In the handling routine shown in FIG. 21, first at the S801, the CPU 52 writes [0] in the memory area of the guard flag FG set in a specified area of the RAM 50. At the S802, the CPU 52 judges whether the ISCV driving duty ratio at that time is smaller than the lower limit guard value (20%) or not.

When it is judged at the S802 that the ISCV driving duty ratio at that time is not less than the lower limit guard value (20%), the CPU 52 once finishes the execution of the present routine.

On the other hand, when it is judged at the S802 that the ISCV driving duty ratio at that time is smaller than the lower limit guard value (20%), the CPU 52 advances to the S803, and sets [1] in the memory area of the guard flag FG of the RAM 50.

At the S804, the CPU 52 judges whether the VSV driving duty ratio is equal to or more than 5% or not, and when the VSV driving duty ratio is smaller than 5%, it advances to the S806, and when the VSV driving duty ratio is equal to or more than 5%, it advances to the S805

At the S805, the CPU 52 judges whether the ISCV driving duty ratio is equal to or more than 95% or not. When it is judged at the S805 that the ISCV driving duty ratio is less than 95%, the CPU 52 advances to the S807. On the other hand, when it is judged at the S805 that the ISCV driving duty ratio is equal to or more than 95%, the CPU 52 advances to the S806.

When advancing to the S806, the CPU 52 resets the lower limit guard value as a new ISCV driving duty ratio. Furthermore, when advancing from the S805 to the S807, the CPU 52 judges at the S807 whether the difference between the ISCV driving duty ratio and the lower limit guard value is larger than 3% or not.

When it is judged at the S807 that the difference between the ISCV driving duty ratio and the lower limit guard value is within 3%, the CPU 52 once finishes the execution of the present routine.

On the other hand, when it is judged at the S807 that the difference between the ISCV driving duty ratio and the lower limit guard value is larger than 3%, the CPU 52 advances to the S808, and resets the value obtained by subtracting 3% from the lower limit guard value as the new ISCV driving duty ratio, and once finishes the execution of the present routine.

The CPU 52 performs the handling routine shown in FIG. 21, and consequently, the lower limit guard value of the ISCV driving duty ratio is decreased by a specified amount, under the condition that the amount of the ACM discharge air is increased, that is, that the VSV driving duty ratio is a value between 5% and 95%. The reason why the lower limit guard value of the ISCV driving duty ratio can be decreased like this, is that generally, the lower limit guard value of the ISCV driving duty ratio is set to the large side, considering the dimensional tolerance or the like at the time of manufacturing of the ISCV. Thus, by decreasing the lower limit guard value, the adjusting range of the ISCV 25 is widened, and consequently, the area in which the ACM 31 can be operated is widened.

Figure 22:
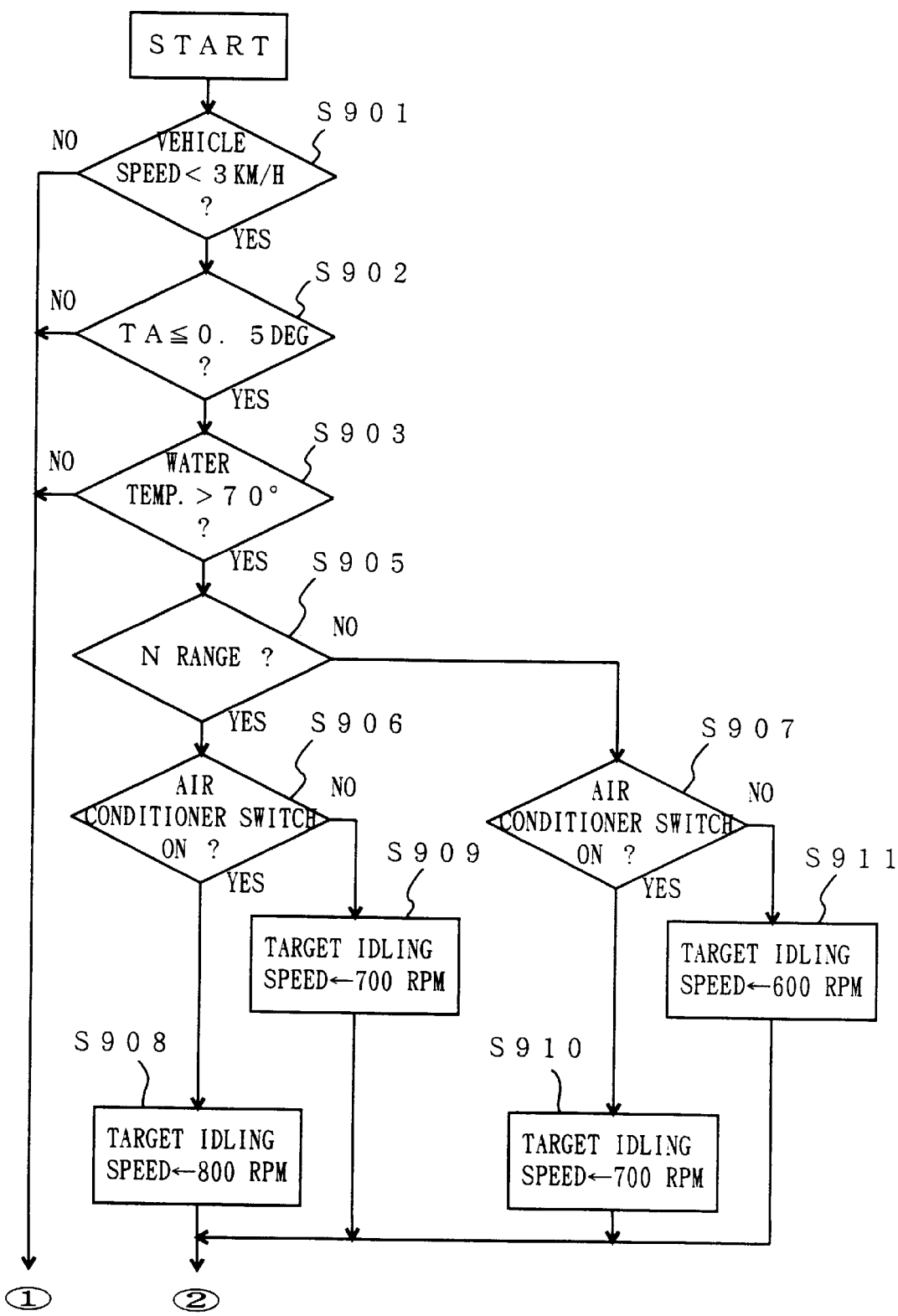
FIG. 22 is a flow chart showing the driving control process of the ISCV according to the fourth embodiment.
Figure 23:
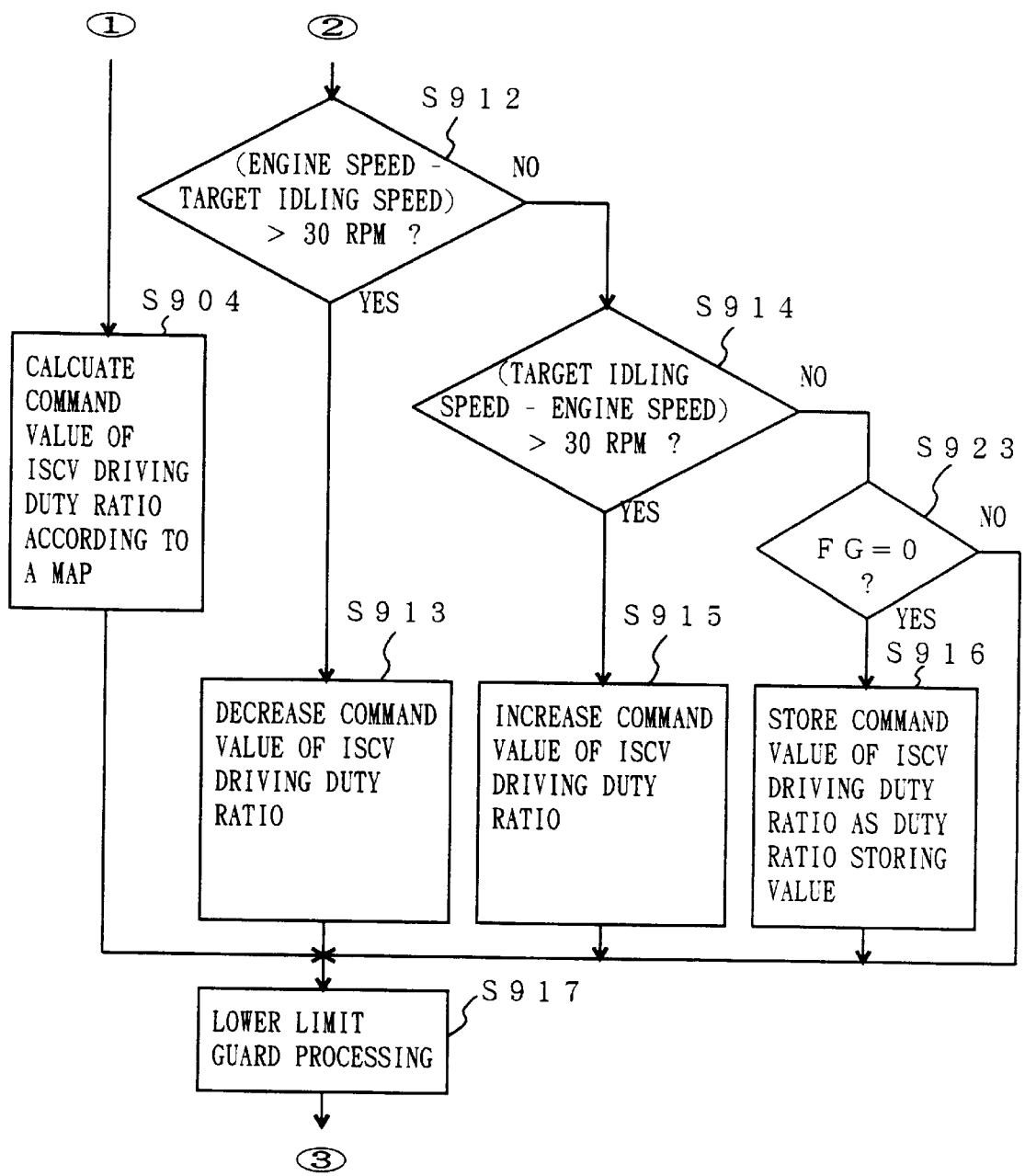
FIG. 23 is a flow chart showing the driving control process of the ISCV according to the fourth embodiment.
Figure 24:
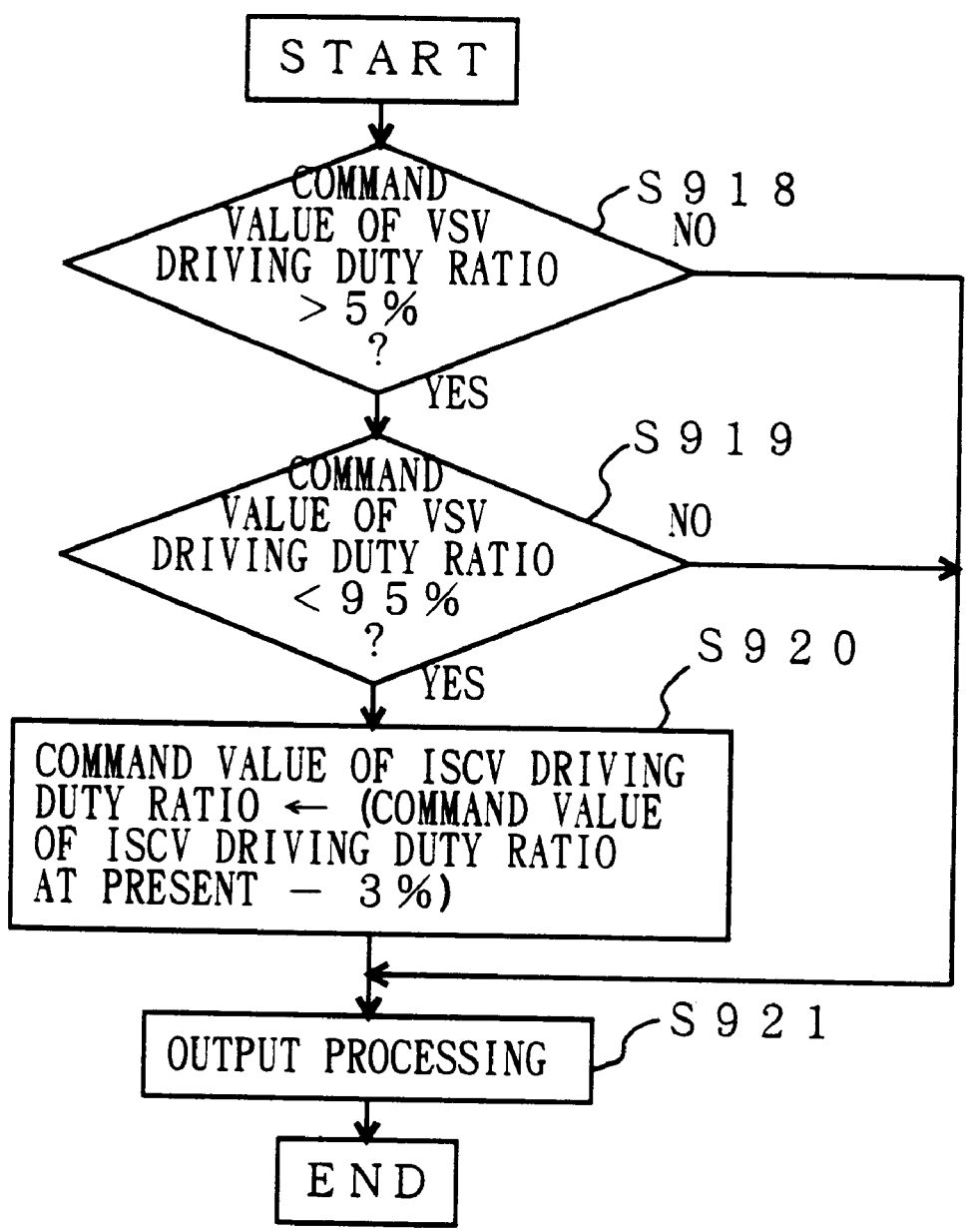
FIG. 24 is a flow chart showing the driving control process of the ISCV according to the fourth embodiment.

Next, the handling routine for the driving control of the ISCV 25 will be described on the basis of FIG. 22 to FIG. 24. Since the S901 to the S921 of this handling routine are similar to the S501 to the S521 of the handling routine according to the above mentioned first embodiment, the description will be omitted here.

The point different between the present routine and the handling routine according to the first embodiment, is such a point that the CPU 52 does not advance to the S916 but it advances to the S923 in a case where at the step S914, the value obtained by subtracting the actual engine speed from the target idling speed is judged to be not more than 30 rpm.

At the S923, the CPU 52 judges whether [0] is set in the memory area of the guard flag FG of the RAM 50 or not. When it is judged at the S923 that [0] is set in the memory area of the guard flag FG of the RAM 50, the CPU 52 advances to the S917 through the S916.

On the other hand, when it is judged at the S923 that [0] is not set in the memory area of the guard flag FG of the RAM 50, the CPU 52 does not perform the processing of the S916 and advances to the S917.

Furthermore, when advancing to the S916, the CPU 52 stores the ISCV driving duty ratio at that time in a specified area of the RAM 50. This duty ratio is a learned value, and is used when performing various types of controls from now on.

In a case where the lower limit guard value of the ISCV driving duty ratio is made to be smaller than the normal value (FG=[1]), since the opening control is performed in the area where the opening control of the ISCV 25 is not performed originally, there is such a risk that the engine speed becomes unstable. On the other hand, in the present embodiment, when the lower limit guard value of the ISCV driving duty ratio is made to be smaller than the normal value, [1] is set in the memory area of the guard flag FG, and while [1] is set in the memory area of the guard flag FG, the processing to store the ISCV driving duty ratio in the RAM 50, that is, the learning processing of the ISCV driving duty ratio is prohibited, and therefore, it does not occur that an unsuitable ISCV driving duty ratio is used as a learned value.

In the above mentioned embodiment, the lower limit guard value of the ISCV driving duty ratio is made to be smaller than the normal value by 3%, but it is natural that the value is not limited to this value. However, when changing the lower limit guard value, it is preferable that the changing amount is within 3%.

<Embodiment 5>

The fifth embodiment of the idling speed control device of an internal combustion engine according to the first invention will be described on the basis of FIG. 25 to FIG. 30.

Figure 25:
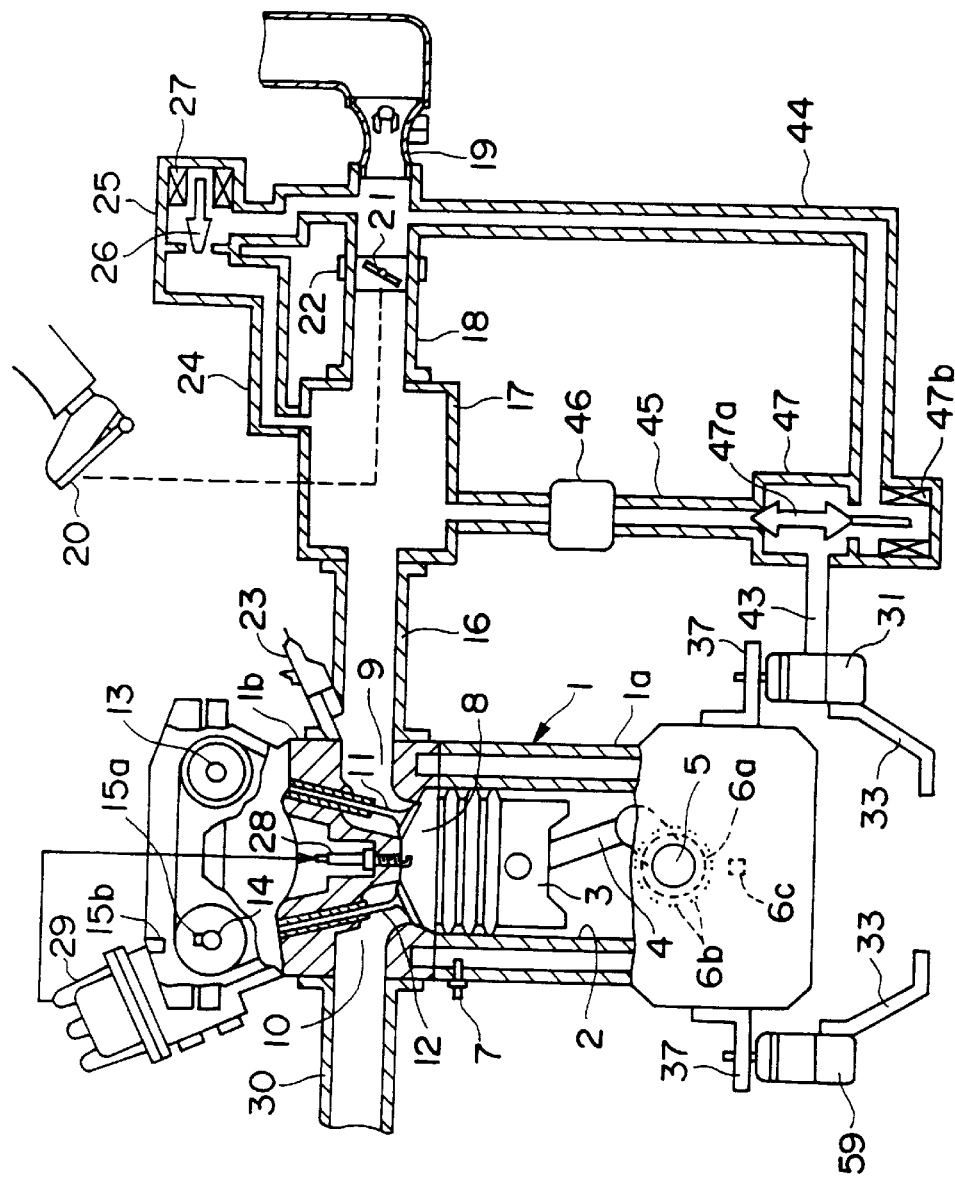
FIG. 25 is a figure showing the rough structure of an internal combustion engine to which the idling speed control device according to the fifth embodiment is applied.

FIG. 25 is a figure showing the rough arrangement of an internal combustion engine to which the idling speed control device according to the present embodiment is applied. In the above mentioned first embodiment, such an example that the internal combustion engine 1 is supported on the body side by a plurality of ACM's 31, is described, but in the present embodiment, the internal combustion engine 1 is supported on the body side by an ACM 31 and a normal engine mount 59. Specifically, in FIG. 25, a normal engine mount 59 is located on the left side of the internal combustion engine 1, and an ACM 31 is located on the right side of the internal combustion engine 1.

In this case, when performing the driving control of the VSV 47, the CPU 52 of the ECU 48 discriminates the direction of vibration of the internal combustion engine 1 produced by the burning of the gaseous mixture at each cylinder 2, from the ignition timing (or the timing of the explosion stroke) of each cylinder 2, and controls the VSV 47 so as to absorb the vibration in that direction of vibration.

For example, when it is assumed that the crank shaft 6 rotates in the clockwise direction in FIG. 25, the internal combustion engine 1 attempts to turn in the rotational direction of the crank shaft 5 for every explosion stroke of each cylinder 2, and therefore, at that time, a force in the compression direction is inputted to the ACM 31. In this case, the CPU 52 controls the VSV 47 so that the ACM 31 may performs a reduction action following the force in the compression direction. That is, the CPU 52 controls the VSV 47 so that the intake tube negative pressure may be applied after the atmosphere has been introduced to the space portion 39b.

When the internal combustion engine 1 turns in the opposite direction by the reaction of the turning, a force in the pulling direction is inputted to the ACM 31. In this case, the CPU 52 controls the VSV 47 so that the ACM 31 may perform an expansion action following the force in the pulling direction. That is, the CPU 52 controls the VSV 47 so that the atmosphere may be introduced after the intake tube negative pressure has been applied to the space portion 39b.

By making the ACM 31 perform the expansion and reduction actions as mentioned above, it becomes possible to suitably absorb the vibration produced because of the explosion the gaseous mixture.

The ISCV driving control and the VSV driving control according to the present embodiment will be more specifically described below.

Figure 26:
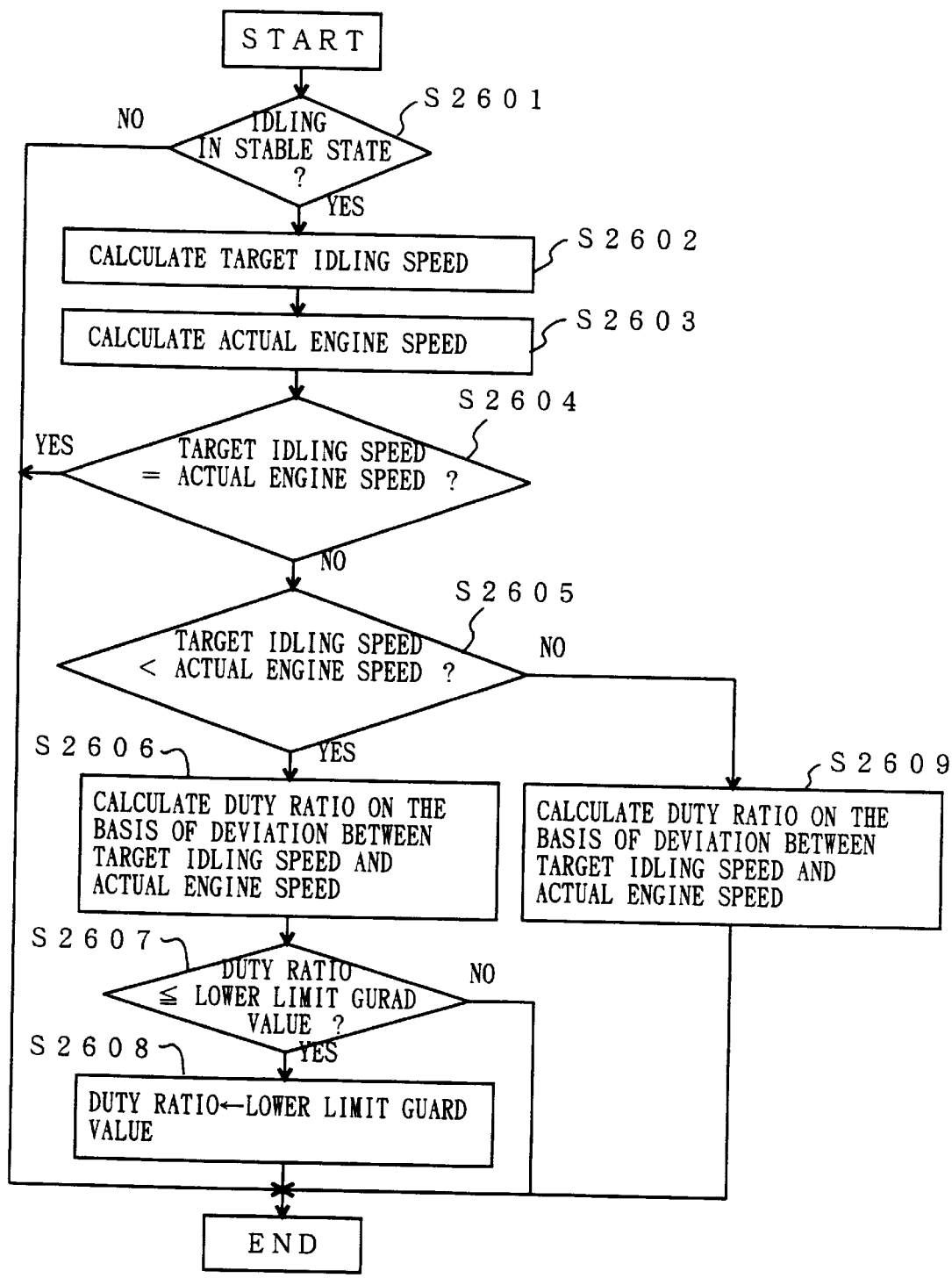
FIG. 26 is a flow chart showing the feedback control routine of an idling speed control valve.

The CPU 52 repeatedly performs the feedback control routine of the idling speed control valve shown in FIG. 26, and performs the control so that the idling speed of the internal combustion engine 1 may be a desired target idling speed.

In the feedback control routine of the idling speed control valve, at the S2601, the CPU 52 judges whether the idling state of the internal combustion engine 1 is stable or not. Specifically, the CPU 52 judges whether the idling state is stable or not, by judging whether a specified time has elapsed since the vehicle running speed became [0], or not, whether the cooling water temperature is equal to or more than a specified temperature or not, or the like.

When it is judged at the S2601 that the idling state is not stable, the CPU 52 once finishes the execution of the present routine, and when it is judged at the S2601 that the idling state is stable, the CPU 52 advances to the S2602.

At the S2602, the CPU 52 calculates a target idling speed corresponding to the operational state of the internal combustion engine 1. As parameters to discriminate the operational state of the internal combustion engine 1, there are, for example, the cooling water temperature, the battery voltage, the current consumer switch signals of electronic parts such as a compressor for an air conditioner or a head light, and the like.

At the S2603, the CPU 52 calculates the actual engine speed (hereafter, referred to simply as the actual speed) of the internal combustion engine 1 at that time, on the basis of the output signal of the crank position sensor 6.

At the S2604, the CPU 52 judges whether the target idling speed and the actual speed calculated at the S2602 and the S2603 coincide with each other or not.

When it is judged at the S2604 that the target idling speed coincides with the actual speed, the CPU 52 once finishes the execution of the present routine.

When it is judged at the S2604 that the target idling speed does not coincide with the actual speed, the CPU 52 advances to the S2605, and judges whether the actual speed is a speed higher than the target idling speed or not.

When it is judged at the S2605 that the actual speed is higher than the target idling speed, the CPU 52 advances to the S2606, and calculates a new ISCV driving duty ratio so as to decrease the actual speed to the target idling speed, from the deviation between the target idling speed and the actual speed.

Next, the CPU 52 advances to the S2607, and judges whether the ISCV driving duty ratio calculated at the S2606 is equal to or less than the lower limit guard value or not. When it is judged at the S2607 that the ISCV driving duty ratio is equal to or less than the lower limit guard value, the CPU performs the lower limit guard processing of the ISCV driving duty ratio.

Figure 27:
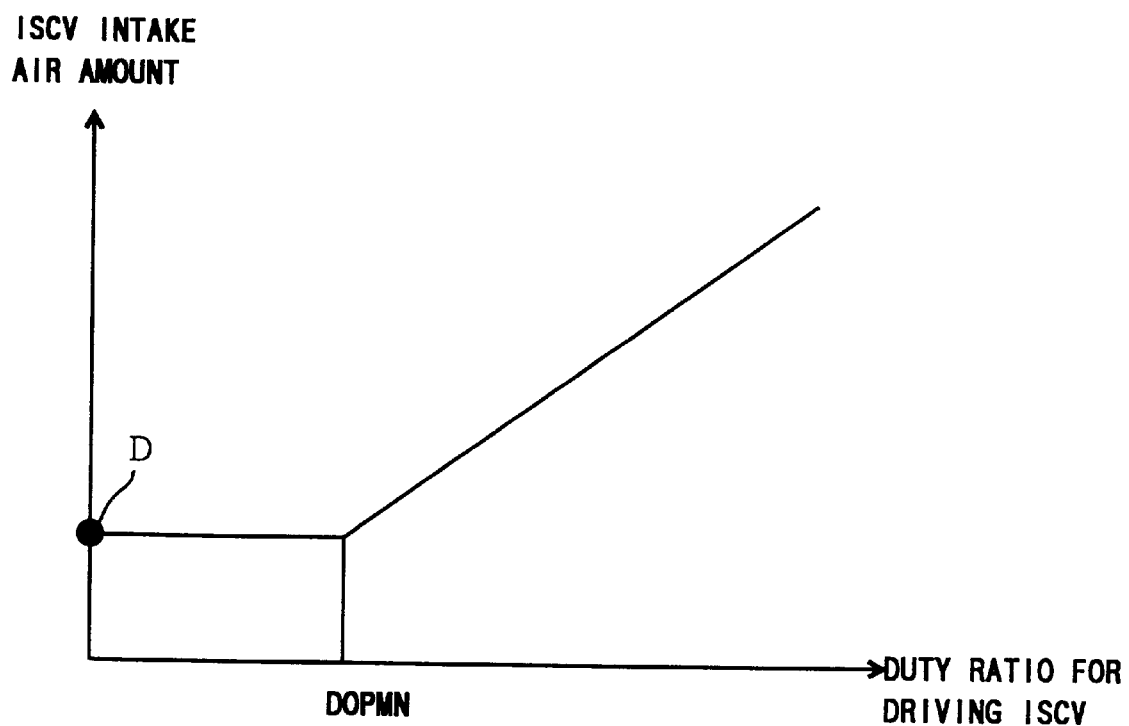
FIG. 27 is a figure describing the lower limit guard processing of the ISCV.

That is, as shown in FIG. 27, when the ISCV driving duty ratio becomes not more than the lower limit guard value: DOPMN, the CPU 52 sets such a duty ratio that the amount of air passing through the ISCV 25 becomes a fixed value: "D", as the ISCV driving duty ratio. When the ISCV driving duty ratio is set like this, the CPU 52 applies a driving pulse signal corresponding to the ISCV driving duty ratio to the electromagnetic solenoid 27 of the ISCV 25, and once finishes the execution of the present routine.

On the other hand, when it is judged at the S2607 that the ISCV driving duty ratio is larger than the lower limit guard value, the CPU 52 applies a driving pulse signal corresponding to the ISCV driving duty ratio to the electromagnetic solenoid 27 of the ISCV 25, and once finishes the execution of the present routine.

When it is judged at the S2605 that the actual speed is a speed lower than the target idling speed, the CPU 52 advances to the S2609, and calculates a new ISCV driving duty ratio so as to increase the actual speed to the target idling speed, from the deviation between the target idling speed and the actual speed. The CPU 52 applies a driving pulse signal corresponding to the new ISCV driving duty ratio to the electromagnetic solenoid 27 of the ISCV 25.

Figure 28:
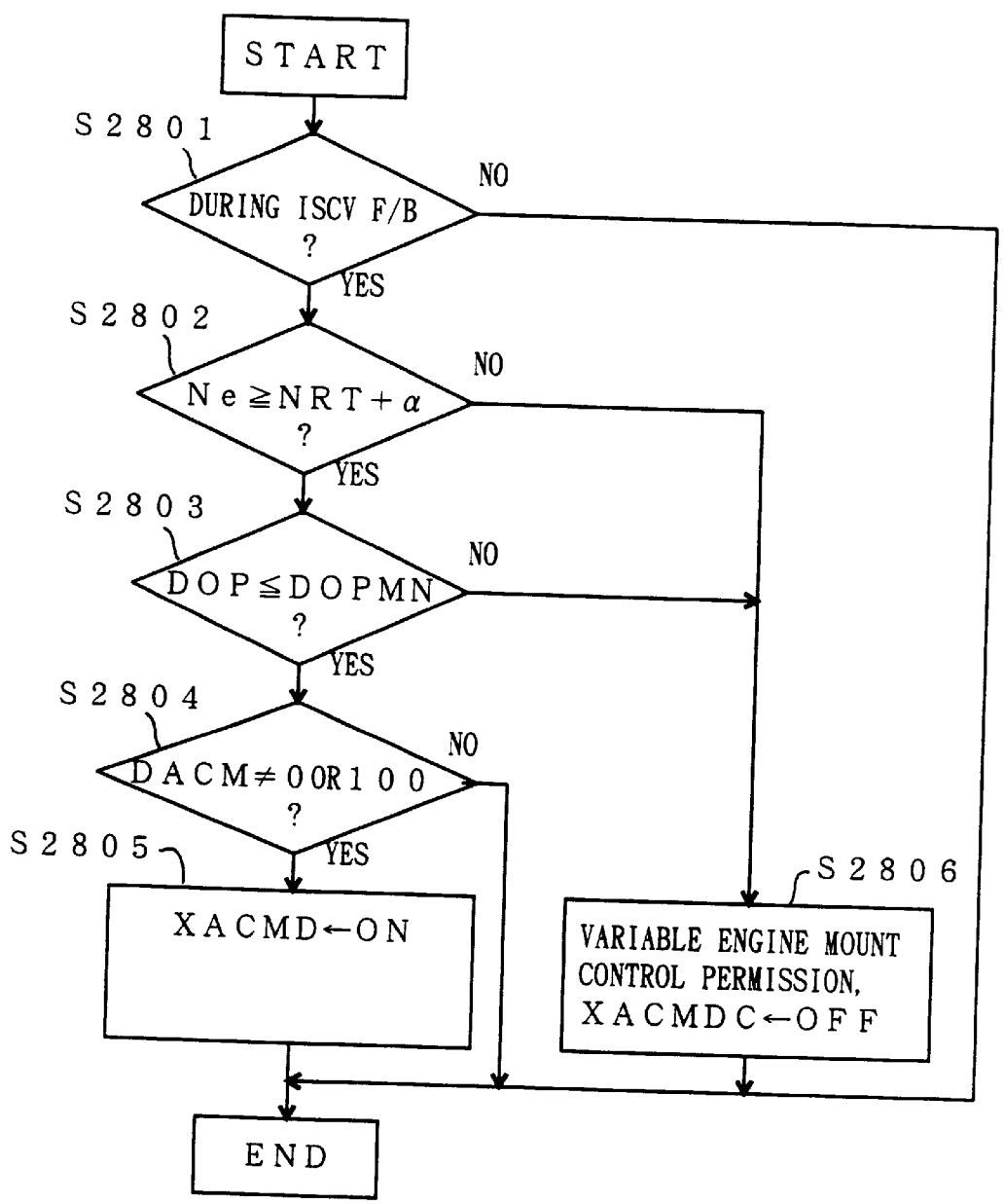
FIG. 28 is a flow chart showing the idling control routine.

Furthermore, at the time of idling of the internal combustion engine 1, the CPU 52 performs the idling control routine shown in FIG. 28. This idling control routine is a routine repeatedly performed for every specified time.

In the idling control routine, the CPU 52 judges whether the feedback control of the ISCV 25 is being performed at the S2801 or not, that is, whether the above mentioned feedback control routine of the idling speed control valve is being performed or not.

When it is judged at the S2801 that the feedback control routine of the idling speed control valve is not being performed, the CPU 52 once finishes the execution of the present routine, and when it is judged that the feedback control routine of the idling speed control valve is being performed, the CPU 52 advances to the S2802.

At the S2802, the CPU 52 compares the actual engine speed: Ne with the target idling speed: NRT calculated by the feedback control routine of the idling speed control valve, and judges whether the actual engine speed: Ne is higher than the target idling speed: NRT by a speed not less than a specified speed: α, or not.

When it is judged at the S2802 that the actual engine speed: Ne is higher than the target idling speed: NRT by a speed not less than a specified speed: α, the CPU 52 advances to the S2803, and judges whether the ISCV driving duty ratio: DOP is equal to or less than the previously set lower limit value: DOPMN or not, that is, whether the opening of the ISCV 25 is equal to or less than the previously set minimum opening or not.

When it is judged at the S2803 that the ISCV driving duty ratio: DOP is equal to or less than the lower limit value: DOPMN, the CPU 52 judges whether the VSV driving duty ratio is a value other than [0%] and [100%] or not.

When it is judged at the S2804 that the VSV driving duty ratio is a value other than [0%] and [100%], that is, when it judged that the atmosphere and the intake air negative pressure are alternately introduced into the ACM 31, the CPU 52 advances to the S2805, and sets the ACM idling control restraint flag: XACMDC at ON, and once finishes the execution of the present routine.

On the other hand, when it is judged at the S2802 that the actual engine speed: Ne is not higher than the target idling speed: NRT by a speed not less than a specified speed: α, or when it is judged at the S2803 that the ISCV driving duty ratio: DOP is larger than the lower limit value: DOPMN, the CPU 52 advances to the S2806, and sets the ACM idling control restraint flag: XACMDC at OFF, and permits the normal control of the ACM 31.

Furthermore, when it is judged at the S2804 that the VSV driving duty ratio is [0%] or [100%], the CPU 52 judges that in the ACM 31, the changing control between the introduction of atmosphere and the introduction of intake air negative pressure is stopped (the state of the introduction of atmosphere or the state of the introduction of intake air negative pressure is fixed), and once finishes the execution of the present routine.

Figure 29:
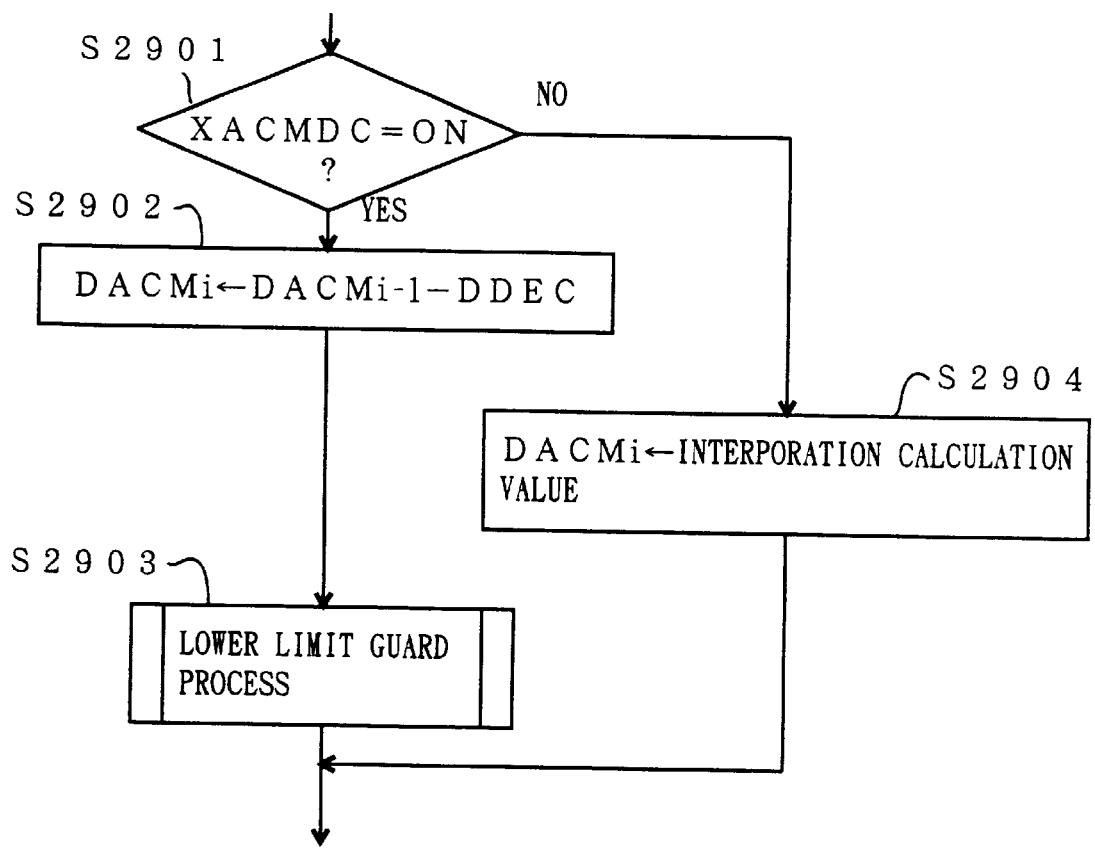
FIG. 29 is a flow chart showing the renewal routine of the idling control value of the ACM.
Figure 30:
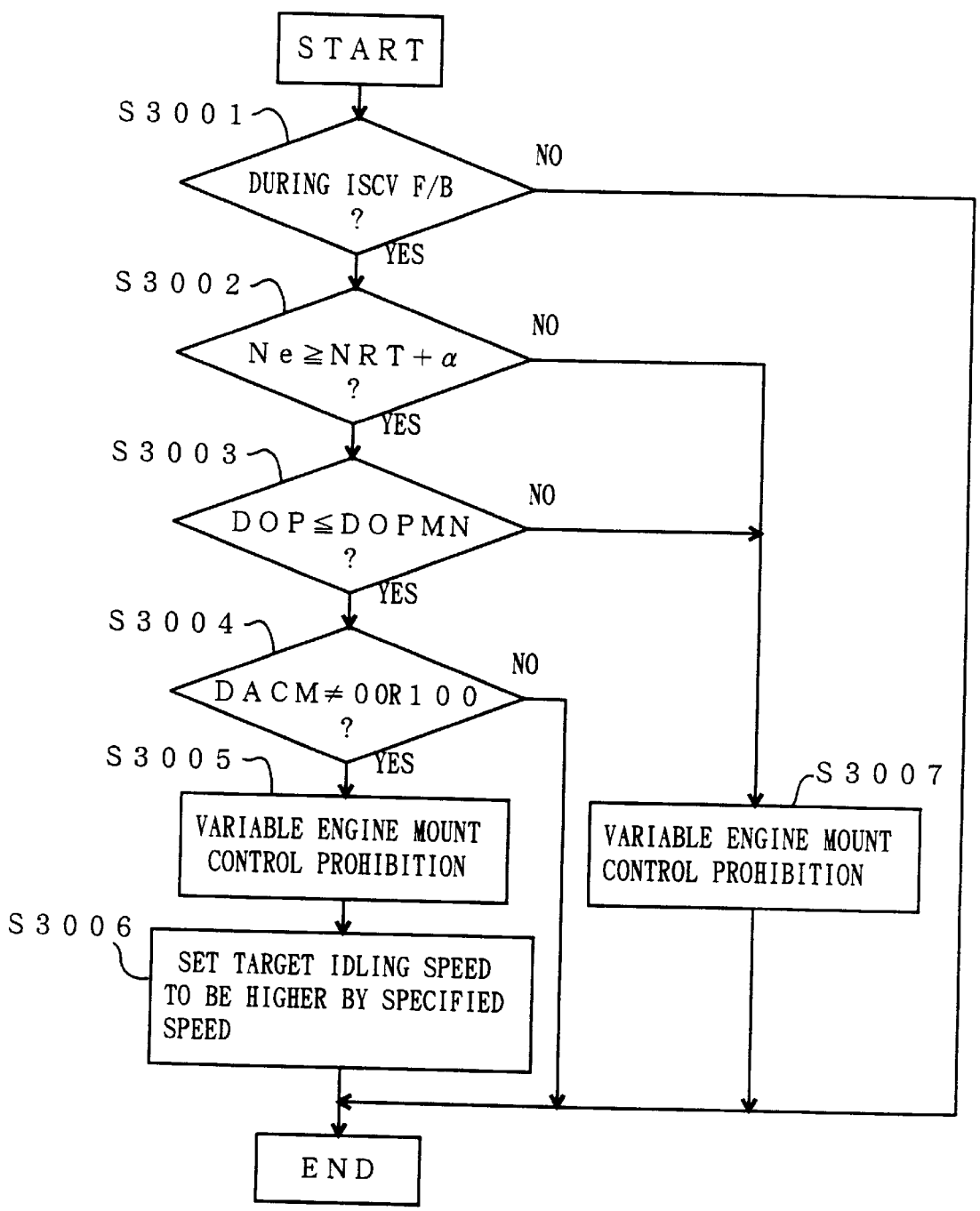
FIG. 30 is a flow chart showing another definite example of the idling control routine.

Next, the CPU 52 performs the renewal routine of the idling control value of the ACM 31 shown in FIG. 29. In this routine, at the S2901, the CPU 52 judges whether the ACM idling control restraint flag: XACMDC is set at ON or set at OFF.

When it is judged at the S2901 that the ACM idling control restraint flag: XACMDC is set at ON, the CPU 52 advances to the S2902, and changes the previously set map value, that is, the VSV driving duty ratio to the learned value.

Since in the map, for example, the duty ratios corresponding to the operational state of the internal combustion engine 1 are set, the CPU 52 judges the operational state of the internal combustion engine 1 at that time, and calculates the duty ratio: DACMi-1 corresponding to the judged operational state, from the map. Then, the CPU 52 subtracts a specified amount: DDEC from the duty ratio: DACMi-1 to calculate the learned value: DACMi.

At the S2903, the CPU 52 performs the guard processing of the learned value: DACMi calculated at the S2902, and next, accesses the map to rewrite the VSV driving duty ratio: DACMi-1 to the learned value: DACMi.

In this case, since the VSV 47 is controlled by the learned value: DACMi, the frequency of shifting between the introduction of atmospheric pressure and the introduction of intake air negative pressure in the ACM 31 is decreased, and the frequency for the atmosphere in the space portion 39*a* of the ACM 31 to flow into the surge tank 17 is decreased, and the amount of the ACM discharge air is decreased. Since the intake air amount detected by the air flow meter 19 is also decreased according to this, the CPU 52 decreases the fuel amount to be injected from the fuel injection valve 23. Consequently, the engine speed of the internal combustion engine 1 is lowered below the target idling speed.

Thus, by using the renewal routine of the idling control value, since the idling speed of the internal combustion engine 1 can be decreased while continuing the control of the ACM 31, the lowering of the idling speed can be realized while restraining the idling vibration transmitted from the internal combustion engine 1 to the body side 4, to the minimum.

On the other hand, it is judged at the S2901 that the ACM idling control restraint flag: XACMDC is set at OFF, the CPU 52 advances to the S2904, and performs the interpolating calculation of the map, and makes the value calculated by that be the learned value: DACMi.

In the above mentioned embodiment, at the time of idling of the internal combustion engine 1, the engine speed becomes higher than the target idling speed by a speed not less than a specified speed, and when the opening of the ISCV 25 at that time is not more than the minimum opening capable of being controlled by the CPU 52, the amount of the ACM discharge air can be decreased by decreasing the control frequency of the ACM 31. Consequently, since the intake air amount detected by the air flow meter 19 is decreased, the fuel injection amount is decreased accompanied with that, and the engine speed becomes below the specified speed.

Therefore, according to the present embodiment, the excessive rising of the engine speed at the time of idling is prevented, and the worsening of the operational characteristics and the worsening of the fuel consumption rate are prevented. Furthermore, since the control of the ACM 31 can be continued while decreasing the control frequency of the ACM 31, the transmission of the idling vibration of the internal combustion engine 1 to the body side can be restrained to the minimum.

Moreover, since the engine speed is lowered by decreasing the control frequency of the ACM 31, the CPU 52 performs the control so that the opening of the ISCV 25 may be increased so as to make the engine speed be the target idling speed. Consequently, the opening of the ISCV 25 becomes larger than the minimum opening, and the CPU 52 can continue the feedback control of the ISCV 25.

Furthermore, in the present embodiment, such an example that the control frequency of the ACM 31 is lowered when the idling speed of the internal combustion engine 1 becomes not less than a specified speed, is described, but it is also possible to stop the control of the ACM 31. In this case, the CPU 52 repeatedly performs the idling control routine shown in FIG. 30 for every specified time.

In the idling control routine, at the S3001, the CPU 52 judges whether the feedback control of the ISCV 25 is being performed or not.

When it is judged at the S3001 that the feedback control of the ISCV 25 is not being performed, the CPU 52 once finishes the execution of the present routine, and when it is judged that the feedback control of the ISCV 25 is being performed, the CPU 52 advances to the S3002.

At the S3002, the CPU 52 compares the actual engine speed: Ne with the target idling speed: NRT calculated by the feedback control routine of the idling speed control valve, and judges whether the actual engine speed: Ne is higher than the target idling speed: NRT by a speed not less than a specified speed: α, or not.

When it is judged at the S3002 that the actual engine speed: Ne is higher than the target idling speed: NRT by a speed not less than a specified speed: α, the CPU 52 advances to the S3003, and judges whether the ISCV driving duty ratio: DOP is equal to or less than the previously set lower limit value: DOPMN or not, that is, whether the opening of the ISCV 25 is equal to or less than the previously set minimum opening or not.

When it is judged at the S3003 that the ISCV driving duty ratio: DOP is equal to or less than the lower limit value: DOPMN, the CPU 52 judges whether the VSV driving duty ratio is a value other than [0%] and [100%] or not.

When it is judged at the S3004 that the VSV driving duty ratio is [0%] or [100%], the CPU 52 judges that the control of shifting between the introduction of the atmospheric pressure and the introduction of the intake air negative pressure is stopped (the state of the introduction of the atmospheric pressure or the state of the introduction of the intake air negative pressure is fixed) in the ACM 31, and once finishes the execution of the present routine.

When it is judged at the S3004 that the VSV driving duty ratio is a value other than [0%] and [100%], that is, when it is judged that the control of shifting between the introduction of the atmosphere and the introduction of the intake air negative pressure is performed in the ACM 31, the CPU 52 advances to the S3005, and prohibits the control of the ACM 31.

At the S3006, the CPU 52 sets the target idling speed used for the feedback control of the ISCV 25 to be higher by a specified speed.

In this case, since the introduction shifting processing of the atmosphere and the intake air negative pressure is stopped in the ACM 31, the amount of the ACM discharge air is decreased. Consequently, since the intake air amount detected by the air flow meter 19 is decreased and the fuel injection amount corresponding to that is decreased, the engine speed of the internal combustion engine 1 is lowered below the target idling speed.

When the engine speed is lowered below the target speed, the CPU 52 performs the control so that the opening of the ISCV 25 may be increased, so as to raise the engine speed to the target idling speed. In this case, the opening of the ISCV 25 is made to be larger than the minimum opening, and the CPU 52 can continue the feedback control of the ISCV 25.

Furthermore, the target idling speed of an internal combustion engine supported by the ACM is set in a rotational area where the engine speed is lower than that of an internal combustion engine supported by the normal engine mount, estimating the vibration isolating effect of the ACM, and therefore, the idling vibration gets worse when the operation of the ACM is stopped. However, in the present embodiment, since the target idling speed in the case where the operation of the ACM is stopped, is set to be higher by a specified speed, the idling speed is approximately equal to the idling speed of an internal combustion engine supported by the normal engine mount. Consequently, even when the operation of the ACM is stopped, the worsening of the idling vibration is restrained.

Here, returning to FIG. 30, in a case where it is judged at the S3002 that the actual engine speed: Ne is not higher than the target idling speed: NRT by a speed not less than a specified speed: α, or in a case where it is judged at the S3003 that the ISCV driving duty ratio: DOP is larger than the lower limit value: DOPMN, the CPU 52 advances to the S3007, and permits the control of the ACM 31. In this case, the CPU 52 continues the normal control of the ACM 31 and the normal control of the ISCV 25.

When using the above mentioned idling control routine, since the control of shifting between the introduction of the atmospheric pressure and the introduction of the intake air negative pressure is stopped in the ACM 31 when the engine speed at the time of idling of the internal combustion engine 1 is excessively raised, the engine speed of the internal combustion engine 1 can be lowered, and the worsening of the operational characteristics and the worsening of the fuel consumption rate can be prevented.

Furthermore, in the above mentioned idling control routine, when the control of the ACM 31 is stopped, the worsening of the idling vibration can be restrained by setting the target idling speed to be higher by a specified speed.

<Embodiment 6>

The embodiment of a variable vibration isolating support device according to the second invention will be described on the basis of FIG. 31 to FIG. 37.

Figure 31:
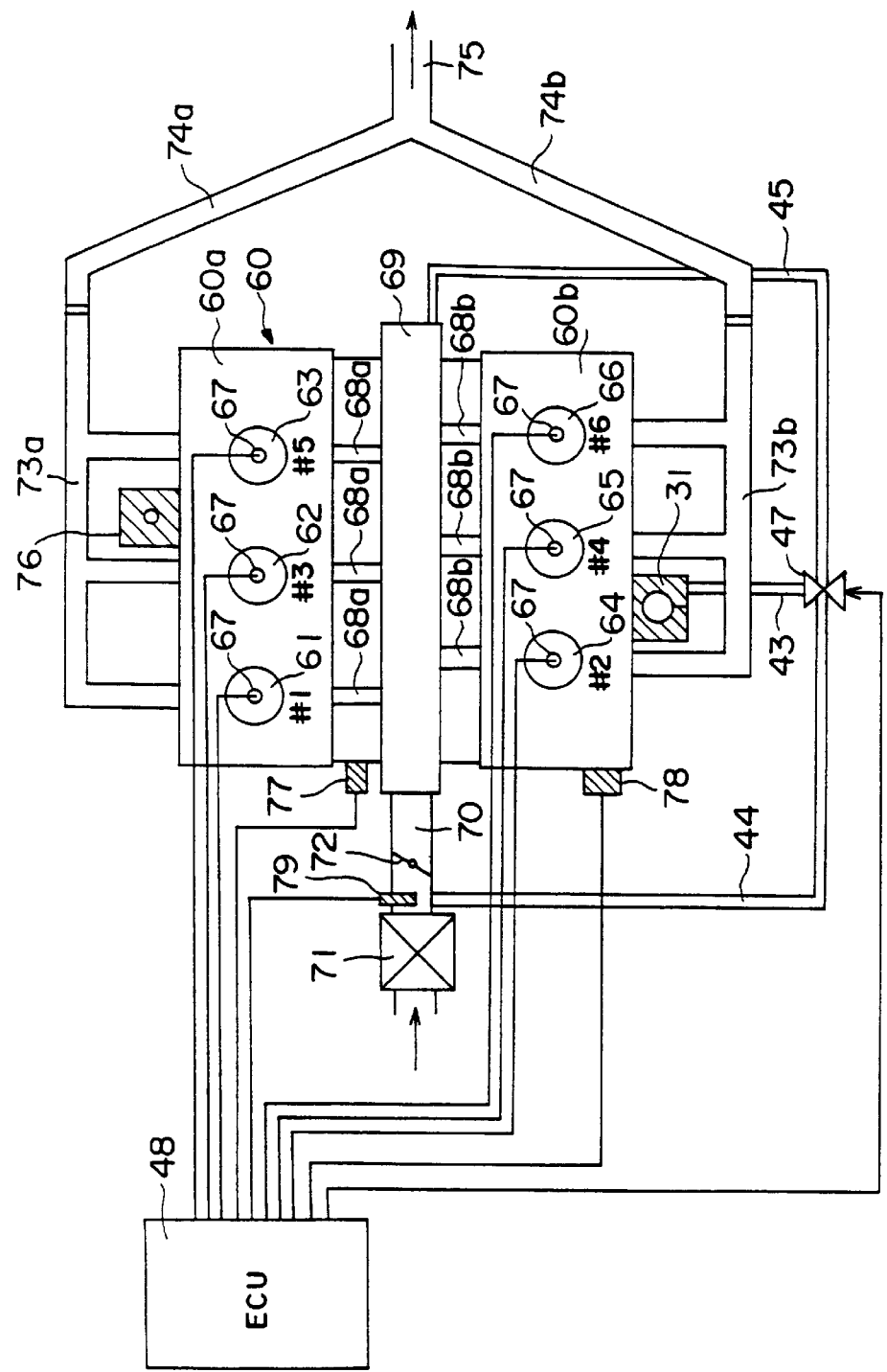
FIG. 31 is a figure showing the rough structure of a V-type internal combustion engine to which the variable vibration isolating support device according to the second invention is applied.

FIG. 31 is a figure showing the rough arrangement of an internal combustion engine to which the variable vibration isolating support device according to the present invention is applied, and the internal combustion engine 60 is a V-type 6 cylinder internal combustion engine, and is composed of a first bank 60*a* having the first cylinder (#1) 61, the third cylinder (#3) 62, and the fifth cylinder (#5) 63, and a second bank 60*b* having the second cylinder (#2) 64, the fourth cylinder (#4) 65, and the sixth cylinder (#6) 66, and to each of the cylinders 61 to 66, a spark plug 67 is attached.

Next, to each of the cylinders 61, 62, 63 of the first bank 60*a*, an intake branch tube 68*a* is connected, and to each of the cylinders 64, 65, 66 of the second bank 60*b*, an intake branch tube 68*b* is connected. These intake branch tubes 68*a*, 68*b* are connected to a surge tank 69.

The surge tank 69 is connected to an air cleaner box 71 through an intake tube 70, and to the intake tube 70, a throttle valve 72 coupled with an accelerator pedal (not shown in the figure) to open and close the passage in the intake tube 70, is attached. In the intake system arranged like this, when the throttle valve 72 is opened, the fresh air passing through the air cleaner box 71 flows into the surge tank 69 through the intake tube 70, and after the intake air pulsation has been smoothed in the surge tank 69, the fresh air is distributed and supplied to each of the cylinders 61 to 66 of each of the banks 60*a*, 60*b*.

Furthermore, to each of the cylinders 61, 62, 63 of the first bank 60*a*, an exhaust branch tube 73*a* is connected, and this exhaust branch tube 73*a* is connected to an exhaust tube 74*a*. Moreover, to each of the cylinders 64, 65, 66 of the second bank 60*b*, an exhaust branch tube 73*b* is connected, and this exhaust branch tube 73b is connected to an exhaust tube 74b. Then, the exhaust tubes 74a, 74b meet each other at the down stream, and are connected to one piece of exhaust tube 75.

The first bank 60a side of the internal combustion engine 60 arranged as mentioned above is supported on the body side of an automobile by a normal engine mount 76, and the second bank 60b side is supported on the body side of the automobile by an ACM 31.

Since the internal structure of the ACM 31 is similar to that of the ACM 31 according to the above mentioned first embodiment, the description will be omitted here. Then, the ACM 31 is connected to a VSV 47 through an intake and exhaust passage 43, and to this VSV 47, an atmosphere passage 44 and a negative pressure passage 45 are connected. The atmosphere passage 44 is connected to the intake tube 70 on the upper stream side of the throttle valve 72. The negative pressure passage 45 is connected to the surge tank 69.

To the internal combustion engine 60, sensors such as a crank position sensor 77 for outputting an electric signal each time a crank shaft (not shown in the figure) rotates through a specified angle (for example, 10 degrees), and a cam position sensor 78 for outputting an electric signal when the rotational position of a cam shaft (not shown in the figure) is a specified position, are attached. To the intake tube 70, an air flow meter 79 for outputting an electric signal corresponding to the mass of intake air flowing in this intake tube 70, is attached.

The cam position sensor 78 is an electromagnetic pickup type sensor, and outputs an electric signal before the compression top dead center of the reference cylinder. Moreover, the cam position sensor 78 is set, for example, so that the signal outputted from the crank position sensor 77 just after the output of the cam position sensor 78 may be 10° before the compression top dead center of the reference cylinder.

Each of the above mentioned sensors 77, 78, 79 is connected to the ECU 48 through the electrical wiring. In the ROM 51 of the ECU 48, application programs such as a control routine of the fuel injection amount for determining the fuel injection amount of each of the cylinders 61 to 66, a control routine of the fuel injection timing for determining the fuel injection timing of each of the cylinders 61 to 66, a control routine of the ignition timing for determining the ignition timing of each of the cylinders 61 to 66, and an ACM control routine for determining the control value of the VSV 47, and various types of control maps are stored.

As control maps stored in the ROM 51, for example, a map A showing the relation between the operational state of the internal combustion engine 60 and the control value of the VSV 47, a map B showing the relation between the operational state of the internal combustion engine 60 and the control timing of the VSV 47, and the like, can be shown as examples.

The map A comprises a first map A in which control values effective for damping the vibration produced at the first bank 60a are set, and a second map A in which control values effective for damping the vibration produced at the second bank 60b are set.

The first map A and the second map A are, as shown in FIGS. 32, 33, maps showing the relation among the load of the internal combustion engine 60, the engine speed, and the VSV driving duty ratio, and it is arranged that the most suitable VSV driving duty ratio is specified when the load and the engine speed are determined.

The map B comprises a first map B in which control timings effective for damping the vibration produced at the first bank 60a are set, and a second map B in which control timings effective for damping the vibration produced at the second bank 60b are set.

The first map B and the second map B are, as shown in FIGS. 34, 35, maps showing the relation among the load of the internal combustion engine 60, the engine speed, and the control timing of the VSV 47 (crank angle based on the top dead center of each cylinder), and it is arranged that the most suitable control timing is specified when the load and the engine speed are determined.

Furthermore, the control value and the control timing set in the maps A, B are, for example, values determined on the basis of the result of the measurement obtained by previously measuring the time required for the vibration produced at the time of burning and explosion of the gaseous mixture at each of the banks 60a, 60b to be inputted into the ACM 31 and the input angle thereof.

The CPU 52 is operated according to the application programs stored in the ROM 51, and determines the fuel injection amount of each cylinder, the fuel injection timing, the ignition timing, or the like and determines the control value (VSV driving duty ratio) and the control timing of the ACM 31, and controls the fuel injection valve (not shown in the figure), the spark plug 67, and the VSV 47.

The action and the effect of the present embodiment will be described below.

Figure 36:
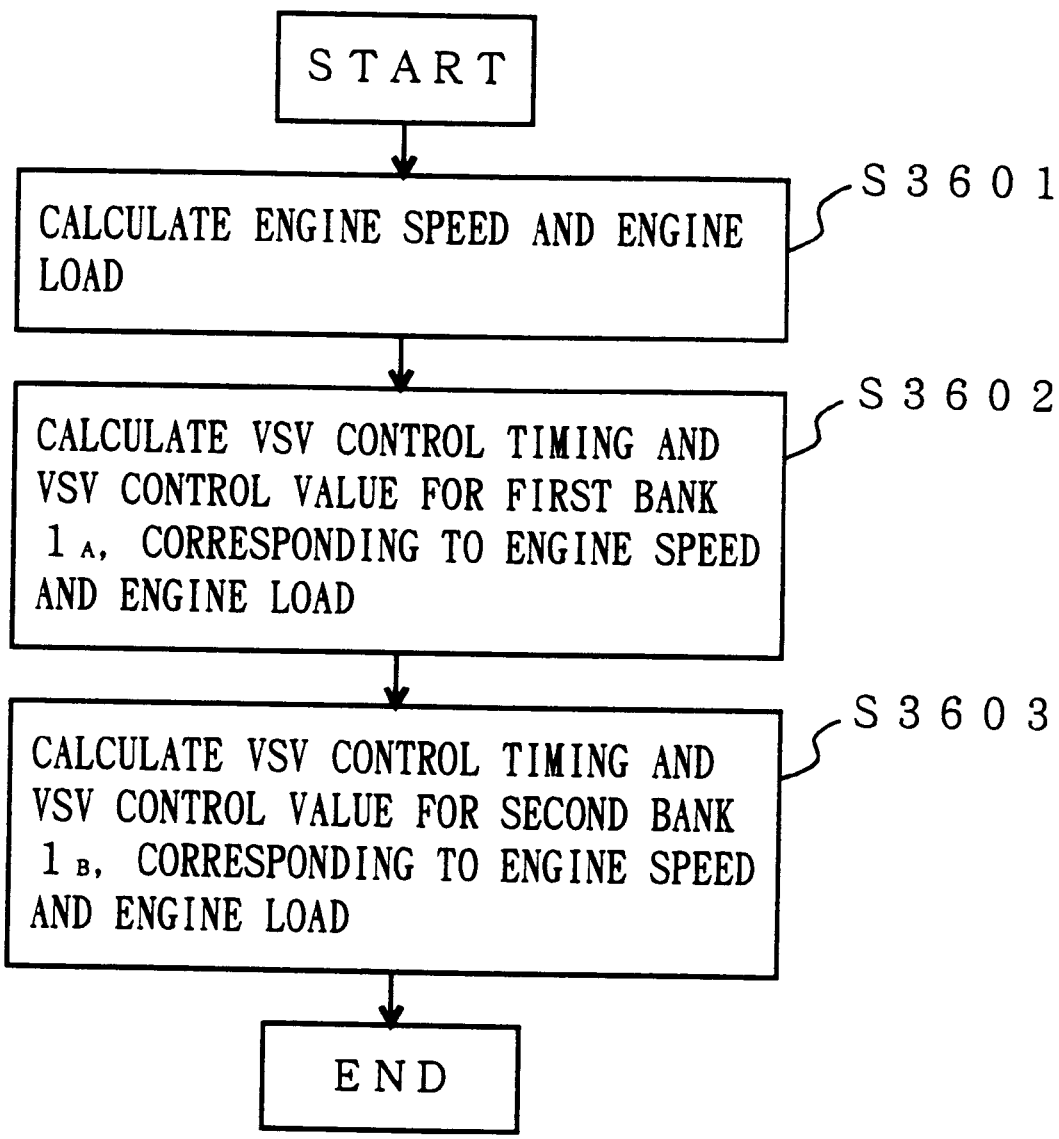
FIG. 36 is a flow chart showing the calculation routine of the VSV control value.

When controlling the VSV 47, the CPU 52 repeatedly performs the calculation routine of the VSV control value shown in FIG. 36 for every specified time.

In the calculation routine of the VSV control value, at the S3601, the CPU 52 accesses the RAM 47, and reads out the output signal of the crank position sensor 77 and the output signal of the air flow meter 79, and calculates the engine speed and the engine load.

At the S3602, the CPU 52 accesses the first map A and the first map B of the ROM 46, and calculates the VSV driving duty ratio and the VSV control timing for the first bank 60a corresponding to the engine speed and the engine load calculated at the S3601, and stores them in a specified area of the RAM 47.

At the S3603, the CPU 52 accesses the second map A and the second map B of the ROM 46, and calculates the VSV driving duty ratio and the VSV control timing for the second bank 60b corresponding to the engine speed and the engine load calculated at the S3601, and stores them in a specified area of the RAM 47.

Figure 37:
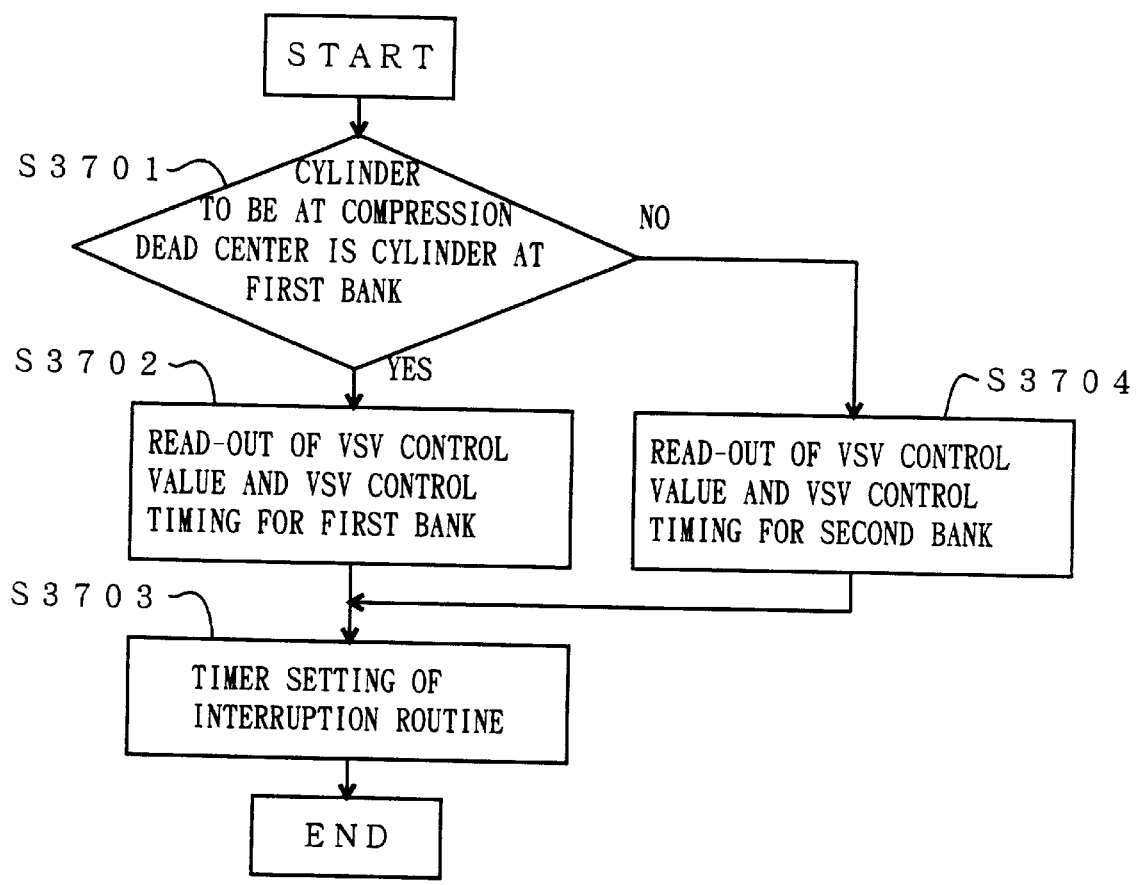
FIG. 37 is a flow chart showing the VSV control setting routine.

On the other hand, the CPU 52 performs the VSV control setting routine shown in FIG. 37 each time the crank position sensor 77 outputs a signal showing a specified angle before the compression top dead center of each of the cylinders 61 to 66.

In the VSV control setting routine, at the S3701, the CPU 52 judges whether the cylinders to be at the compression top dead center are the cylinders 61, 62, 63 of the first bank 60a, or the cylinders 64, 65, 66 of the second bank 60b.

When it is judged at the S3701 that the cylinders to be at the compression top dead center are the cylinders 61, 62, 63 of the first bank 60a, the CPU 52 advances to the S3702, and reads out the VSV driving duty ratio and the VSV control timing for the first bank 60a stored in a specified area of the RAM 47.

Next, the CPU 52 advances to the S3703, and performs the timer setting of the interruption routine so as to apply the VSV driving duty ratio to the VSV 47 at the VSV control timing.

When it is judged at the S3701 that the cylinders to be at the compression top dead center are the cylinders 64, 65, 66 of the second bank 60b, the CPU 52 advances to the S3704, and reads out the VSV driving duty ratio and the VSV control timing for the second bank 60b stored in a specified area of the RAM 47.

Next, similarly to the S3703, the CPU 52 performs the timer setting of the interruption routine so as to apply the VSV driving duty ratio to the VSV 47 at the VSV control timing.

After that, the CPU 52 compares, each time the crank position sensor 77 outputs a signal, the VSV control timing with the output signal of the crank position sensor 77. When the VSV control timing coincides with the output signal of the crank position sensor 77, the CPU 52 performs the interruption routine set by the VSV control setting routine, and applies the VSV driving duty ratio to the VSV 47.

Thus, by performing the VSV control setting routine and the interruption routine, the CPU 52 realizes a vibration discrimination means and a vibration isolating characteristic changing means according to the present invention, and discriminates between the vibration produced when the gaseous mixture is burned and exploded in the cylinders 61, 62, 63 of the first bank 60a, and the vibration produced when the gaseous mixture is burned and exploded in the cylinders 64, 65, 66 of the second bank 60b, so that the vibration isolating characteristics of the ACM 31 may be changed according to each vibration.

Furthermore, since the burning and the explosion are alternately performed at the first bank 60a and the second bank 60b, the VSV driving duty ratio for the first bank 60a and the VSV driving duty ratio for the second bank 60b are alternately outputted from the CPU 52, and the first control signal and the second control signal according to the present invention are realized.

As mentioned above, when using the present embodiment, the vibration isolating characteristics corresponding to the vibration produced at the first bank 60a of a V-type internal combustion engine 60 and the vibration produced at the second bank 60b, can be realized, so that each vibration may be effectively absorbed and it may not be transmitted to the body side.

<Embodiment 7>

The embodiment of the variable vibration isolating support device according to the third invention will be described on the basis of FIG. 38 to FIG. 45.

Figure 38:
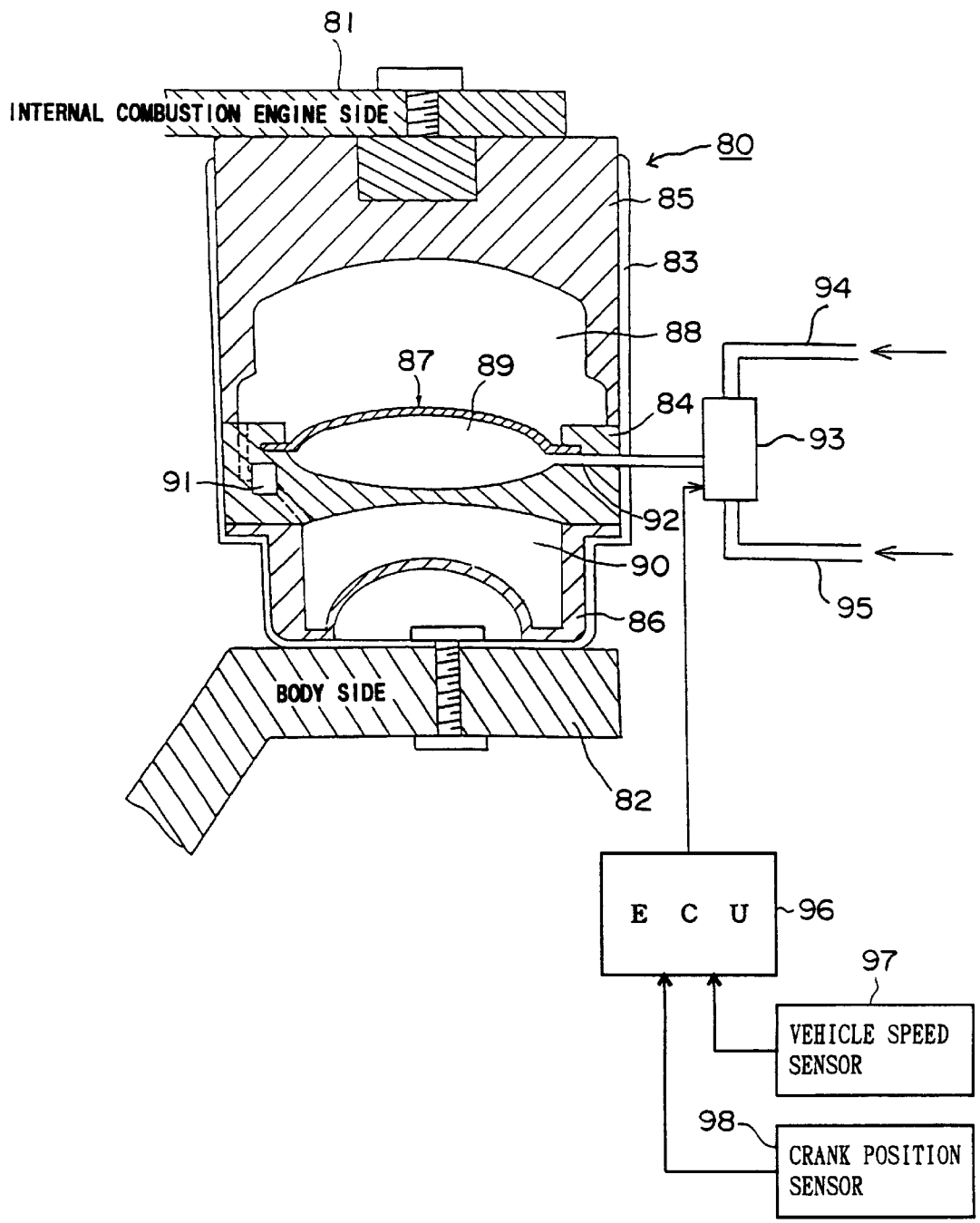
FIG. 38 is a figure showing one practical mode of the variable vibration isolating support device according to the seventh embodiment.
Figure 39:
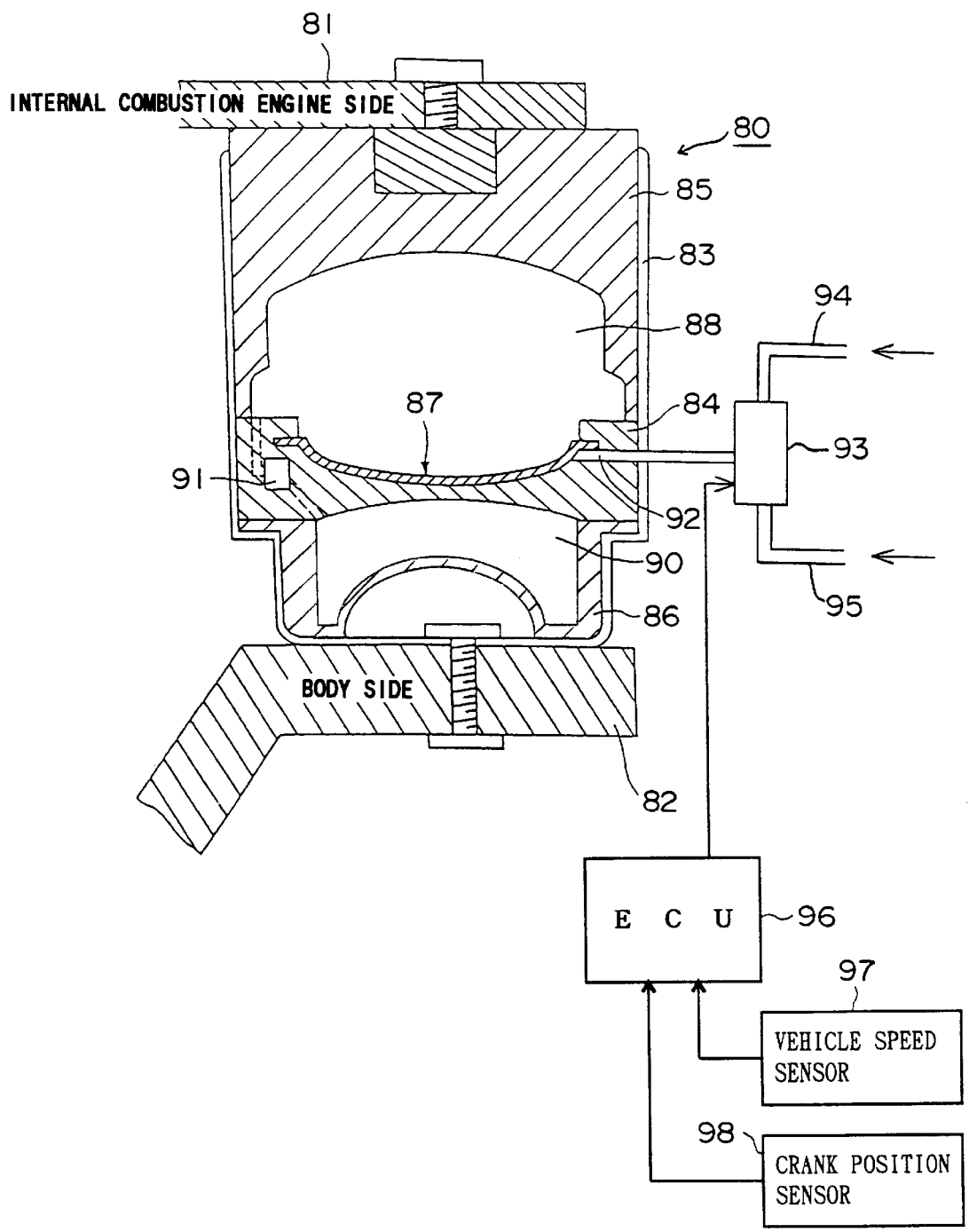
FIG. 39 is a figure describing the operation of the ACM 80.

FIG. 38 and FIG. 39 are figures showing one practical mode of the variable vibration isolating support device according to the third invention. The variable vibration isolating support device has an ACM 80 supporting an internal combustion engine 81 on the body 82 side of a vehicle, and a three way switching valve (VSV) 4 located outside the ACM 80.

The ACM 80 comprises: an outer casing hardware 83 whose upper portion is open; a partition board 84 made of a disc-like rigid body with an outside diameter approximately equal to the inside diameter of the outer casing hardware 83 and dividing the interior of the outer casing hardware 83 into upper and lower 2 chambers; a first vibration isolating base body 85 made of an elastic body such as a rubber and forced into a space above the partition board 84 to be fixed to the outer casing hardware 83; and a second vibration isolating base body 86 made of an elastic body such as a rubber and forced into a space below the partition board 84 to be fixed to the outer casing hardware 83.

Above the partition board 84, a space is formed, surrounded by the first vibration isolating base body 85 and the partition board 84. This space is divided into a space portion 88 and a space portion 89 by a diaphragm 87 whose periphery is fixed to the partition board 84. In the space portion 88, liquid is sealed (hereafter, the space portion 88 is called the main liquid chamber 88).

Below the partition board 84 of the ACM 80, a space portion 90 is formed, surrounded by the second vibration isolating base body 86 and the partition board 84, and in this space portion 90, liquid is sealed (hereafter, the space portion 90 is called the secondary liquid chamber 90). The secondary liquid chamber 90 and the main liquid chamber 88 lead to each other through an orifice 91 formed in the partition board 84.

In the partition board 84 and the outer casing hardware 83, an intake and exhaust passage 92 connecting the space portion 39 and the outside is formed. The intake and exhaust passage 92 leads to the VSV 93 installed to the ACM 80 side by side.

To the VSV 93, an atmosphere passage 94 and a negative pressure passage 95 are connected in addition to the intake and exhaust passage 92. The atmosphere passage 94 is connected to an intake passage (not shown in the figure) of the internal combustion engine 81 on the upper stream side of the throttle valve, or the opening end thereof is located in the atmosphere. Furthermore, the negative pressure passage 95 is connected to the intake passage of the internal combustion engine 81 on the down stream side of the throttle valve.

Figure 40:
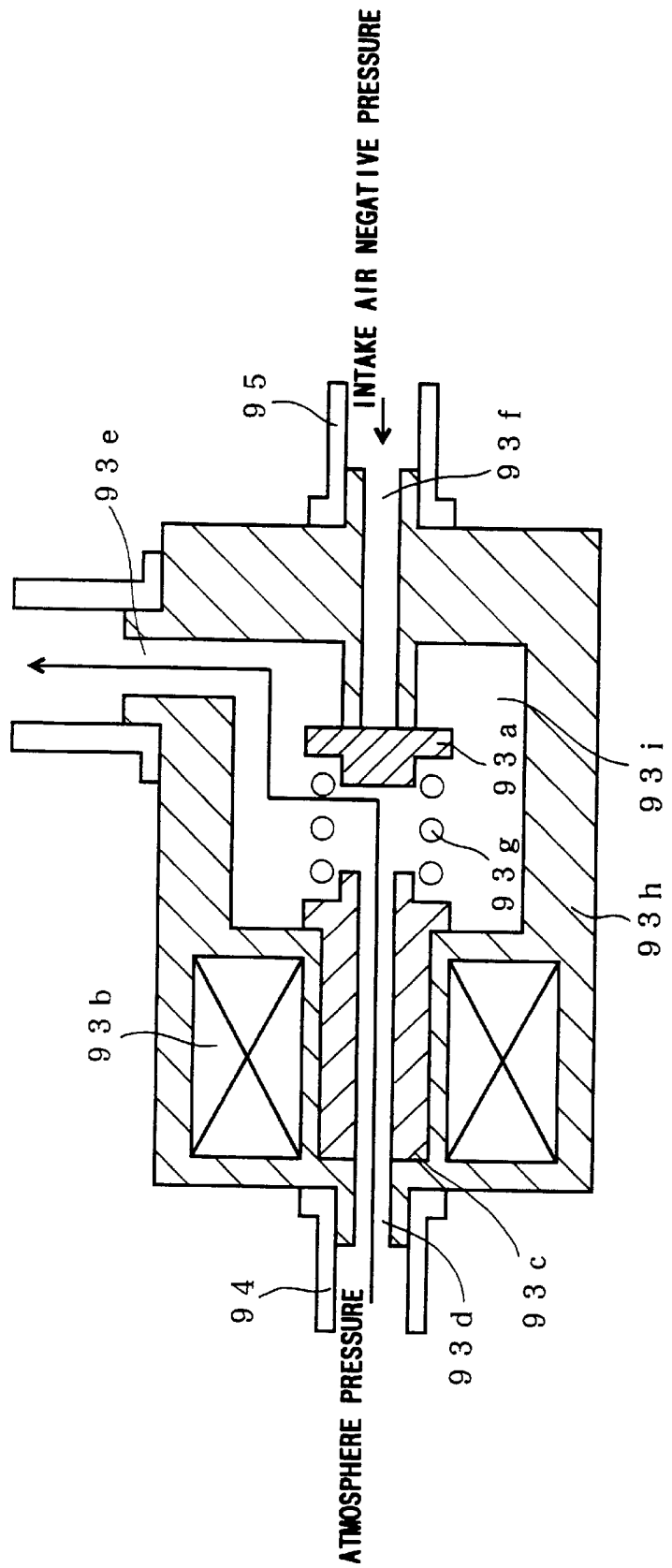
FIG. 40 is a figure showing the rough structure of the VSV 93.

Here, as shown in FIG. 40, the VSV 93 has a housing 93h in which a space portion 93i, a first passage 93d connecting the space portion 93i and the atmosphere passage 94, a second passage 93f connecting the space portion 93i and the negative pressure passage 95, and a third passage 93e connecting the space portion 93i and the intake and exhaust passage 92, are formed.

The housing 93h includes a solenoid coil 93b and a core 93c located at the axial center portion of the solenoid coil 93b, and further includes a valve body 93a which can freely advance and retreat so as to close either of the opening end of the first passage 93d or the opening end of the second passage 93f facing the space portion 93i, and a spring 93g which urges the valve body 93a to close the second passage 93f. The valve body 93a is made of a magnetic material.

In the VSV 93 arranged like this, at the regular time (when no driving power is applied to the solenoid coil 93b), the valve body 93a receives the urging force of the spring 93g, and closes the opening end of the second passage 93f and at the same time, opens the opening end of the first passage 93d. At this time, the first passage 93d and the third passage 93e are connected through the space portion 93i, and consequently, the atmosphere passage 94 and the intake and exhaust passage 92 are connected.

Figure 41:
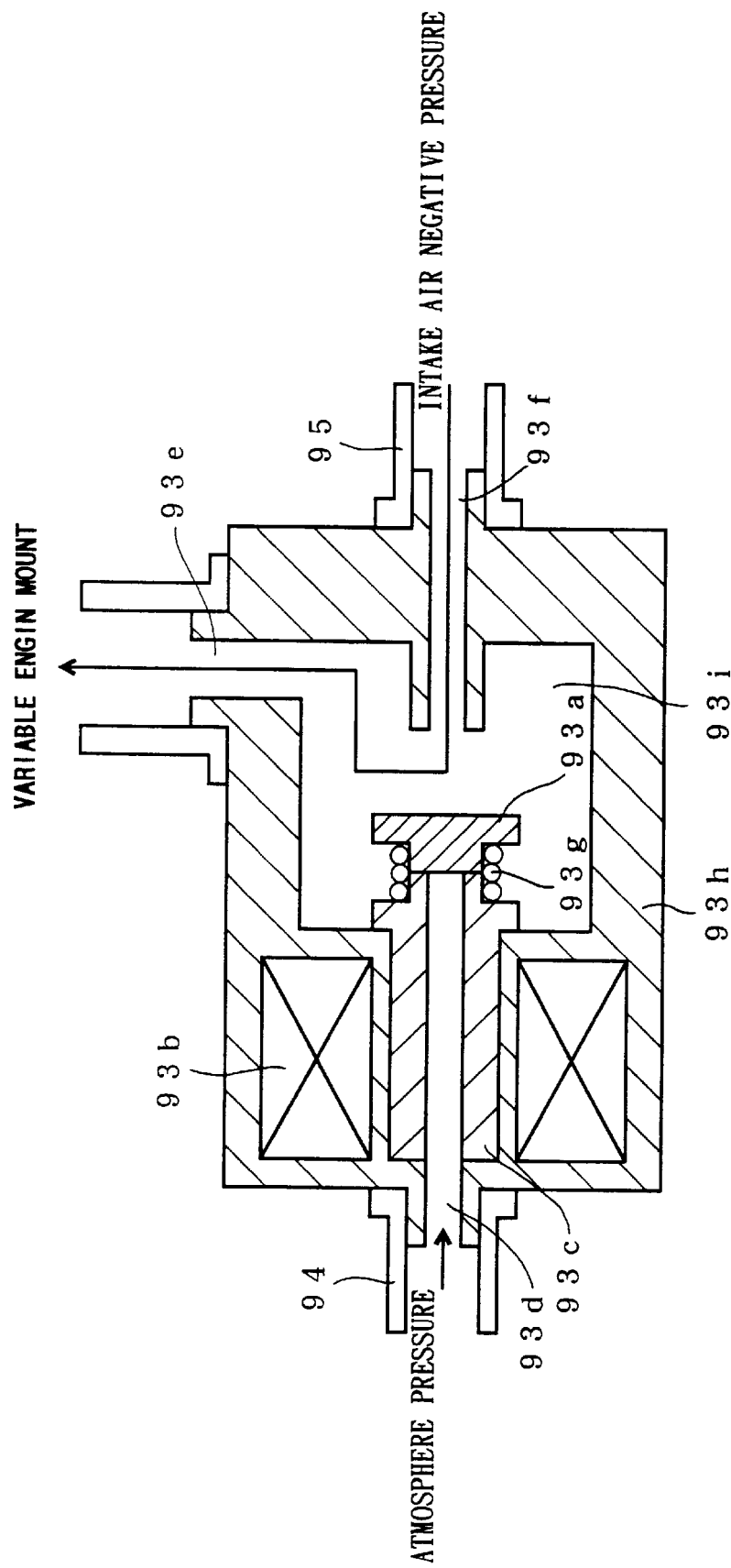
FIG. 41 is a figure describing the operation of the VSV 93.

When a driving power is applied to the solenoid coil 93b, the solenoid coil 93b excites the core 93c, and the excited core 93c produces a magnetic force for attracting the valve body 93a. At this time, the valve body 93a is attracted by the core 93c against the urging force of the spring 93g, and as shown in FIG. 41, opens the opening end of the second passage 93f and at the same time, closes the opening end of the first passage 93d. Consequently, the second passage 93f and the third passage 93e become in the state of continuity through the space portion 93i, and the negative pressure passage 95 and the intake and exhaust passage 92 lead to each other.

The VSV 93 is controlled by the driving pulse signal with a duty ratio corresponding to the ratio of the application time of the driving power (opening time of the second passage 93f) to the non-application time (opening time of the first passage 93d).

When a driving pulse signal of the duty ratio: 100% is applied to the solenoid coil 93*b*, the valve body 93*a* is driven to keep the state of continuity between the second passage 93*f* and the third passage 93*e* (the negative pressure passage 95 and the intake and exhaust passage 92).

At this time, into the space portion 89 of the ACM 80, as shown in FIG. 39, the intake tube negative pressure produced in the intake passage on the down stream side of the throttle valve, is continuously introduced and the atmosphere in the space portion 89 is entirely sucked out, and consequently, the diaphragm 87 is adhered to the partition board 84 and becomes in a state where vibration is impossible.

On the other hand, when a driving pulse signal of the duty ratio: 0% is applied to the solenoid coil 93*b*, the valve body 93*a* is driven to keep the state of continuity between the first passage 93*d* and the third passage 93*e* (the atmosphere passage 94 and the intake and exhaust passage 92).

At this time, into the space portion 89 of the ACM 80, as shown in FIG. 38, the atmosphere is continuously introduced and the volume of the space portion 89 is increased, and therefore, the diaphragm 87 is separated from the partition board 84 and becomes in a state where vibration is possible.

When a driving pulse signal of the duty ratio larger than 0% and smaller than 100% is applied to the solenoid coil 93*b*, the excitation and the non-excitation of the core 93*c* are alternately repeated at a specified ratio, and the valve body 93*a* advances and retreats so as to alternately repeat the opening of the first passage 93*d* (closing of the second passage 93*f*) and the opening of the second passage 93*f* (closing of the first passage 93*d*). That is, the VSV 93 alternately repeats the continuity between the atmosphere passage 94 and the intake and exhaust passage 92, and the continuity between the negative pressure passage 95 and the intake and exhaust passage 92 at a specified ratio.

In this case, into the space portion 89 of the ACM 80, the atmosphere and the intake tube negative pressure are alternately introduced at a specified ratio and the volume of the space portion 89 is increased and decreased, and therefore, the diaphragm 87 vibrates according to that.

When the atmosphere is introduced after the intake tube negative pressure has been introduced into the space portion 89, the volume of the main liquid chamber 88 is decreased at the same time that the volume of the space portion 89 is increased, and therefore, the pressure in the main liquid chamber 88 is increased and the first vibration isolating base body 85 is pressed up. Consequently, the ACM 80 performs an expansion action.

On the other hand, when the intake tube negative pressure is introduced after the atmosphere has been introduced into the space portion 89, the volume of the main liquid chamber 88 is increased at the same time that the volume of the space portion 89 is decreased, and therefore, the pressure in the main liquid chamber 88 is decreased and the first vibration isolating base body 85 is pulled down. Consequently, the ACM 80 performs a reduction action.

Here, returning to FIG. 38, the solenoid coil 93*b* of the VSV 93 is connected to an electronic control unit: ECU 96 for the engine control through the electrical wiring. To this ECU 96, various types of sensors such as a vehicle speed sensor 97 for detecting the vehicle running speed or a crank position sensor 98 for detecting the engine speed of the internal combustion engine 81, are connected.

The ECU 96 discriminates the operational state of the internal combustion engine 81 and the running state of the vehicle on the basis of the output signals of the various types of sensors, and determines the VSV driving duty ratio according to the discriminated operational state and the discriminated running state. By applying the driving pulse signal corresponding to the determined VSV driving duty ratio to the solenoid coil 93*b*, the ECU 96 controls the VSV 93 and the ACM 80.

Specifically, when the vehicle is in a high speed running state, or when the internal combustion engine 81 is in a high speed operating state, the ECU 96 applies a driving pulse signal corresponding to the duty ratio of 100% to the solenoid coil 93*b*.

In this case, the VSV 93 operates so as to continuously introduce the intake tube negative pressure to the ACM 80, and therefore, in the ACM 80, the diaphragm 87 is adhered to the partition board 84, so that the liquid may easily flow into the orifice 91. At this time, the vibration damping by the liquid resonance is produced in the orifice 91, so that the drivability may be improved.

On the other hand, when the vehicle is in a low speed running state, or when the internal combustion engine 81 is in a low speed operating state (including the idling state), the ECU 96 applies a driving pulse signal corresponding to the duty ratio larger than 0% and smaller than 100% to the solenoid coil 93*b* of the VSV 93 so that the ACM 80 may perform the expansion and reduction actions in synchronization with the engine speed.

Here, in the internal combustion engine 81, when the linear motion of the piston is changed into the rotational motion of the crank shaft at the explosion stroke of each cylinder, a force to turn the cylinder block in the same direction as the crank shaft is produced, and after that, a force to turn it in the opposite direction is produced by the reaction of the turning, and therefore, if the ACM 80 performs the expansion and reduction actions, following such vibrations, the transmission of the vibration to the body 82 side can be prevented.

Figure 42:
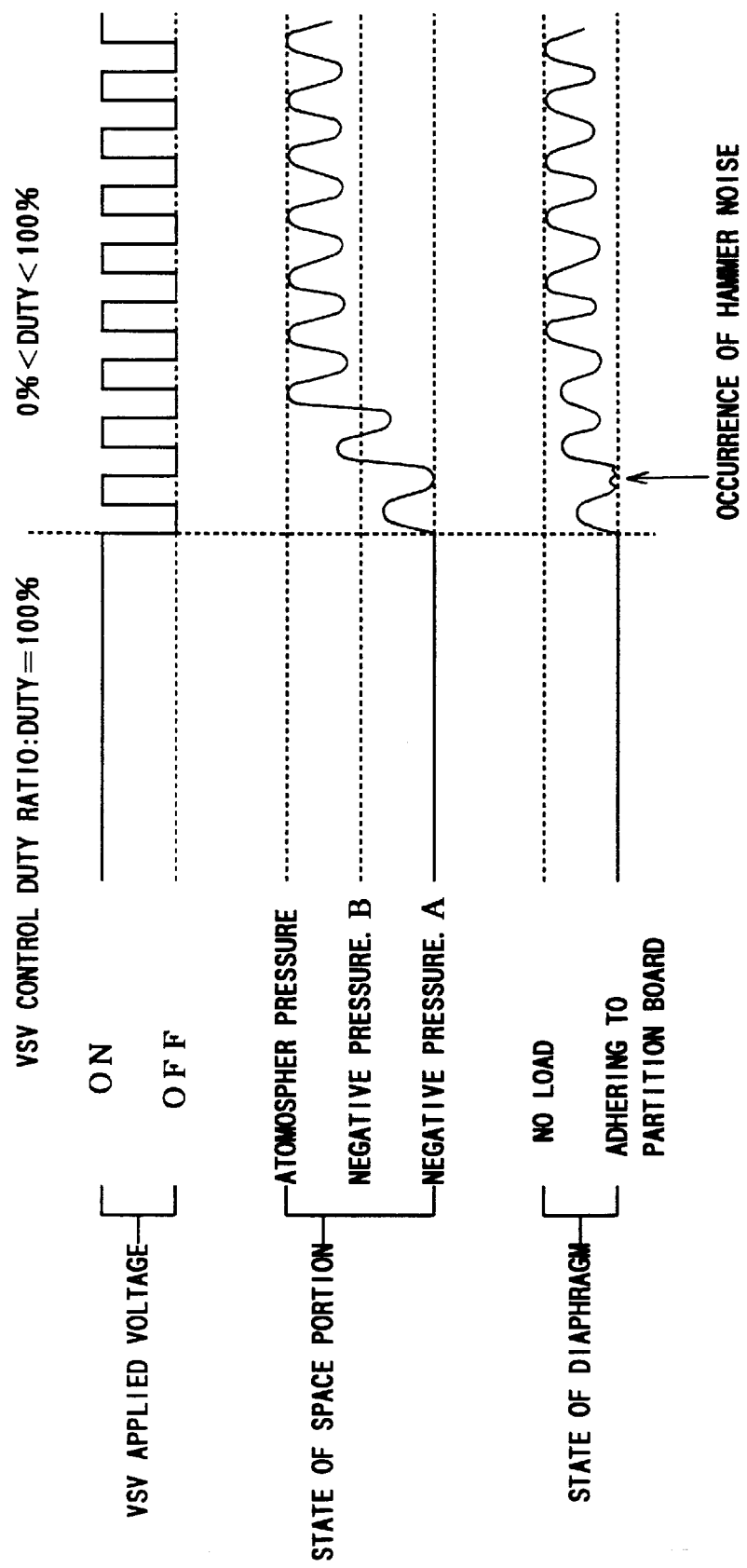
FIG. 42 is a figure describing the state of a diaphragm when moving from the control of the intake tube negative pressure introduction to the duty control.

By the way, when the internal combustion engine 81 or the vehicle moves from the high speed operating state or the high speed running state to the low speed operating state or the low speed running state, into the space portion 89 of the ACM 80, the intake tube negative pressure and the atmosphere are alternately introduced at a ratio corresponding to the duty ratio after the intake tube negative pressure has been continuously introduced, and therefore, as shown in FIG. 42, the pressure in the space portion 89 gradually approaches the atmospheric pressure from the negative pressure A, and converges on a pressure between the negative pressure B (>A) and the atmospheric pressure.

After the negative pressure in the space portion 89 has converged on a pressure between the negative pressure B and the atmospheric pressure, the diaphragm 87 vibrates at a position where it does not touch the partition board 84, but before the negative pressure in the space portion 89 converges on a pressure between the negative pressure B and the atmospheric pressure, it vibrates at a position near the partition board 84, so that it may collide with the partition board 84 to produce hammering noises.

Therefore, in the present embodiment, in a case where the internal combustion engine 81 or the vehicle moves from the high speed operating state or the high speed running state to the low speed operating state or the low speed running state, that is, in a case of moving from the state where the intake tube negative pressure is continuously introduced into the ACM 80 to the state where the intake tube negative pressure and the atmosphere are alternately introduced, the ECU 96 controls the VSV 93 so as to continuously introduce the intake tube negative pressure into the ACM 80, and after that, once controls the VSV 93 so as to continuously introduce the atmosphere, and next, controls the VSV 93 so as to alternately introduce the intake tube negative pressure and the atmosphere at a ratio corresponding to the duty ratio.

The control method of the VSV 93 in the present embodiment will be described below on the basis of FIG. 43 and FIG. 44.

Figure 43:
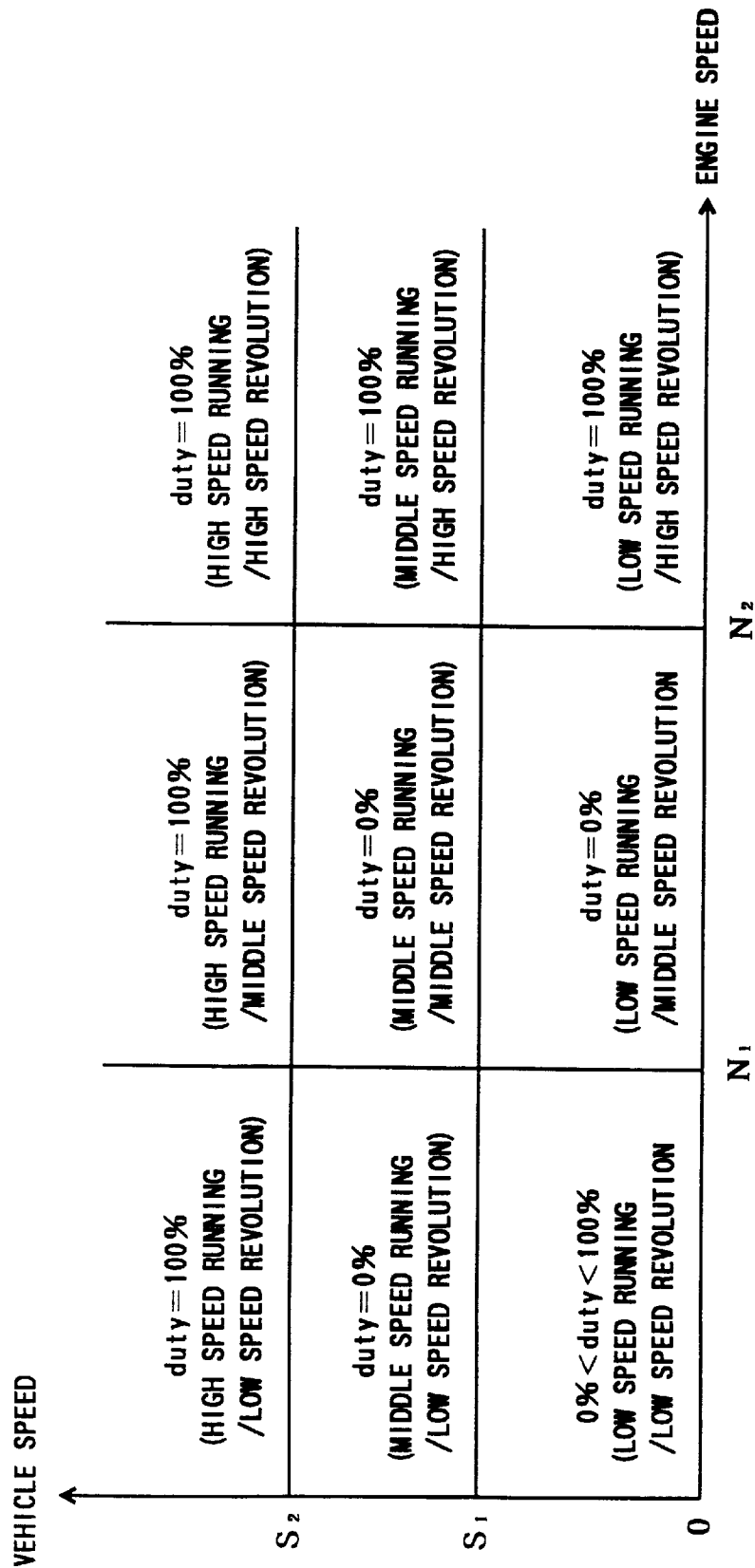
FIG. 43 is a figure describing the VSV control method according to the seventh embodiment.

FIG. 43 is a figure showing the relation among the engine speed of the internal combustion engine 81, the 20 vehicle running speed, and the VSV driving duty ratio, and when the vehicle speed is not less than a specified value $S_2$ (km/h)(at the time of high speed running of the vehicle), or when the engine speed is higher than a specified value $N_2$ (rpm) (at the time of high speed 25 operation of the internal combustion engine 81), the VSV driving duty ratio becomes "100%" so as to continuously introduce the intake tube negative pressure into the ACM 80.

When the vehicle speed is higher than a specified value $S_1$ ($<S_2$) and lower than a specified value $S_2$, and the engine speed is lower than a specified value $N_2$, that is, when the vehicle is in a middle speed running state and the internal combustion engine 81 is in a low speed operating state or in a middle speed operating state, the VSV driving duty ratio becomes "0%" so as to continuously introduce the atmosphere into the ACM 80.

When the vehicle speed is lower than a specified value $S_1$, and the engine speed is higher than a specified value $N_1$ ($<N_2$) and lower than a specified value $N_2$, that is, when the vehicle is in a low speed running state and the internal combustion engine 81 is in a middle speed operating state, the VSV driving duty ratio also becomes "0%" so as to continuously introduce the atmosphere into the ACM 80.

In a case where the vehicle speed is not more than a specified value $S_1$, and the engine speed is not more than a specified value $N_1$, that is, when the vehicle is in a low speed running state and the internal combustion engine 81 is in a low speed operating state (including the time of idling), the VSV driving duty ratio becomes a duty ratio larger than 0% and smaller than 100% so that the ACM 80 may perform the expansion and reduction actions in synchronization with the engine speed.

Figure 44:
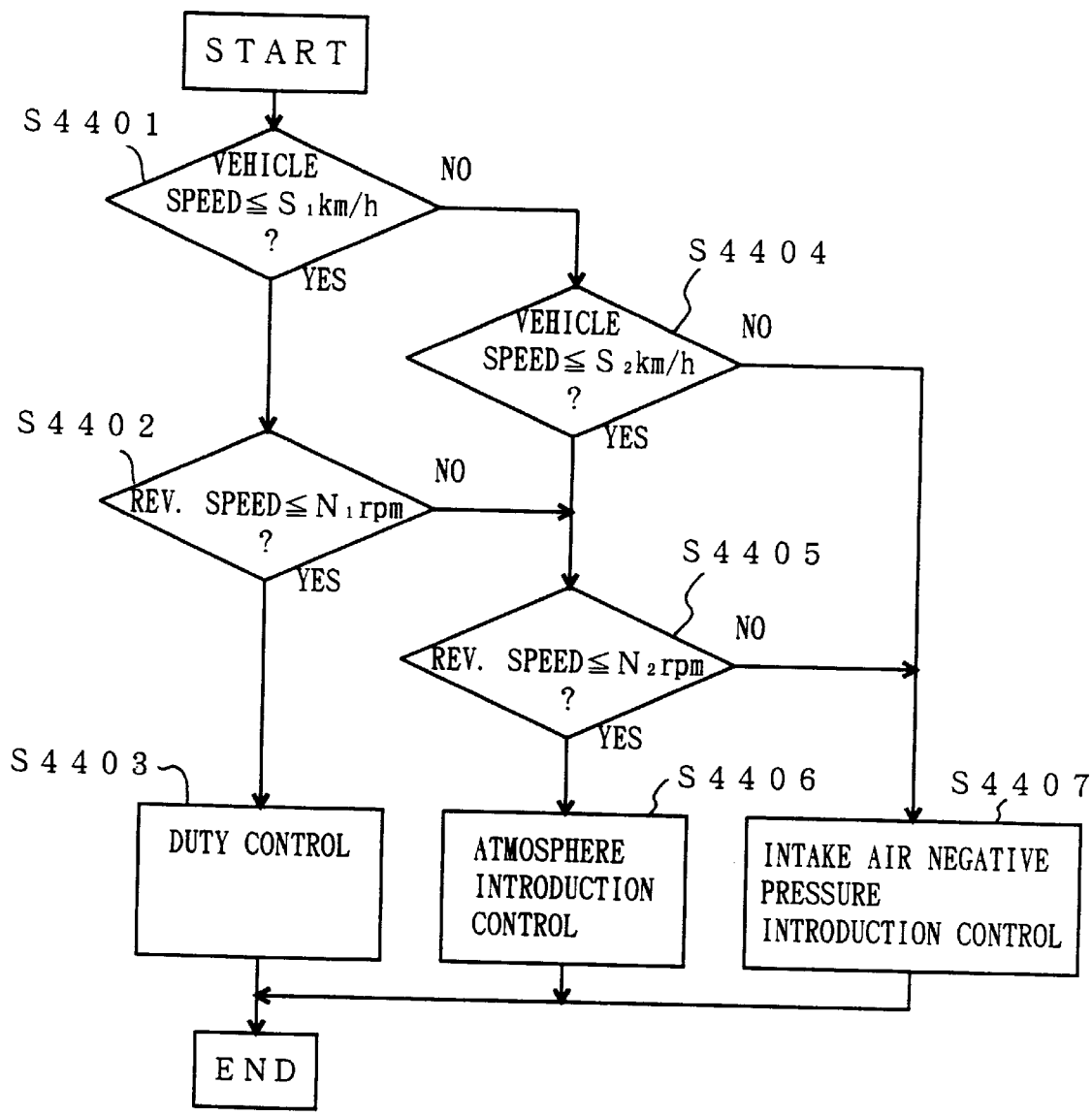
FIG. 44 is a flow chart showing the VSV control routine.

Next, FIG. 44 is a flow chart showing the VSV control routine performed when the ECU 96 controls the VSV 93.

In the VSV control routine, the ECU 96 inputs the output signal of the vehicle speed sensor 97 at the S4401, and judges whether the vehicle running speed is equal to or less than the specified value $S_1$ km/h or not.

When it is judged at the S4401 that the vehicle running speed is equal to or less than the specified value $S_1$ km/h, the ECU 96 advances to the S4402, and inputs the engine speed calculated on the basis of the output signal of the crank position sensor 98. The ECU 96 judges whether the engine speed is equal to or less than the specified value $N_1$ rpm or not.

When it is judged at the S4402 that the engine speed is equal to or less than the specified value $N_1$ rpm, the ECU 96 considers that the internal combustion engine 81 is in a low speed operating state and the vehicle is in a low speed running state, and advances to the S4403.

At the S4403, the ECU 96 performs the duty control of the VSV 93 so that the ACM 80 may perform the expansion and reduction actions following the vibration of the internal combustion engine 81, and alternately introduces the atmosphere and the intake tube negative pressure into the ACM 80 at a specified ratio.

On the other hand, when it is judged at the S4402 that the engine speed is higher than the specified value $N_1$ rpm, the ECU 96 advances to the S4405, and judges whether the engine speed is equal to or less than the specified value $N_2$ rpm or not.

When it is judged at the S4405 that the engine speed is equal to or less than the specified value $N_2$ rpm, the ECU 96 considers that the internal combustion engine 81 is in a middle speed operating state and the vehicle is in a low speed running state, and advances to the S4406.

At the S4406, the ECU 96 applies a driving pulse signal corresponding to the duty ratio of 0% to the VSV 93 so as to continuously introduce the atmosphere into the ACM 80.

When it is judged at the S4405 that the engine speed is higher than the specified value $N_2$ rpm, the ECU 96 considers that the internal combustion engine 81 is in a high speed operating state, and advances to the S4407.

At the S4407, the ECU 96 applies a driving pulse signal corresponding to the duty ratio of 100% to the VSV 93 so as to continuously introduce the intake tube negative pressure into the ACM 80.

Furthermore, when it is judged at the S4401 that the vehicle running speed is higher than the specified value $S_1$ km/h, the ECU 96 advances to the S4404, and judges whether the vehicle running speed is equal to or less than the specified value $S_2$ km/h or not.

When it is judged at the S4404 that the vehicle running speed is equal to or less than the specified value $S_2$ km/h, the ECU 96 advances to the S4405, and inputs the engine speed calculated on the basis of the output signal of the crank position sensor 98, and judges whether the engine speed is equal to or less than the specified value $N_2$ rpm or not.

When it is judged at the S4405 that the engine speed is equal to or less than the specified value $N_2$ rpm, the ECU 96 considers that the internal combustion engine 81 is not in a high speed operating state and the vehicle is in a middle speed running state, and advances to the S4406, and performs the control so as to continuously introduce the atmosphere into the ACM 80.

On the other hand, when it is judged at the S4405 that the engine speed is higher than the specified value $N_2$ rpm, the ECU 96 considers that the internal combustion engine 81 is in a high speed operating state, and advances to the S4407, and performs the control so as to continuously introduce the intake tube negative pressure into the ACM 80.

Furthermore, when it is judged at the S4404 that the vehicle running speed is higher than the specified value $S_2$ km/h, the ECU 96 considers that the vehicle is in a high speed running state, and advances to the S4407, and performs the control so as to continuously introduce the intake tube negative pressure into the ACM 80.

Thus, the ECU 96 realizes a pressure control means according to the present invention by performing the VSV control routine.

As mentioned above, when using the variable vibration isolating support device according to the present embodiment, however the operating state of the internal combustion engine 81 and the running state of the vehicle are changed, it is arranged that after the intake tube negative pressure has been continuously introduced into the space portion 39 of the ACM 80, the atmosphere is once continuously introduced, and next, the intake tube negative pressure and the atmosphere are alternately introduced at a ratio corresponding to the duty ratio.

Figure 45:
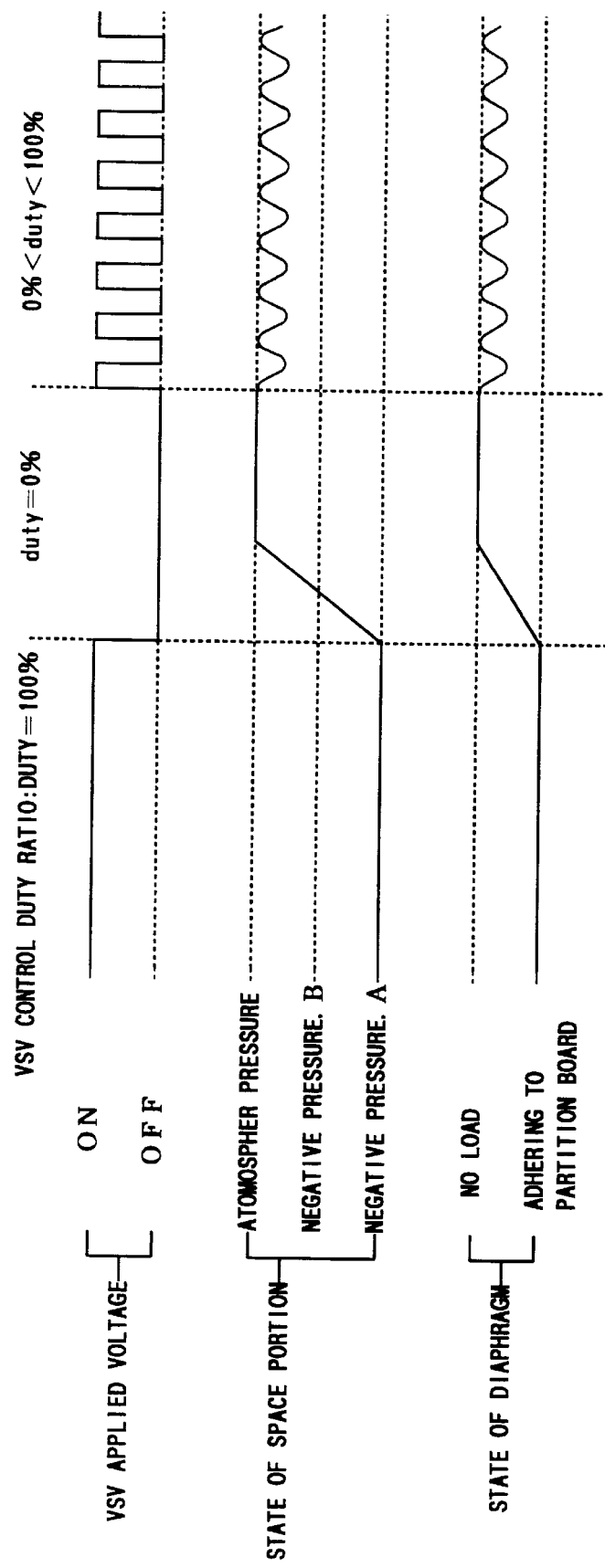
FIG. 45 is a figure describing the state of the diaphragm in a case where the duty control is performed after the controls from the control of the intake tube negative pressure introduction to the control of the atmosphere introduction have been performed.

At that time, as shown in FIG. 45, the pressure in the space portion 89 once becomes the atmospheric pressure from the negative pressure A by the continuous introduction of the atmosphere, and after that, changes between the atmospheric pressure and the negative pressure B. Corresponding to that, the diaphragm 87 once comes to be in a state of no load from a state of adhering to the partition board 84, and after that, vibrates in a position where it does not touch the partition board 84, and therefore, it does not collide with the partition board 84 and does not produce hammering noises.

<Embodiment 8>

The embodiment of the variable vibration isolating support device according to the fourth invention will be described on the basis of FIG. 46 to FIG. 51.

Figure 46:
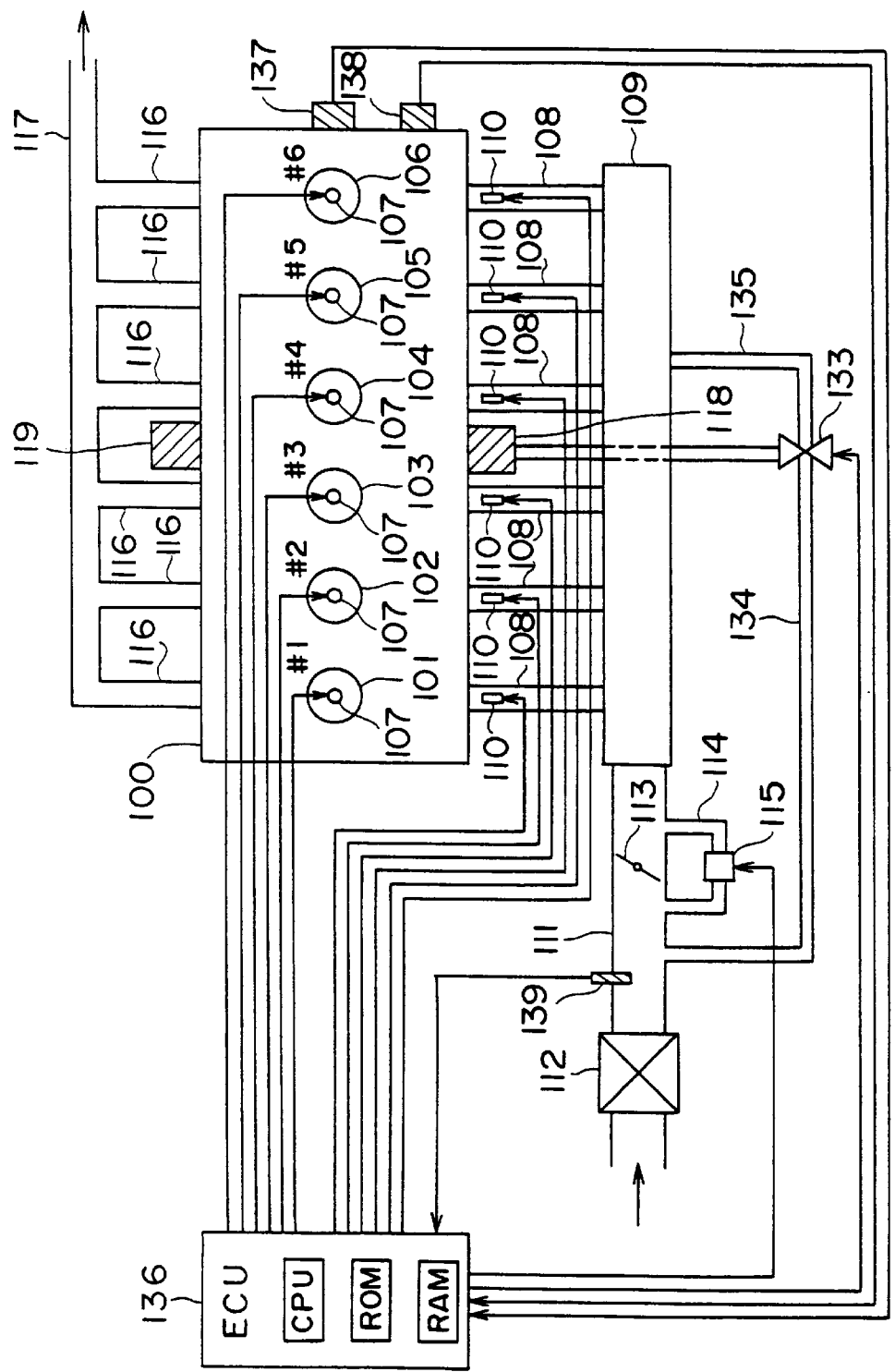
FIG. 46 is a figure showing the rough structure of an internal combustion engine to which the variable vibration isolating support device according to the present invention is applied.

FIG. 46 is a figure showing the rough arrangement of an internal combustion engine to which the variable vibration isolating support device according to the present invention is applied, and the internal combustion engine 100 is a straight 6 cylinder internal combustion engine, and has the first cylinder (#1) 101, the second cylinder (#2) 102, the third cylinder (#3) 103, the fourth cylinder (#4) 104, the fifth cylinder (#5) 105, and the sixth cylinder (#6) 106, and to each of the cylinders 101 to 106, a spark plug 107 is attached.

To each of the cylinders 101 to 106, an intake branch tube 108 is connected, and these intake branch tubes 108 are connected to a surge tank 109. Then, to each of the intake branch tubes 108, a fuel injection valve 110 is attached such that the injection nozzle thereof faces an intake port (not shown in the figure).

The surge tank 109 is connected to an air cleaner box 112 through an intake tube 111, and to the intake tube 111, a throttle valve 113 to open and close the passage in the intake tube 111, by being interlocked with an accelerator pedal (not shown in the figure) is attached.

In the intake system arranged like this, when the throttle valve 113 is opened, the fresh air passing through the air cleaner box 112 flows into the surge tank 109 through the intake tube 111, and after the intake air pulsation has been smoothed in the surge tank 109, the fresh air is distributed and supplied to each of the cylinders 101 to 106.

To the intake tube 111, a bypass passage 114 connecting the upper stream side and the down stream side of the throttle valve 113 is attached, and to this bypass passage 114, an idling speed control valve (ISCV) 115 for controlling the flow rate of the fresh air flowing in the bypass passage 114 is attached.

The ISCV 115 is composed of a valve body repeating the opening and closing, and an electromagnetic solenoid to drive the valve body, and when a driving pulse signal having a duty ratio corresponding to the ratio of the full opening time of the valve body to the full closing time, is applied, the electromagnetic solenoid drives the valve body according to the driving pulse signal to control the flow rate of the air in the bypass passage 114.

To each of the cylinders 101 to 106, an exhaust branch tube 116 is connected, and the exhaust branch tubes 116 are connected to an exhaust tube 117.

The internal combustion engine 100 arranged as mentioned above, is supported on a body 120 of an automobile by a variable engine mount (ACM) 118, an engine mount 119, and the like.

Figure 47:
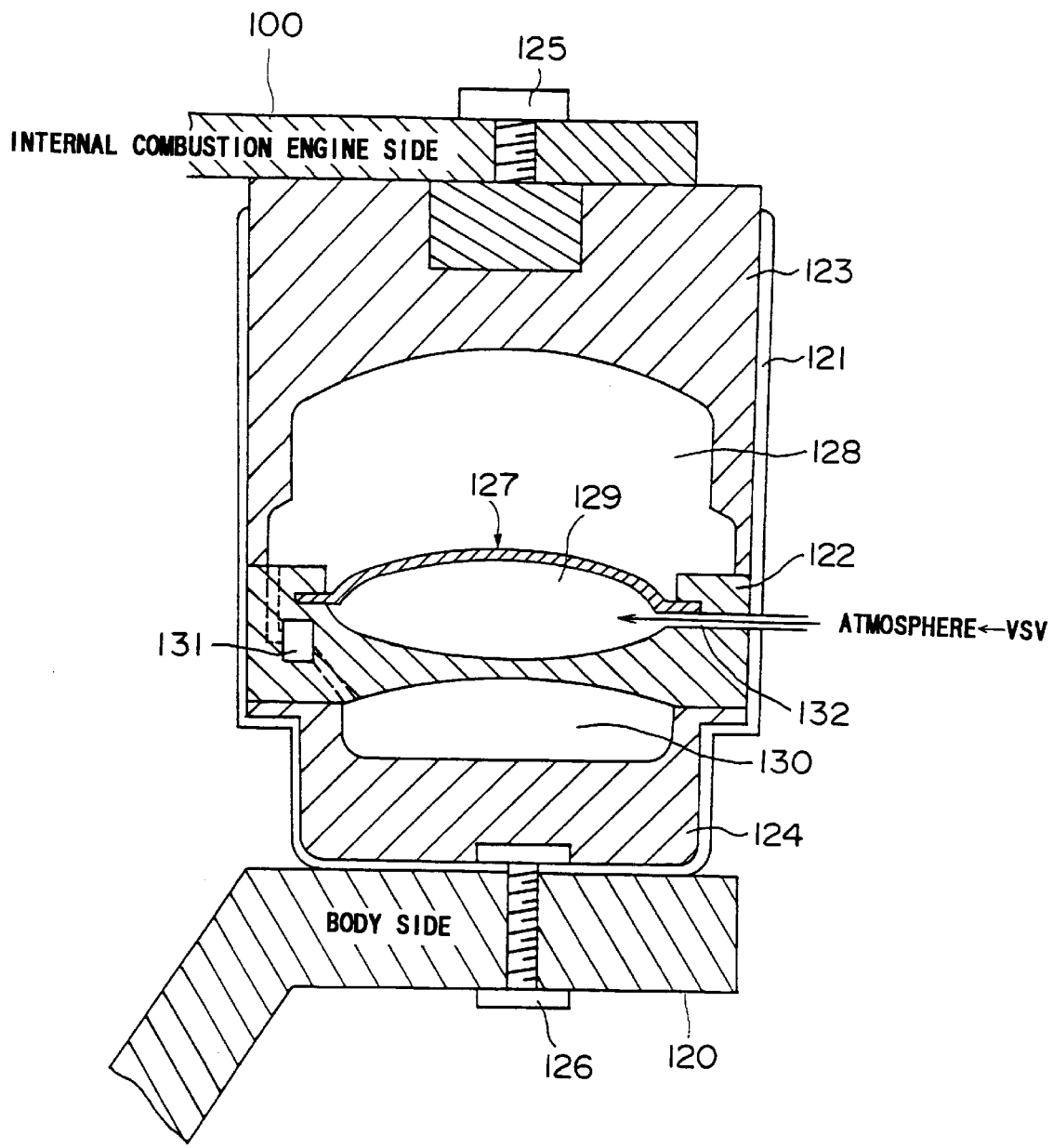
FIG. 47 is a figure showing the rough structure of a vibration isolating support means.
Figure 48:
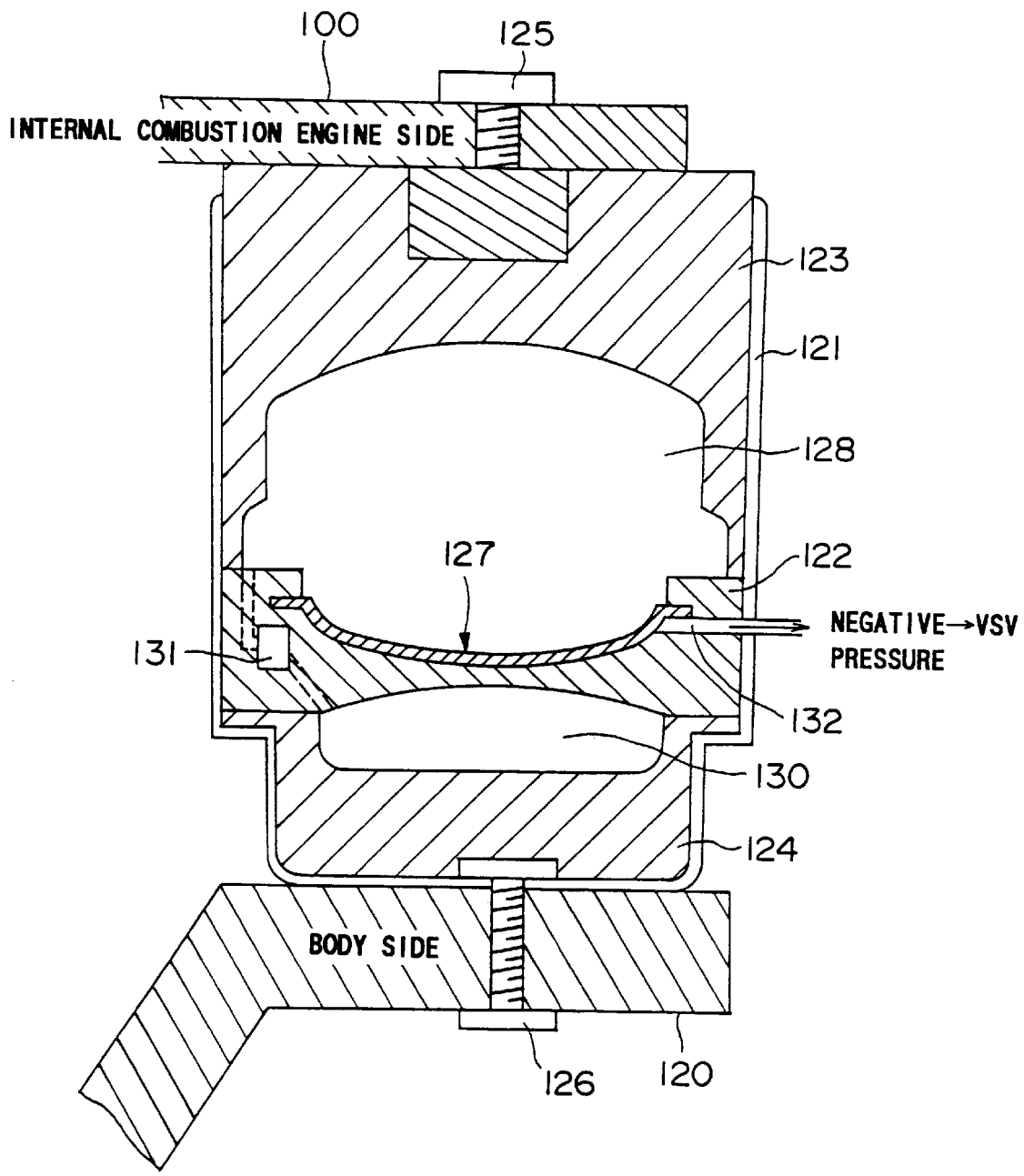
FIG. 48 is a figure describing the operation of the vibration isolating support means.

As shown in FIG. 47 and FIG. 48, the ACM 118 comprises: an outer casing hardware 121 whose upper portion is open; a partition board 122 made of a disclike rigid body with an outside diameter approximately equal to the inside diameter of the outer casing hardware 121 and dividing the interior of the outer casing hardware 121 into upper and lower chambers; a vibration isolating base body 123 made of an elastic body such as a rubber and forced into the space above the partition board 122 to be fixed to the outer casing hardware 121; and a vibration isolating base body 124 made of an elastic body such as a rubber and forced into the space below the partition board 122 to be fixed to the outer casing hardware 121.

The vibration isolating base body 123 is fixed to the internal combustion engine 100 side by a bolt 125, and the outer casing hardware 121 is fixed to the body 120 side of the vehicle by a bolt 126.

Above the partition board 122, a space is formed, by being surrounded by the vibration isolating base body 123 and the partition board 122, and this space is divided into a space portion 128 and a space portion 129 by a diaphragm 127 whose periphery is fixed to the partition board 122. Then, in the space portion 128, liquid is sealed (hereafter, the space portion 128 is called the main liquid chamber 128).

Below the partition board 122 of the ACM 118, a space portion 130 formed by being surrounded by the vibration isolating base body 124 and the partition board 122, is formed, and in this space portion 130, liquid is sealed (hereafter, the space portion 130 is called the secondary liquid chamber 130). Then, the main liquid chamber 128 and the secondary liquid chamber 130 lead to each other through an orifice 131 formed in the partition board 122.

Furthermore, in the partition board 122 and the outer casing hardware 121, an intake and exhaust passage 132 connecting the space portion 129 and the outside, is formed. This intake and exhaust passage 132 is connected to a vacuum switching valve (VSV) 133 mounted to the ACM 118 side by side.

Here, to the VSV 133, the intake and exhaust passage 132 is connected, and an atmosphere passage 134 and a negative pressure passage 135 are also connected. The atmosphere passage 134 is connected to the intake tube 111 on the upper stream side of the throttle valve 113, and the negative pressure passage 135 is connected to the surge tank 109.

The VSV 133 is composed of a valve body for switching between the continuity of the intake and exhaust passage 132 and the atmosphere passage 134 (closing of the negative pressure passage 135), and the continuity of the intake and exhaust passage 132 and the negative pressure passage 135 (closing of the atmosphere passage 134), and an electromagnetic solenoid for driving the valve body according to the control signal from the ECU 136.

When the intake and exhaust passage 132 and the atmosphere passage 134 are connected at the VSV 133, as shown in FIG. 47, the atmosphere flowing in the intake tube 111 is introduced into the space portion 129 of the ACM 118, and the volume of the space portion 129 becomes free to fluctuate. At this time, the ACM 118 becomes softest as a cushioning member.

On the other hand, when the intake and exhaust passage 132 and the negative pressure passage 135 are connected at the VSV 133, as shown in FIG. 48, the intake air negative pressure in the surge tank 109 is introduced into the space portion 129 of the ACM 118, and the atmosphere in the space portion 129 is sucked out, and the diaphragm 127 adheres to the partition board 122. Consequently, the fluctuation of the volume of the space portion 129 becomes impossible, and the ACM 118 becomes hardest as a cushioning member.

Thus, the ACM 118 and the VSV 133 realize the vibration isolating support means according to the present invention.

Here, returning to FIG. 46, to the internal combustion engine 100, sensors such as a crank position sensor 137 for outputting an electric signal each time a crank shaft (not shown in the figure) rotates through a specified angle (for example, 10 degrees), and a cylinder discrimination sensor 138 for outputting an electric signal when the rotational position of a cam shaft (not shown in the figure) is a specified position, are attached. To the intake tube 111, an air flow meter 139 for outputting an electric signal corresponding to the mass of intake air flowing in the intake tube 111 is attached.

The cylinder discrimination sensor 138 is an electromagnetic pickup type sensor, and outputs an electric signal before the compression top dead center of the reference cylinder. The cylinder discrimination sensor 138 is set, for example, so that the signal outputted from the crank position sensor 137 just after the output of the cylinder discrimination sensor 138 may be 10° before the compression top dead center of the reference cylinder.

The ECU 136 is composed of a digital computer, and has a ROM (read only memory), a RAM (random access memory), a CPU (central processor unit), an input port, an output port, and the like which are mutually connected by a bi-directional bus.

The ROM stores application programs such as a control routine of the fuel injection amount for determining the fuel injection amount of each of the cylinders 101 to 106, a control routine of the fuel injection timing for determining the fuel injection timing of each of the cylinders 101 to 106, a control routine of the ignition timing for determining the ignition timing of each of the cylinders 101 to 106, an ISCV control routine for determining the target opening of the ISCV 28, and a control routine of the VSV changing timing for determining the changing timing of the VSV 133, and various types of control maps.

The control maps are, for example, the map A showing the relation among the ignition timing compensation value at the time of idling and the engine speed, and the changing timing compensation value of the VSV 133, and the like.

The map A is a map in which the compensation values for optimizing the changing timing of the VSV 133 according to the ignition timing of the cylinder at the explosion stroke, in order to sufficiently extract the vibration isolating effect by the ACM 118, even if the ignition timing is different for every cylinder, at the time of idling of the internal combustion engine 100, are set. FIG. 49 shows an example of the map A, and it is arranged that when the ignition timing compensation value and the engine speed are determined, the most suitable changing timing compensation value of the VSV 133 is specified.

The RAM stores the output signal from each sensor, the calculation results of the CPU, and the like. The calculation results are, for example, the engine speed calculated from the output signal of the crank position sensor 137, the engine load calculated from the output signal of the air flow meter 139 (intake air mass) and the engine speed, and the like. The data stored in the RAM are renewed each time the crank position sensor 137 outputs a signal.

The CPU operates according to the application programs stored in the ROM, and determines the fuel injection amount, the fuel injection timing, the ignition timing and the like of each cylinder, on the basis of the output signal of each sensor and the control maps stored in the RAM, and controls the fuel injection valve 110, the spark plug 107, the VSV 133, and the ISCV 28.

When controlling the ISCV 28, the ECU 136 calculates the target idling speed corresponding to the operating state of the internal combustion engine 100, and at the same time, calculates the actual engine speed from the output signal of the crank position sensor 137, and next, compares the target idling speed with the actual engine speed, and calculates the most suitable ISCV driving duty ratio so as to decrease the deviation between both speeds. The ECU 136 applies a pulse signal corresponding to the ISCV driving duty ratio to the ISCV 28, and performs the control so that the actual engine speed may be the target idling speed.

When controlling the spark plug 107 at the time of idling of the internal combustion engine 100, the ECU 136 measures the time taken for the explosion stroke (180° CA) for each of the cylinders 101 to 106, and compares the times required for the explosion stroke of all the cylinders 101 to 106, and compensates the ignition timing to a cylinder whose required time is longest or a cylinder whose required time is shortest, so that the deviation of the times required for the explosion stroke of all the cylinders 101 to 106 may be minimized. In this case, the fluctuation of the engine speed at the time of idling is restrained.

In the present embodiment, by performing the control routine of the ignition timing compensation at the time of idling of the internal combustion engine 100, the ECU 136 compensates the ignition timing independently for every cylinder, and consequently, substantially changes the explosion timing for every cylinder. Thus, the ECU 36 realizes an explosion timing variable means according to the present invention.

When controlling the VSV 133 so as to isolate the idling vibration of the internal combustion engine 100, the ECU 136 discriminates the direction of vibration of the internal combustion engine 100 produced by the burning of the gaseous mixture at each of the cylinders 101 to 106, from the ignition timing (or the timing of the explosion stroke) of each of the cylinders 101 to 106, and performs the changing control of the VSV 133 so as to absorb the vibration in that direction.

Here, since the internal combustion engine 100 attempts to turn to the rotational direction side of a crank shaft (not shown in the figure) for every explosion stroke of each of the cylinders 101 to 106, a force in the compression direction is added to the ACM 118 at that time. Therefore, the ECU 136 performs the changing control of the VSV 133 so as to connect the intake and exhaust passage 132 and the negative pressure passage 135, and depressurizes the main liquid chamber 128, following the vibration of the internal combustion engine 100. At this time, since the ACM 118 becomes softer following the vibration in the compression direction, the vibration in the compression direction is absorbed by the ACM 118.

When the internal combustion engine 100 turns in the opposite direction by the reaction of the turning, a force in the pulling direction is added to the ACM 118. Therefore, the ECU 136 performs the changing control of the VSV 133 so as to connect the intake and exhaust passage 132 and the atmosphere passage 134, and increases the pressure in the main liquid chamber 128, following the vibration of the internal combustion engine 100. At this time, since the ACM 118 becomes harder following the vibration in the pulling direction, the vibration in the pulling direction is absorbed by the ACM 118.

Furthermore, when performing the changing control of the VSV 133, the ECU 136 compensates the changing timing of the VSV 133 most suitably according to the ignition timing of each of the cylinders 101 to 106 in order to sufficiently exhibit the vibration isolating function of the ACM 118.

Here, before the description of the present embodiment, the conventional control method of the VSV changing will be described by referring to FIG. 50.

Figure 50:
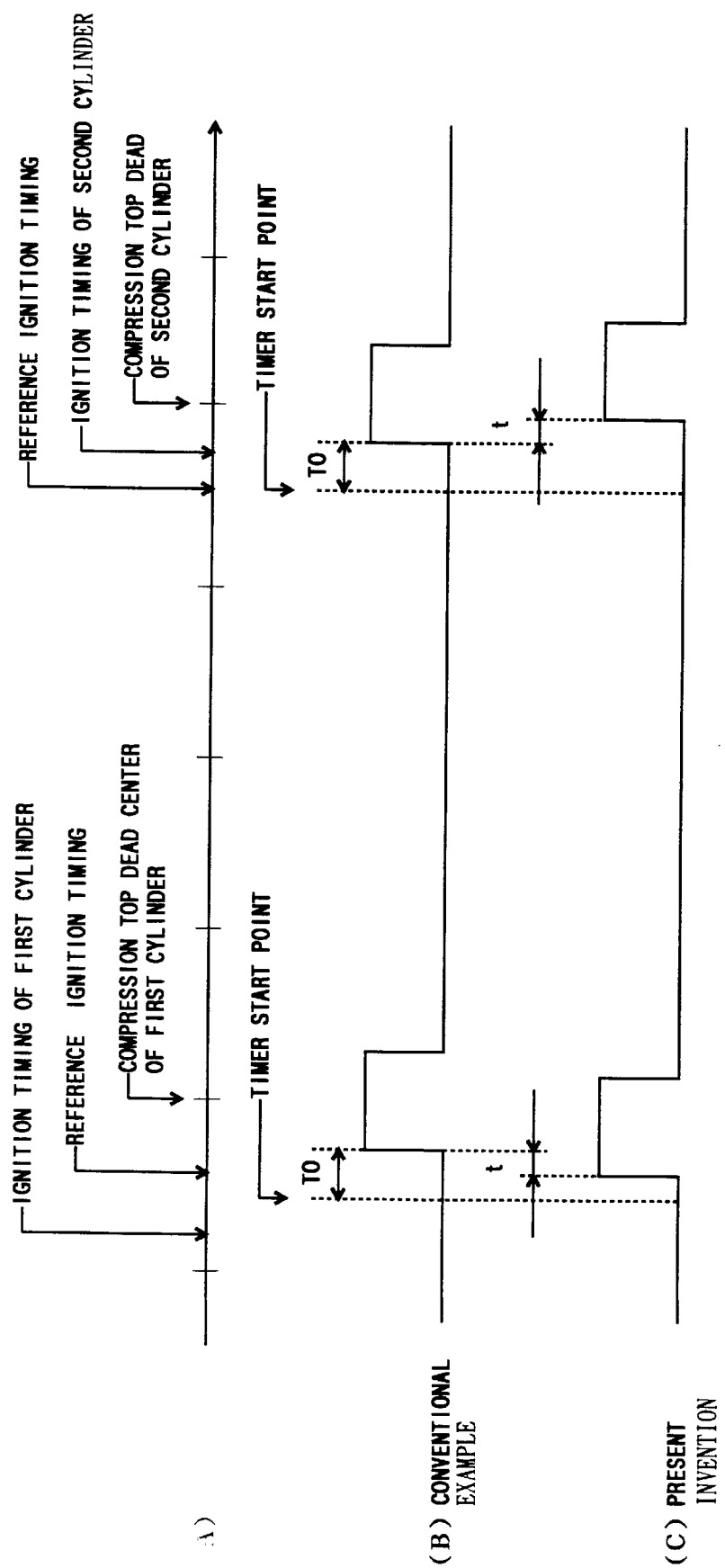
FIG. 50 is a figure showing a definite example of the VSV changing timing chart showing the conventional example and the present invention in comparison.

In FIG. 50, (A) shows the temporal passage of the crank angle, and (B) is a changing timing chart of a conventional VSV 133. It is assumed that this internal combustion engine 100 has such an order of explosion that the second cylinder explodes next to the first cylinder. Now, it is assumed that the ignition timing of the first cylinder is set, for example, at the time advancing by 10 degrees (in terms of the crank angle) from the reference ignition timing of the time of idling, and the ignition timing of the second cylinder is set, for example, at the time lagging by 5 degrees (in terms of the crank angle) from the reference ignition timing of the time of idling. Although the ignition timing is different depending on the cylinder like this, the changing timing of the VSV 133 has conventionally been set to the same timing at all times, considering that all cylinders are ignited at the reference ignition timing.

As a concrete control example, as shown in FIG. 50 (B), the elapsed time is measured on the basis of the time a certain time before the compression top dead center of each cylinder, and the VSV 133 is changed so that the intake and exhaust passage 132 and the negative pressure passage 135 may be connected when a specified time $T_0$ has elapsed. In other words, considering that all cylinders are ignited at the reference ignition timing, the changing timing of the VSV 133 is set at the time a certain time before the compression top dead center. This results in that the changing timing of the VSV 133 is too late for the first cylinder and the changing timing of the VSV 133 is too early for the second cylinder. That is, this results in that the timing to change the vibration isolating characteristics of the ACM 118 is delicately shifted to the actual explosion timing of each cylinder, and therefore, a sufficient vibration isolating effect cannot be obtained.

Therefore, in the present embodiment, it is arranged that when the ignition timing is changed to the advance side from the reference ignition timing, the changing timing of the VSV 133 is also compensated, according to the changing amount thereof, to the advance side from the reference changing timing by a specified time, and when the ignition timing is changed to the lag side from the reference ignition timing, the changing timing of the VSV 133 is also compensated, according to the changing amount thereof, to the lag side from the reference changing timing by a specified time.

In this case, it is arranged that the elapsed time is measured on the basis of the time a certain time before the compression top dead center of each cylinder, and the VSV 133 is changed when a changing time T has elapsed, and that this changing time T is set by adding a changing timing compensation value t to the reference changing time $T_0$ (that is, $T=T_0+t$). Then, it is arranged that the compensation value of the changing timing of the VSV 133 is determined by using the map A shown in FIG. 49. In this map A, the ignition timing compensation value [0] means that the ignition timing is the reference ignition timing, and at that time, the changing timing compensation value t of the VSV 133 is also [0], and the VSV 133 is changed after the reference changing time $T_0$.

The function and the effect of the present embodiment will be described below.

Figure 51:
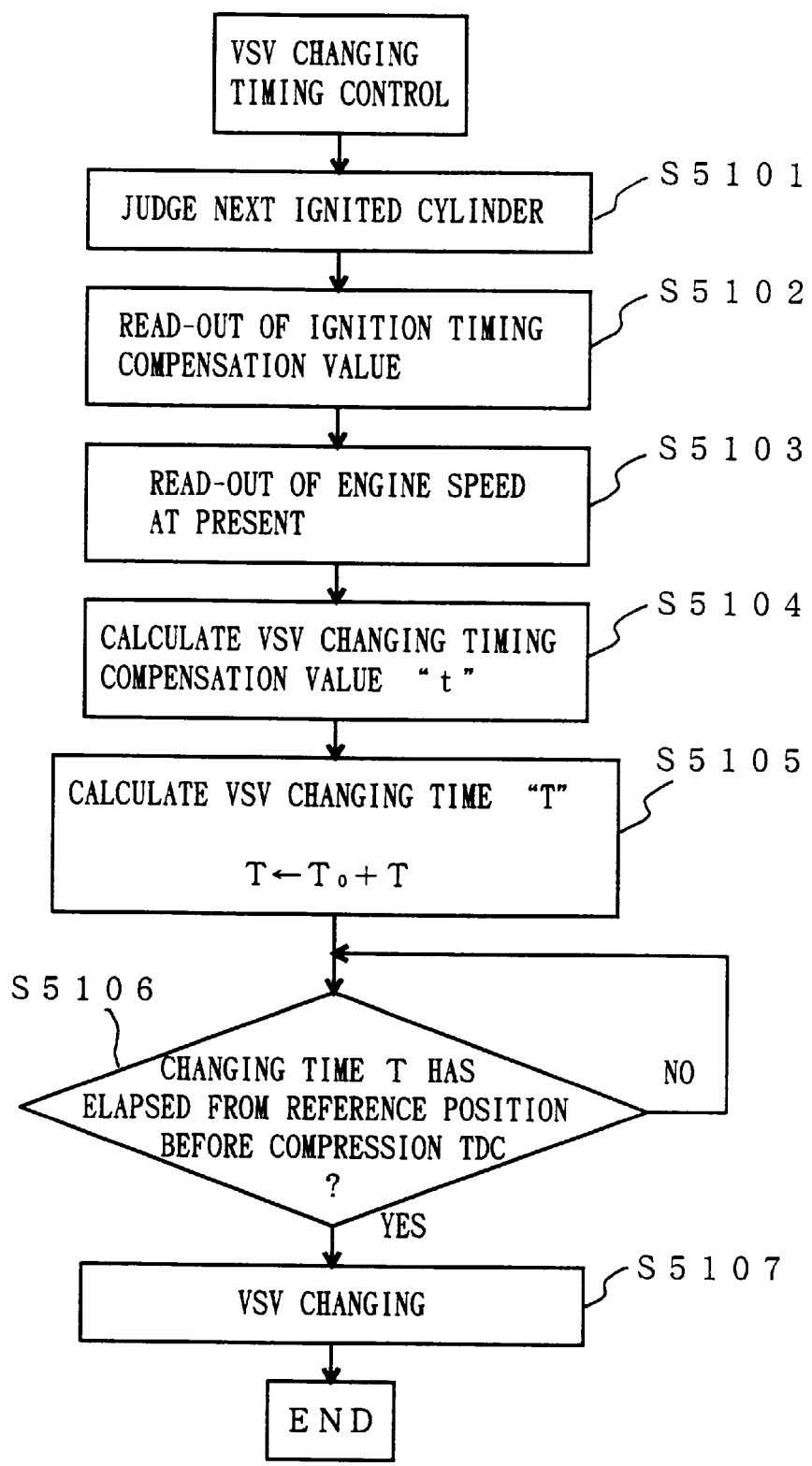
FIG. 51 is a flow chart showing the control routine of the VSV changing timing.

When it is judged that the internal combustion engine 100 is in the idling state, the ECU 136 performs the VSV changing timing control routine shown in FIG. 51, each time the crank shaft rotates through a specified crank angle (between an explosion stroke and an explosion stroke).

In the VSV changing timing control routine, at the S5101, the ECU 136 judges which cylinder is the next cylinder to be at the explosion stroke on the basis of the output signals of the crank position sensor 137 and the cylinder discrimination sensor 138 (hereafter, a cylinder simply called a cylinder means the cylinder judged at the S5101).

At the S5102, the ECU 136 accesses the RAM, and reads out the ignition timing compensation value of the cylinder determined by the ignition timing control routine performed in parallel with the VSV changing timing control routine.

At the S5103, the ECU 136 accesses the RAM and reads out the present engine speed of the internal combustion engine 100.

At the S5104, the ECU 136 accesses the map A of the ROM, and calculates the changing timing compensation value t of the VSV 133 corresponding to the ignition timing compensation value found at the S5102 and the engine speed found at the S5103.

At the S5105, the ECU 136 calculates the changing time T of the VSV 133 most suitable for the ignition timing of the concerned cylinder by adding the changing timing compensation value t calculated at the S5104 to the reference changing time $T_0$ of the VSV 133, and stores it in a specified area of the RAM.

At the S5106, the ECU 136 performs a count-up from the reference time a specified crank angle before the compression top dead center of the concerned cylinder (timer start point in FIG. 50), to judge whether the changing time T calculated at the S5105 has elapsed or not.

When it is judged at the S5106 that the changing time T has not elapsed, the ECU 136 does not perform the changing of the VSV 133 and continues the count-up of the elapsed time.

When it is judged at the S5106 that the changing time T has elapsed, the ECU 136 changes the VSV 133 so as to connect the intake and exhaust passage 132 and the negative pressure passage 135, at the S5107.

Thus, the ECU 136 realizes a variable means of the vibration isolating characteristic changing timing according to the present invention by performing the VSV changing timing control routine.

FIG. 50(C) is a changing timing chart of the VSV 133 in the present embodiment. In the case of the present embodiment, it is also arranged that the conditions of the ignition timing of the first cylinder and the second cylinder are similar to those of the above mentioned conventional example. It is also clear from this timing chart that according to the present embodiment, when the ignition timing is changed to the advance side from the reference ignition timing like the first cylinder, the changing timing of the VSV 133 is also changed to the advance side from the reference changing timing, and when the ignition timing is changed to the lag side from the reference ignition timing like the second cylinder, the changing timing of the VSV 133 is also changed to the lag side from the reference changing timing.

Thus, according to the present embodiment, at the time of idling of the internal combustion engine 100, the changing timing of the VSV 133 is changed according to the ignition timing of each cylinder, and consequently, the vibration isolating function of the ACM 118 can sufficiently be exhibited at all times and the vibration isolating efficiency at the time of idling can be improved.

What is claimed is:

1. An idling speed control device of an internal combustion engine, comprising:
   a throttle valve located in an intake passage of an internal combustion engine;
   an intake air amount detection means for detecting the amount of fresh air taken into the internal combustion engine;
   an idling speed control means for controlling the amount of intake air of the internal combustion engine to make the engine speed be a desired target idling speed at the time of idling of the internal combustion engine;

an air pressure actuation mechanism operated by selectively introducing atmospheric pressure and intake tube negative pressure produced in the intake passage on the down stream side of said throttle valve; and an intake air amount compensating means for compensating an adjusting position of the idling speed control means in the direction of decreasing the amount of intake air of the internal combustion engine when introducing the intake tube negative pressure after the introduction of the atmospheric pressure, into said air pressure actuation mechanism.

2. An idling speed control device of an internal combustion engine described in claim 1, wherein said intake air amount compensating means determines the compensating amount according to the operational state of the air pressure actuation mechanism.

3. An idling speed control device of an internal combustion engine described in claim 1, further comprising a control means of the air pressure actuation mechanism for controlling the operational state of said air pressure actuation mechanism to decrease the amount of atmosphere flowing into the intake passage from said air pressure actuation mechanism, when the adjusting position of the idling speed control means compensated by said intake air amount compensating means is a position below a specified lower limit guard value.

4. An idling speed control device of an internal combustion engine described in claim 3, wherein said control means of the air pressure actuation mechanism controls said air pressure actuation mechanism to prohibit the flow of the atmosphere from said air pressure actuation mechanism to the intake passage, when the adjusting position of the idling speed control means compensated by said intake air amount compensating means is a position below a specified lower limit guard value.

5. An idling speed control device of an internal combustion engine described in claim 1, further comprising a lower limit guard value changing means for decreasing the lower limit guard value on condition that the amount of atmosphere flowing from said air pressure actuation mechanism to the intake passage has an increasing tendency, when the adjusting position of said idling speed control means by said intake air amount compensating means is a position below a specified lower limit guard value.

6. An idling speed control device of an internal combustion engine described in claim 5, wherein the adjusting position of said idling speed control means is a learned value learned according to the engine load, the target idling speed, and the like, and the idling speed control device further comprises a learning prohibition means for prohibiting the learning processing of said adjusting position while the lower limit guard value is being changed by said lower limit guard value changing means.

7. An idling speed control device of an internal combustion engine described in claim 1, wherein said air pressure actuation mechanism is a variable vibration isolating support device for supporting the internal combustion engine such that the vibration of the internal combustion engine is not transmitted to the body side, and wherein the idling speed control device further comprises a changing processing stopping means for stopping the changing processing of the introduction of the intake tube negative pressure and the atmospheric pressure into said variable vibration isolating support device, when the engine speed becomes not less than a specified speed at the time of idling of the internal combustion engine.

8. An idling speed control device of an internal combustion engine described in claim 7, wherein said idling speed control means is a flow rate control valve whose minimum opening is previously set, and wherein said changing processing stopping means stops the changing processing of the introduction of the intake tube negative pressure and the atmospheric pressure into said variable vibration isolating support device, on condition that the engine speed is not less than the target idling speed and the opening of said flow rate control valve is said minimum opening, at the time of idling of the internal combustion engine.

9. An idling speed control device of an internal combustion engine described in claim 7, further comprising a target idling speed compensating means for raising the target idling speed by a specified amount, when the changing processing of the introduction of the intake tube negative pressure and the atmospheric pressure into said variable vibration isolating support device, is stopped.

10. An idling speed control device of an internal combustion engine described in claim 1, wherein said air pressure actuation mechanism is a variable vibration isolating support device for supporting the internal combustion engine such that the vibration of the internal combustion engine is not transmitted to the body side, and wherein the idling speed control device further comprises a changing frequency compensating means for decreasing the changing frequency of the introduction of the intake tube negative pressure and the atmospheric pressure into said variable vibration isolating support device by a specified amount, when the engine speed becomes not less than a specified speed at time of idling of the internal combustion engine.

11. An idling speed control device of an internal combustion engine described in claim 10, wherein said idling speed control means is a flow rate control valve whose minimum opening is previously set, and wherein said changing frequency compensating means decreases the changing frequency of the introduction of the intake tube negative pressure and the atmospheric pressure into said variable vibration isolating support device, at the time of idling of the internal combustion engine, on condition that the engine speed is not less than the target idling speed and the opening of said flow rate control valve is said minimum opening.

12. A variable vibration isolating support device comprising:

a vibration isolating support means for supporting a V-type internal combustion engine such that the vibration of said V-type internal combustion engine is not transmitted to the body side; and a vibration isolating characteristic changing means for changing the vibration isolating characteristics of said vibration isolating support means according to the vibration produced at a bank on one side of said V-type internal combustion engine and the vibration produced at a bank on the other side of said V-type internal combustion engine.

13. A variable vibration isolating support device described in claim 12, further comprising a vibration discrimination means having a first vibration discrimination means for discriminating the vibration produced at said bank on one side by the timing when the gaseous mixture explodes in cylinders of said bank on one side and a second vibration discrimination means for discriminating the vibration produced at said bank on the other side by the fact that the gaseous mixture explodes in cylinders of said bank on the other side.

14. A variable vibration isolating support device described in claim 12, wherein said vibration isolating support means has a mechanism for changing the vibration isolating characteristics according to a control signal outputted from said vibration isolating characteristic changing means, and wherein said vibration isolating characteristic changing means alternately outputs a first control signal corresponding to the vibration produced at said bank on one side and a second control signal corresponding to the vibration produced at said bank on the other side.

15. A variable vibration isolating support device comprising:

a variable vibration isolating support means having a space portion whose wall surface is partly formed by a diaphragm, and alternately introducing negative pressure and atmospheric pressure into said space portion at a specified ratio when the operational state of the internal combustion engine is in a first operational area, and continuously introducing negative pressure into said space portion when the operational state of said internal combustion engine is in a second operational area; and a pressure control means which alternately introduces negative pressure and atmospheric pressure at a specified ratio after once introducing atmospheric pressure into said space portion, when the operational state of the internal combustion engine has moved from the second operational area to the first operational area.

16. A variable vibration isolating support device comprising:

a vibration isolating support means for supporting the internal combustion engine such that the vibration of the internal combustion engine is not transmitted to the body side;

a vibration isolating characteristic changing means for changing the vibration isolating characteristics of said vibration isolating support means before the gaseous mixture explodes in each cylinder of the internal combustion engine;

an explosion timing changing means for changing the substantial explosion timing of each cylinder by changing the ignition timing or the fuel injection timing independently for each cylinder of the internal combustion engine; and a compensating means of the vibration isolating characteristic changing timing for compensating the changing timing of the vibration isolating characteristics by said vibration isolating characteristic changing means, according to the explosion timing changed by said explosion timing changing means.

17. A variable vibration isolating support device described in claim 16, wherein said compensating means of the vibration isolating characteristic changing timing compensates the changing timing of the vibration isolating characteristics to the advance side as the explosion timing of each cylinder is changed to the advance side by said explosion timing changing means.

* * * * *